United States Patent [19]

Minkus

[11] Patent Number: 5,122,952
[45] Date of Patent: Jun. 16, 1992

[54] METHOD AND APPARATUS FOR AUTOMATED LEARNING TOOL SELECTION FOR CHILD DEVELOPMENT

[76] Inventor: Leslie S. Minkus, 1243 Selwyn La., Buffalo Grove, Ill. 60089

[21] Appl. No.: 602,110

[22] Filed: Oct. 22, 1990

[51] Int. Cl.⁵ .............. G06F 15/38; G06F 15/22; G06F 15/00
[52] U.S. Cl. .................. 364/419; 364/401; 364/413.01
[58] Field of Search ........... 364/419, 401, 403, 413.01; 434/335, 316, 322, 353, 354, 355, 236

[56] References Cited

U.S. PATENT DOCUMENTS

| | | | |
|---|---|---|---|
| 4,348,744 | 9/1982 | White | 364/419 |
| 4,358,277 | 11/1982 | Moyer et al. | 434/322 |
| 4,464,122 | 8/1984 | Fuller et al. | 434/127 |
| 4,627,818 | 12/1986 | Von Fellenberg | 434/322 |
| 4,650,426 | 3/1987 | Brigance | 434/322 |
| 4,705,479 | 11/1987 | Maron | 434/335 |
| 4,736,294 | 4/1988 | Gill et al. | 364/408 |
| 4,759,717 | 7/1988 | Larochelle et al. | 434/118 |
| 4,820,167 | 4/1989 | Nobles et al. | 434/336 |
| 4,835,683 | 5/1989 | Phillip et al. | 364/200 |
| 4,877,408 | 10/1989 | Hartsfield | 434/350 |
| 4,972,318 | 11/1990 | Brown et al. | 364/403 |
| 4,992,940 | 2/1991 | Dworkin | 364/401 |
| 5,001,630 | 3/1991 | Wiltfong | 364/401 |

OTHER PUBLICATIONS

Product Information Brochure for a database program named *4th Dimension* TM and entitled "Relational Database for the Macintosh TM", marketed by ACIUS of Cupertino, Calif., written by Marylene Delbourg-Delphis, Guy Kawasaki, Scot Knaster and Will Mayall.

*Primary Examiner*—Dale M. Shaw
*Assistant Examiner*—Xuong Chung
*Attorney, Agent, or Firm*—Welsh & Katz, Ltd.

[57] ABSTRACT

Computer-assisted methods and apparatus for selecting and matching learning tools that possess developmental value with the individual characteristics of a child are disclosed. Commercially available products consisting of toys, games, books, and allied learning materials are analyzed and the data relating to the personal traits required to use the product, educational value of the product, learning value of the product, instructional variables required to use the product, and the description of the product is entered into and stored in a computer system. Information concerning a child's sensory learning style preferences, hobbies and interests, academic conditions, medical conditions, social habits, emotional attitudes, and nutritional habits is entered into the computer system. The system compiles the child data into a report. The system also matches the child data with the product data and a list of preferred products is produced from which parents select appropriate learning tools for the child.

20 Claims, 5 Drawing Sheets

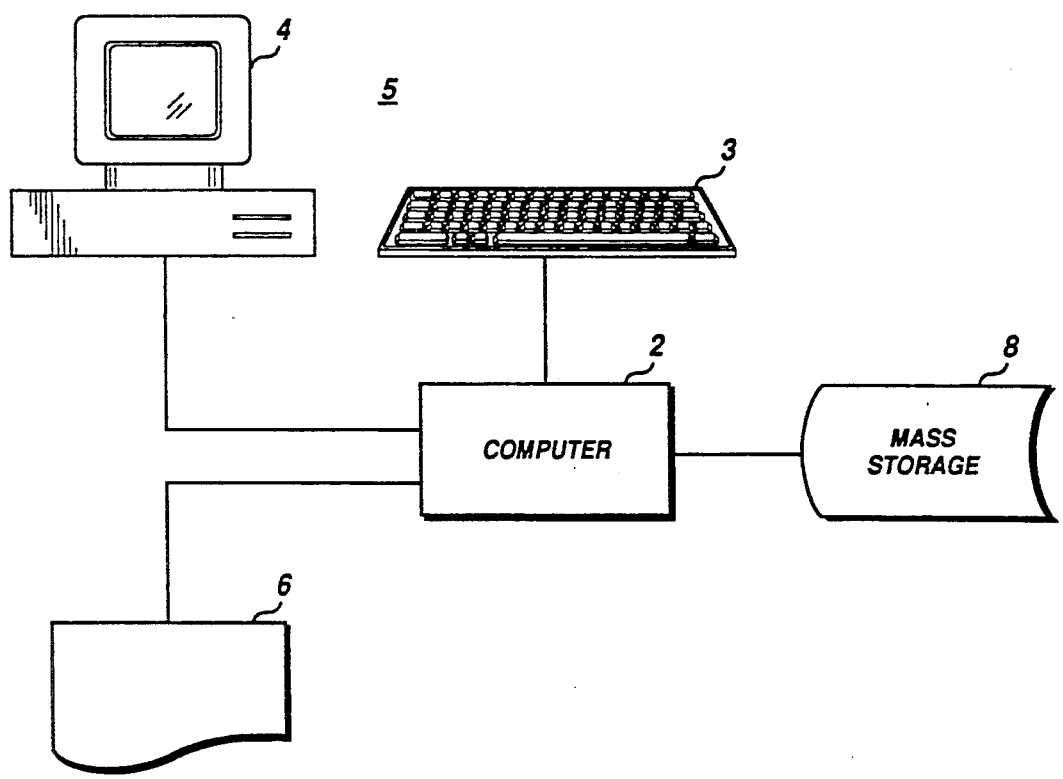

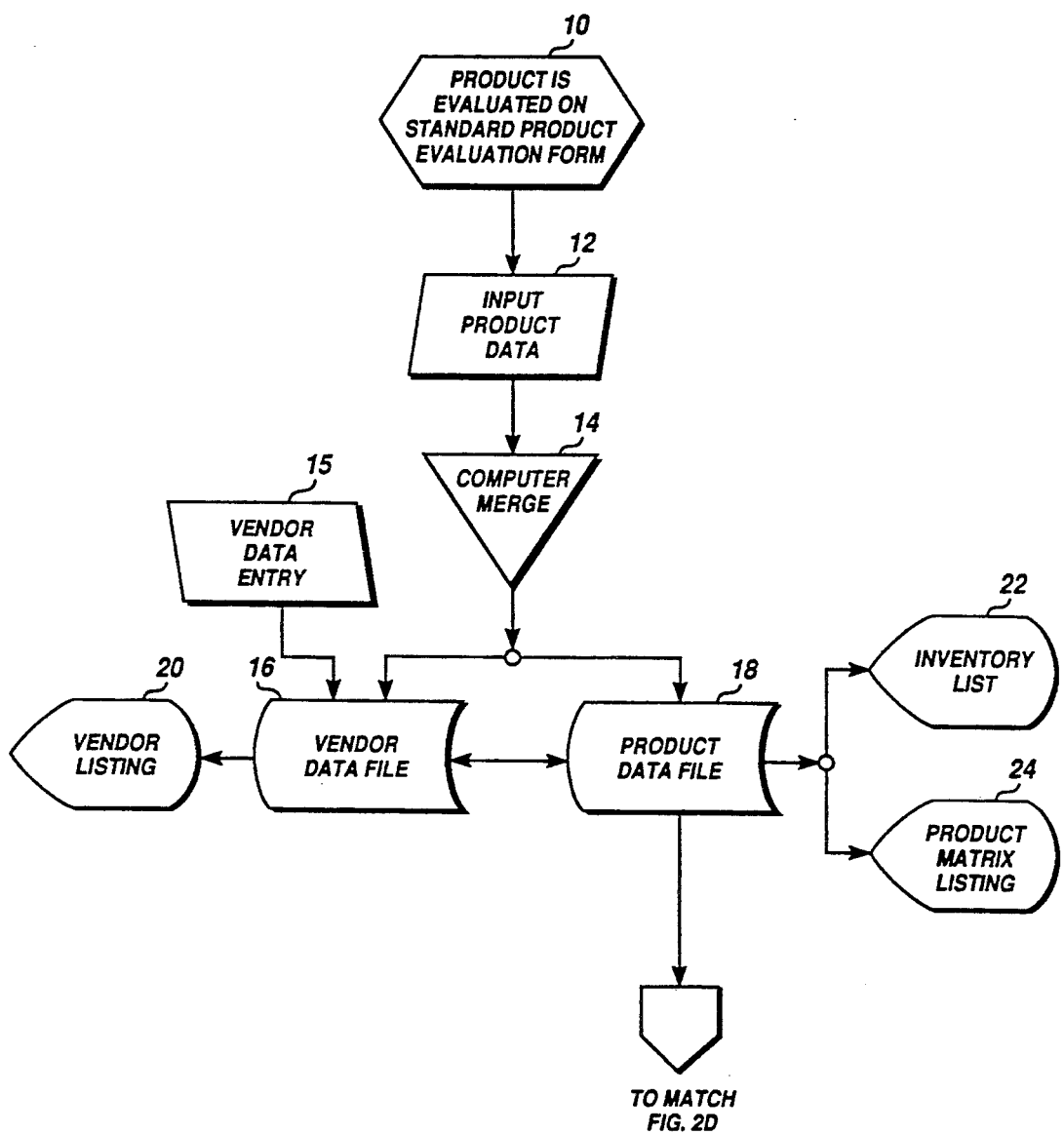

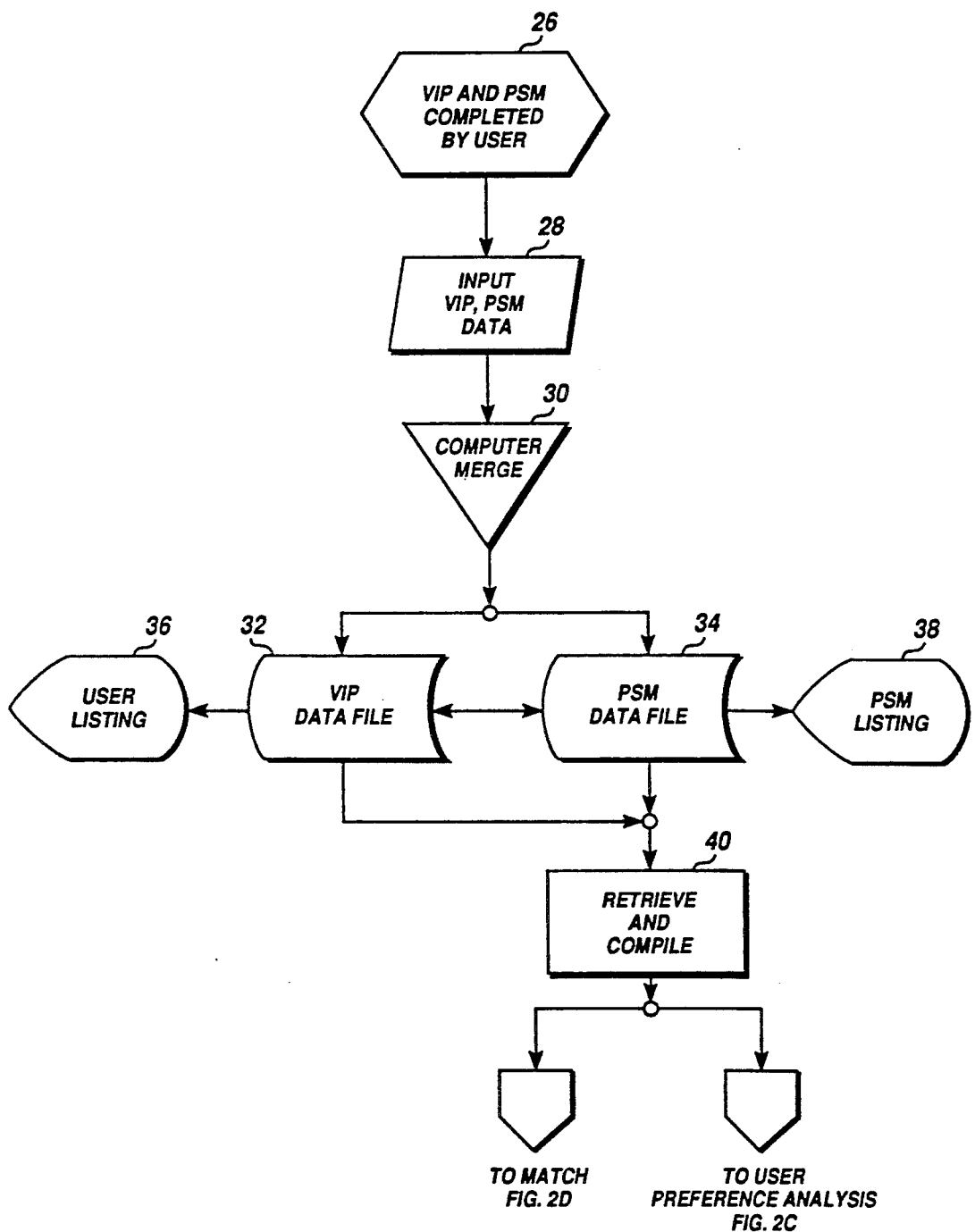

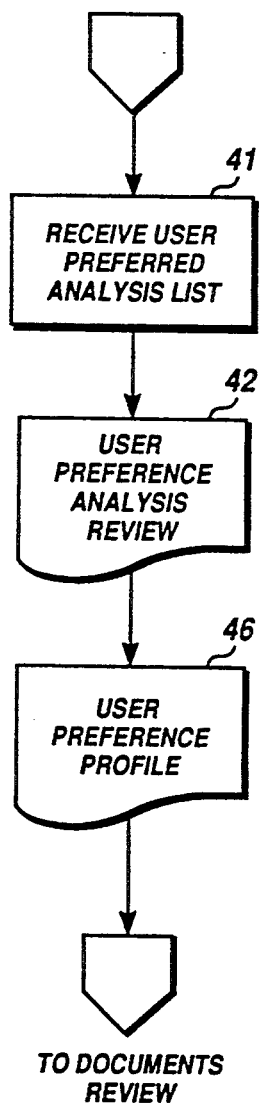

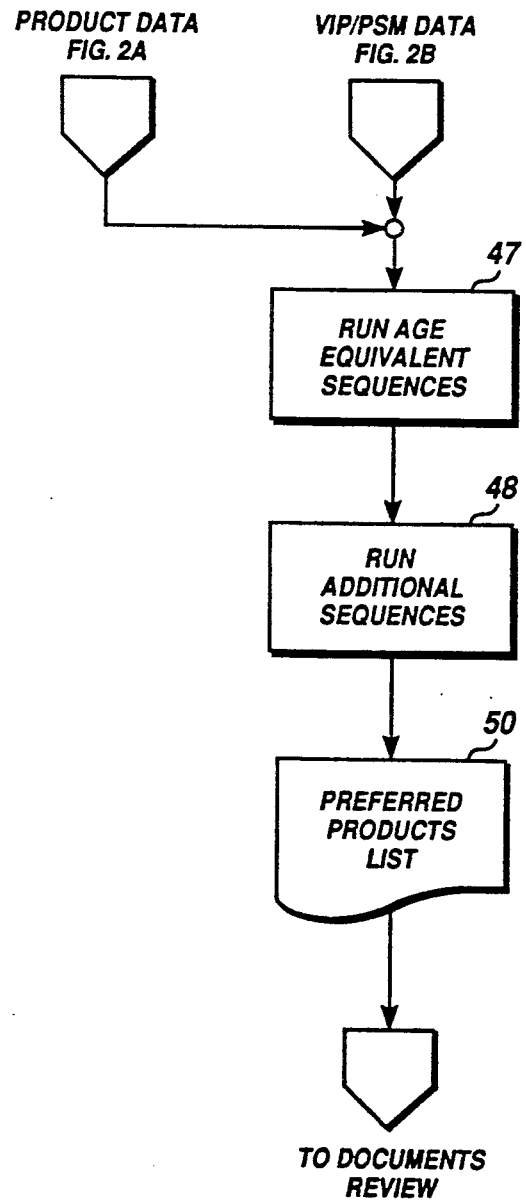

METHOD AND APPARATUS FOR AUTOMATED LEARNING TOOL SELECTION FOR CHILD DEVELOPMENT

BACKGROUND OF THE INVENTION

This invention relates generally to the field of computer-assisted selection of learning tools and more particularly to methods and apparatus for automated selection of learning tools for children based upon unique characteristics of the individual child and the cognitive, educational, social, entertainment, and play values of consumer learning tool products.

Books, toys, games, and allied learning materials are the tools that all children, whether they are gifted, average, exceptional, learning disabled, or handicapped, naturally use for learning. However, the learning needs of individual children differ because of differences in the developmental stages, temperament, environment, and preferred social and cognitive styles of each child. As a result of these differences, many parents have had the experience of purchasing a toy, a book, or a game for their child, only to find that the item was too difficult, too easy, or simply did not match the interests of the child. Because parents rank the education of their children as one of the most important aspects of their lives, there is a great need for guidance in the selection of appropriate toys and other learning tools for children. Nevertheless, there is no automated system in the prior art to aid in the selection of learning tools for children which considers the unique strengths, weaknesses, deficiencies, preferences, and preferred sensory learning styles of the child during their various stages of cognitive, social, emotional, and physical development.

Accordingly, it is an object of this invention to provide improved methods and means for evaluating the level of development and the preferred style in which a child learns.

It is a further object of this invention to match the individual child's level of development and preferred learning style with appropriate learning tools.

Matching appropriate learning tools with the individual child enhances the child's academic and social skills, motivates the child's interest, enhances the child's strengths, and abates the child's weaknesses by reducing or eliminating learning frustration while stimulating the child's desire and ability to learn.

SUMMARY OF THE INVENTION

These and other objectives of the invention are accomplished by providing a system in which a large number of available products consisting of toys, games, books, and allied learning materials (learning tools) are carefully analyzed and the product data collected is entered into a computer system. A questionnaire is filled out and reviewed concerning a user (i.e., child) and the child data from the questionnaire is entered into the system. The child data is matched against the product data and a Preferred Products List of products matched to the unique characteristics of the individual user is produced. From this Preferred Products List appropriate learning tools are selected.

Products are evaluated on a Standard Product Evaluation Form (SPEC). The resulting data is entered into the computer system and merged into a Product data file and a Vendor data file. A list of Vendor data and the Product data can be viewed on a monitor or printed. In addition, the data of an individual product (product matrix listing) can also be viewed on a monitor or printed.

Parent(s)/guardian(s)/educator(s) (Parents) are given a two part questionnaire concerning the child to be answered by themselves or, if the child is old enough, by the child under the parents' supervision. The questionnaires are received, analyzed, and entered into the computer system. Static personal information of the child is merged into a Vital Information Profile (VIP) data file, and preferences, developmental, and skill level information of the child is merged into a Preference Survey Model (PSM) data file. The VIP data and the PSM data for an individual child can be viewed on a monitor or can be printed.

The VIP data and the PSM data for an individual child are retrieved, compiled, and matched by the computer system against the Product data file to generate a Preferred Products List. The Preferred Products List is reviewed by the parents to permit an informed selection of appropriate learning tools for the child. The learning tools may be demonstrated to the parents, who in turn may demonstrate the learning tools to the child. The VIP data and the PSM data for the individual child can also be retrieved and compiled into a User Preference Analysis report. The User Preference Analysis report represents the current skill levels of the developmental and behavioral characteristics of the child. This report may be reviewed for errors and omissions and a User Preference Profile report generated using the information compiled in the User Preference Analysis report. This User Preference Profile may be used to assist the parent in the selection of learning tools for the child.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

FIG. 1 is a block diagram illustrating a specific embodiment of a computer system in accordance with the invention.

FIG. 2A is a detailed flow diagram for a specific embodiment of the invention illustrating the overall methodology and structural flow for the product evaluation stage of the invention.

FIG. 2B is a detailed flow diagram for a specific embodiment of the invention illustrating the methodology and structural flow for the entry and compilation of user information for the invention.

FIG. 2C is a detailed flow diagram for a specific embodiment of the invention illustrating the methodology and structural flow for the user preference analysis stage of the invention.

FIG. 2D is a detailed flow diagram for a specific embodiment of the invention illustrating the methodology and structural flow for the product/user matching stage of the invention.

DETAILED DESCRIPTION OF THE INVENTION

FIG. 1 is a generalized block diagram illustrating the structure of a specific computer system 5 which can be utilized for implementing the invention for selecting appropriate learning tools. FIG. 1 illustrates a digital computer 2 connected to a keyboard 3 and a monitor 4 for entering the data and displaying the vendor listing, the inventory listing, product matrix listings, user listings, and PSM listings. A printer 6 is provided for printing out a vendor listing, an inventory listing, product matrix listings, user listings, PSM listings, a User Preference Analysis, and Preferred Products lists. At least one mass data storage device 8 (e.g., hard disk) provides storage for a Vendor data file, a Product data file, a Vital Information Profile data file, and a Preference Survey Model data file. One example of a suitable computer system 5 is a Macintosh Personal Computer marketed by Apple Computer Co. of Cupertino, Calif. It should be apparent to those skilled in the art that the keyboard and the monitor may be at locations remote from the digital computer and the mass data storage device, such as on the showroom floor of a toy store or in the parents' homes, schools, day care centers, businesses, and on or off-site processing centers.

While the invention may be implemented using a wide variety of computer systems, which may be programmed using a wide variety of existing programming languages and/or data base programs, the embodiments illustrated by FIGS. 2A-2D were implemented using a known relational data base program marketed by ACIUS of Cupertino, Calif. under the name 4th DIMENSION. The system 5 was programmed within the 4th DIMENSION data base program using the 4th DIMENSION programming language. The detailed file structures, screens, and program object code implementing a specific embodiment of the invention under 4th DIMENSION are provided in Appendixes I-VI. Appendix I provides the file structure, Appendix II provides the screens, Appendix III is the control code listing, Appendix IV, V and VI are the matching sequence code listings.

Referring now to FIG. 2A, there is shown a schematic detailed flow diagram illustrating the methodology and structural flow for a specific embodiment of the product evaluation process of the instant invention. As illustrated at block 10, commercially available or specially designed products (e.g., toys, games, books, and allied learning materials) are evaluated and characterized on a standard product evaluation form. Each product is evaluated and characterized by completing a Standard Product Evaluation Form (SPEF) such as that of TABLE A.

The form is completed by providing the product and vendor information in section one, (types: A=Record, Tape, CD; B=Book; G=Game; L=Learning material; S=Life style; T=Toy), and providing the information requested in sections 3-6 including indicating a performance level (A for basic; B for competency; C for mastery) in section 4. An "other" category permits entry of special areas of learning, traits, etc., that may be important to a child. The product code in the illustrated embodiment is made up of a first letter indicating the type (i.e., A, B. G, L, S or T), followed by a three digit number, followed by a two character subcode indicating a product class. The product classes for the specific illustrated embodiment are listed in Table A1. The subcode is followed by two digits indicating the age range for which the product is suitable, a character for the performance level, a character indicating the educational value (i.e., the values entered in section 4), and two characters indicating the grade range for which the product is suitable. The grade attribute under section six is indicated with an A for the 0 up to 1 year range. B for the 1 up to 2 years range; C for the 2 up to 3 years range; D for the 3 up to 4 years range; E for the 4 up to 5 years range; K for the 5 up to 6 years range; 1 for the 6 up to 7 years range and an increment of one for such subsequent grade level.

TABLE A

© 1990 KDM Enterprises LTD. This form is copyright protected.

PRODUCT CODE #_____

STANDARD KDM PRODUCT EVALUATION FORM (SPEF)

1. PRODUCT

TYPE      A    B    G    L    S    T      2. DESCRIPTION:_____
NAME _____
COUNTRY OF ORIGIN_____
NO. OF PARTICIPANTS REQ._____
ENVIRON. NEEDED (5A) _____
COMPONENTS NEEDED_____
OTHER _____
VENDOR _____

4. EDUCATIONAL:

CAT #\_\_\_\_\_ PAGE\_\_\_\_\_ MIN ORDER TIME\_\_\_\_\_
UNIT COST _____    Performance Level:    A    B    C
UNIT FRT. _____    D-MATH          H-SOCIAL STUDIES
UNIT OTHER_____    E-READING       I-ART
UNIT TOTAL_____    F-SCIENCE        J-MUSIC
   G-LANGUAGE     K-OTHER:\_\_\_\_\_
BEST PURCHASE QUANTITY_____ NOTES: MIN ORDER REQ._____
FOB TERMS_____ OTHER _____

3. LEARNING:                    5. INSTRUCTIONAL VARIABLES:
   A-Auditory Reception            B-Length of Time
   B-Auditory Assoc.               C-No. of Factors
   C-Auditory Memory             D-Performance Level\_\_\_\_\_

TABLE A-continued

D-Grammar of Letter Reversals
E-Visual Reception
F-Visual Assoc.
G-Visual Memory
H-Perceptual Constancy
I-Spatial Relationships
J-Eye/Hand Coordination
K-Balance
L-Verbal Expression
M-Other_____

6. VALUES-PERSONAL TRAITS:

A-Age_____ B-Grade_____ C-Sex_____
D-Ethnic_____ E-Handed_____
F-Other_____

E-Communication/lang. clarity
F-Rapport/relationships/socialization
G-Logic & Reasoning/Reaching Concl.
Using Principles
H-Abstract Random Unpredictable
I-Moral Religious Principles of Right
and wrong
J-Sensory Awareness-Sight, Sound,
Touch, Taste & Smell
K-Mental Images
L-Retention & Recall
M-Imitate
N-Sm. & Lg. Motor Actions
O-Pre-requisites required
P-Familiarity, Assoc., Resemblance
Q-Conceptualize-Beg. to understand
R-Emotional Stimuli/Patience &
  intensity
S-Other_____

TABLE A1

| Type | Sub-Code | Description (Class) |
|---|---|---|
| B | FA | BABY BOOKS (6M TO 23M) |
| B | FB | PICTURE BOOKS (24M TO 48M) |
| B | FC | STORY BOOKS (4 Y TO 7 Y) |
| B | FD | ADVENTURES (SPACE TRAVEL) |
| B | FE | MYSTERIES (DETECTIVE & SUSPENSE STORIES) |
| B | FG | CLASSICS |
| B | FH | RIDDLES, JOKES, HUMOR & RHYMES |
| B | FI | GAMES BOOKS |
| B | FJ | RELIGIOUS BOOKS |
| B | FK | SERIES - STORY COLLECTIONS |
| B | FL | SPORTS BOOKS (INDICATE IN PRODUCT DESCRIPTION) |
| B | FM | SOCIAL ISSUES (DRUG-AIDS) |
| B | FN | DIVORCE |
| B | FO | COMIC BOOK |
| B | FP | ROMANCE |
| B | FQ | ANIMAL STORIES - FICTION (CIRCUS, ZOO) |
| B | FR | FRIENDSHIP |
| B | FS | FAIRY TALES & FABLES |
| B | FT | AUTO MECHANICS |
| B | FU | WESTERNS (COWBOYS & INDIANS) |
| B | FW | POETRY |
| B | FV | MEDICINE |
| B | FX | ROBOTS |
| B | FY | MYTHS/LEGENDS - FOLKLORE |
| B | FZ | FANTASY & SCIENCE FICTION |
| B | BA | DEATH |
| B | BB | EARLY LEARNING CONCEPTS |
| B | BC | FAMILY LIFE & GROWING UP |
| B | BD | ETHNIC STUDIES |
| B | BE | HANDICAPS |
| B | BF | HOLIDAYS |
| B | BG | HISTORICAL FICTION |
| B | BH | NURSERY RHYMES & TALES |
| B | BI | OTHER LANDS |
| B | BJ | POETRY & SONG |
| B | BK | SCHOOL STORIES |
| B | BL | SIBLING RELATIONSHIPS |
| B | BM | SOCIAL STUDIES |
| B | NA | BIOGRAPHIES (FAMOUS PEOPLE) AND AUTOBIOGRAPHIES |
| B | NB | RELIGIOUS |
| B | NC | SPORTS (SKATE BOARDING, BASKETBALL, FOOTBALL) |
| B | ND | REFERENCE & ANSWER BOOKS (ATLAS, HISTORY) |
| B | NE | SCIENCE (ASTRONOMY, SOLAR SYSTEM) |
| B | NF | SET OF BOOKS |
| B | NG | COOKING BOOKS |
| B | NH | ARTS (DANCING, SINGING, DRAWING (CARTOON) |
| B | NI | ALPHABET |
| B | NJ | CARS (RACE CARS & TRUCKS) |
| B | NK | COMPUTERS |
| B | NL | MATHEMATICS |
| B | NM | BUSINESS (STOCK & THE COMMODITY MARKET) |
| B | NN | ANIMALS (INSECTS, ZOO, CIRCUS, REPTILES) |
| B | NO | INDIANS |
| B | NP | GOVERNMENT |
| B | NQ | PRINTING |
| B | NR | ELECTRONICS |
| B | NS | PROFESSIONS (LAW, ENGINEERING, ARCHITECT) |
| B | NT | TRANSPORTATION, (AVIATION, PLANES, TRAIN) |
| B | NU | RADIO & TV |
| B | NV | LIFE SKILLS - SURVIVAL SKILLS (CHILD SAFETY) |
| B | NW | ART & ACTIVITY BOOKS |
| B | NX | HOLIDAY BOOKS |
| B | NY | BOOK & CASSETTE |
| B | NZ | AUDIO TAPES (LULLABIES) |
| B | ZP | PARENT GUIDE BOOKS (REFERENCE BOOKS FOR) |
| B | ZA | PUZZLES, MAZES, CROSSWORDS |
| G | V1 | VIDEO GAMES |
| G | T2 | TRIVIA GAMES |
| G | B2 | PRE-SCHOOL GAMES |
| G | B1 | BOARD GAMES |
| G | A2 | ADULT GAMES |
| G | A1 | ACTION & SKILL GAMES (RETRIEVAL-ACTION) |
| G | T1 | TARGET GAMES |
| G | S1 | SPORTS RELATED GAMES |
| G | P3 | PUZZLES & PUZZLE ACCESS & TANGRAMS |
| G | P2 | POOL TABLE SUPPLIES & EQUIPMENT |
| G | P1 | POOL TABLES & ACTION TABLES (RETRIEVAL) |
| G | M1 | MAGIC SETS, TRICKS |
| G | M2 | MAGNETS & MAGNETIC GAMES |
| G | E3 | ELECTRONIC GAMES |
| G | E2 | EDUCATIONAL GAMES |
| G | D1 | DART GAMES & DARTS |
| G | C4 | COMPUTER PROGRAMS - GAMES (RETRIEVAL) |
| G | C3 | CROQUET SETS |
| G | C2 | CHECKERS, CHESS & DOMINOES |
| G | C1 | CARD GAMES & ACCESS |
| L | W4 | MATH MATERIALS |
| L | W3 | LANGUAGE MATERIALS |
| L | W2 | WALLSIGNS, PLAQUES, POSTERS, BORDERS |
| L | W1 | WORKBOOKS |
| L | T1 | TEXTILE FABRIC |
| L | S4 | SOUND DEVICES, TAPE RECORDERS |
| L | S2 | SHAPES |
| L | S1 | SCHOOL BAGS, SUPPLIES & STATIONARY ITEM) |

TABLE A1-continued

| Type | Sub-Code | Description (Class) |
|---|---|---|
| L | P3 | PHONOGRAPHS & RECORDS |
| L | P2 | PEN AND/OR PENCIL SETS |
| L | N1 | NUMBERS |
| L | M3 | MISSILES, ROCKETS, AIRPLANES, LAUNCHERS |
| L | M2 | MOTORS |
| L | M1 | MOTION CAMERAS, PROJECTIONS, FILM, VCR |
| L | L1 | LETTERS |
| L | H1 | HOBBY KITS AND HANDY CRAFTS, LEATHER CRAFTS |
| L | G2 | GLOBES, UNIVERSE, TELESCOPES & MAPS |
| L | E3 | ECOLOGY |
| L | E2 | ELECTRICITY & MAGNETISM |
| L | E1 | SCIENCE (DINOSAUR & ANIMALS) & CHEMISTRY |
| L | C4 | COMPUTER PROGRAMS - EDUCATIONAL |
| L | C3 | COSTUMES & MASKS |
| L | C2 | CASSETTES |
| L | B3 | BLACKBOARDS, DRAWING BOARDS - DESK TOP |
| L | B2 | CRITICAL THINKING |
| L | B1 | COLORS |
| L | A2 | ANIMALS (PLACEMATS) |
| L | A1 | ATHLETIC, AEROBIC GOODS, GYM, SPORTS |
| L | H2 | REFERENCE TOOLS & STUDY SKILLS |
| L | W5 | READING MATERIALS |
| L | W6 | SOCIAL STUDIES MATERIALS |
| L | W7 | MUSIC MATERIALS |
| L | W8 | AUDIO TAPES (REFER TO C2) |
| L | W9 | VIDEO |
| L | F1 | FOREIGN LANGUAGE MATERIALS |
| L | F2 | DOT TO DOT BOOKS (FOLLOWING DIRECTIONS) |
| L | F3 | KINDERGARTEN SKILLS (MAZES & PUZZLES) |
| L | F4 | PRE-SCHOOL SKILLS (MATCHING, CLASSIFY) |
| L | F5 | SAFETY |
| L | F6 | TELLING TIME |
| L | F7 | VISUAL PERCEPTION |
| L | F8 | LISTENING SKILLS |
| L | F9 | LIBRARY & DICTIONARY SKILLS |
| S | J1 | JUVENILE & NURSERY - LAMPS, PLAQUES |
| S | B1 | BLACKBOARDS, BULLETIN BOARDS, EASELS |
| S | C1 | TOY CHESTS |
| S | D1 | DESKS, TABLES, CHAIRS, CHILDRENS FURNITURE |
| S | P1 | PARTY FAVORS & SOUVENIRS |
| S | K1 | KITCHEN FURNITURE |
| S | R1 | ROCKING HORSE (RETRIEVAL - ROCKING H-R1) |
| S | V1 | VANITY & DRESSER FURNITURE |
| S | V2 | WOODEN STOOLS |
| S | V3 | SLED |
| S | W1 | WALKER/RIDE ON TOYS |
| T | A1 | AIRPLANES & ACCESS |
| T | A2 | ANIMALS & FIGURES |
| T | A3 | AUTOMOBILES JUVENILE |
| T | A4 | ANATOMY AND PHYSIOLOGY |
| T | A5 | ART SUPPLIES-(PAINTS, BRUSHES, CHALK) |
| T | A6 | ARCHITECTURE |
| T | B2 | BALLS |
| T | B3 | BANKS & CASH REGISTERS |
| T | B4 | BATTERY OPERATED TOYS |
| T | B5 | BEACH TOYS & BOATS |
| T | B6 | BEADS, BEADED DOLLS & TOYS |
| T | B7 | BINOCULARS & TELESCOPES |
| T | B8 | BLOCKS |
| T | B9 | BUBBLE PIPE SETS |
| T | C1 | CARS & TRUCKS |
| T | C2 | CHEMISTRY & MICROSCOPE SETS |
| T | C3 | CIRCUS TOYS |
| T | C4 | CONSTRUCTION TOYS & SETS (RETRIEVAL = CC) |
| T | C5 | COWBOY EQUIPMENT |
| T | D1 | DIE CAST VEHICLE |
| T | D2 | DOCTOR & NURSE KITS |
| T | D3 | DOLL BEDS, BASSINETS & CRADLES |
| T | D4 | DOLL CARRIAGES & STROLLERS |
| T | D5 | DOLL HOUSES & FURNITURE |
| T | D6 | DOLL OUTFITS & ACCESS |
| T | D7 | DOLL TRUNKS & SUITCASES |
| T | D8 | DOLLS - COLLECTOR OR FASHION |
| T | D9 | DINOSAURS |
| T | E1 | EDUCATIONAL TOYS |
| T | E2 | ELECTRIC & ELECTRONIC TOYS |
| T | F1 | FARM TOYS |
| T | H2 | HOLIDAY RELATED TOYS |
| T | H3 | HOUSEKEEPING TOYS (KITCHEN ITEMS) |
| T | H4 | HORSES - SPRINGS, STICKS |
| T | I1 | INDIAN TOYS & NOVELTIES |
| T | I3 | INFANT TOYS & NOVELTIES (TEETHERS) |
| T | I4 | INFLATABLE PLASTIC TOYS |
| T | K1 | KALEIDOSCOPES |
| T | K2 | KITES & ACCESS |
| T | M1 | MILITARY TOYS |
| T | M2 | MARBLES |
| T | M3 | MECHANICAL TOYS |
| T | M4 | METAL TOYS |
| T | M5 | MINIATURE TOYS |
| T | M6 | MISSILES, ROCKETS, LAUNCHERS - READY MADE |
| T | M7 | MOBILES |
| T | M9 | MUSICAL TOYS & INSTRUMENTS |
| T | P3 | PLUSH ANIMALS |
| T | P4 | POLICE SETS |
| T | P5 | PRE-SCHOOL TOYS |
| T | P6 | PRINTING TOYS & PRESSES |
| T | 07 | PUSH & PULL TOYS |
| T | P8 | PUPPETS & MARIONETTES |
| T | R1 | RADIO CONTROLLED ITEMS |
| T | R2 | RACING SETS & ACCESS |
| T | R3 | RELIGIOUS TOYS |
| T | S1 | SCIENCE TOYS & SETS (RETRIEVAL = SCIENCE) |
| T | S2 | SOLDIERS & FIGURES, TOYS |
| T | S3 | SAND & WATER TOYS |
| T | S4 | SOLAR POWERED TOY |
| T | S5 | SPACE TOYS |
| T | S6 | STUFFED TOYS |
| T | S7 | SESAME ST TOYS |
| T | T2 | TELEPHONE & TELEGRAPH SETS |
| T | T3 | TOOL SETS & CHESTS |
| T | T4 | TOPS |
| T | T5 | TOY CLOSEOUTS & PROMOTIONS |
| T | T6 | TRAIN ACCESS |
| T | T7 | TRAINS - ELECTRIC, MECHANICAL, WOOD |
| T | T8 | TRANSFORMERS |
| T | W1 | WALKIE TALKIES |
| T | W2 | YO-YOS |

The SPEF form is completed in Sections 3, 4, 5, and 6 in accordance with the characteristics as defined in Table A2 and using conditions for selection of the product characteristics as set out in Table A3.

TABLE A2

CHARACTERISTIC DEFINITION ON STANDARD PRODUCT EVALUATION FORM (SPEF)

3. LEARNING:

A-Auditory Reception  Listening or hearing.
B-Auditory Assoc.  Identifying the source of sound.

TABLE A2-continued

| | CHARACTERISTIC DEFINITION ON STANDARD PRODUCT EVALUATION FORM (SPEF) |
|---|---|
| C-Auditory Memory | Recalling what was heard. |
| D-Grammar or Letter Reversals | Syntax, linguistics, language. |
| E-Visual Reception | Seeing. |
| F-Visual Assoc. | Identifying the source of sight. |
| G-Visual Memory | Recalling what was seen. |
| H-Perceptual Constancy | Accurately perceiving the shape, size & position of objects. |
| I-Spatial Relationships | Right/left, dressing: buttons & zippers, time. |
| J-Eye/Hand Coordination | Tossing an item into a bucket, catching a ball, etc. |
| K-Balance | Walking a straight line heel to toe. |
| L-Verbal Expression | Speaking clearly; speaking in complete sentences. |
| M-Other | (Any characteristic about the product relating to learning or Physical deficits that is not already defined or identified in this group). |
| 4. EDUCATIONAL: | |
| Performance Level: A B C | A = Basic; B = Competency; C = Mastery |
| D-Math | Arithmetic concepts or numbers skills |
| E-Reading | Reading, comprehension, or letters, phonics skills |
| F-Science | Fiction and nonfiction systematic facts, principles, methods and skills in the natural sciences; biology, chemistry and physics or life skill |
| G-Language | Syntax, linguistic, grammar, poetry or communication skills |
| H-Social Studies | People, governments, societies or companionship and relationship skills |
| I-Art | (Fine Arts) painting, coloring, design, illustration, (abilities) puzzle, drawing and building skills |
| J-Music | Musical - vocal, instrumental, rythmatic |
| K-Other | (Any characteristic about an academic value that the product could relate to that is not already defined or identified in this group) |
| 5. INSTRUCTIONAL VARIABLES: | |
| B-Length of Time | (The amount of time that it should take on average to complete a cycled use of the product). If the time is undeterminable, this variable is entered as "open". This variable addresses attention span or deficit of a user. |
| C-No. of Factors | Multiplicity of tasks to be done while using the product |
| D-Performance Level_____ | Same as performance levels in the educational values |
| E-Communication/lang. clarity | Speaking, communicating, language interaction |
| F-Rapport/relationships/ socialization | The friendly connection among people or things; Companionships |
| G-Logic & Reasoning/Reaching Concl. Using Principles | Reaching conclusions using principles; inductive/deductive |
| H-Abstract Random Unpredictable | Chancey, incidental |
| I-Moral Religious Principles of Right and wrong | Principles of Right and Wrong |
| J-Sensory Awareness-Sight Sound, Touch, Taste & Smell | To perceive or detect through a bodily function |
| K-Mental Images | A visual impression; mental picture |
| L-Retention & Recall | To hold in memory |
| M-Imitate | Reproduce, repeat, copy, mimic, match, follow, model, echo, simulate |
| N-Sm. & Lg. Motor Actions | Tactile (touch) and kinesthetic (muscle feeling) |
| O-Pre-requisites required | A condition required before hand |
| P-Familiarity, Assoc., Resemblance | To connect, join, or unite in the mind a likeness |
| Q-Conceptualize-Beg. to understand | Beginning to understand the process, idea or design |
| R-Emotional Stimuli/Patience & intensity | Feeling, sensitivity, temperament, attitude, moving, stirring |
| S-Other | (Any characteristic about an instructional variable that the product could relate to that is not already defined or identified in this group). |
| 6. VALUES-PERSONAL TRAITS: | |
| A-Age | The chronological age range for which the product is suitable |
| B-Grade | The preschool or school grade level for which the product is suitable |
| C-Sex | The biological sex generally most likely to be satisfied using the product |
| D-Ethnic | The product characteristics that relate to a specific race, culture or ethnic group |
| E-Handed | Only if the product is specifically designed for the use on the right or left hand/arm, foot/leg, or eye/ear, of any user or has specific physical use limitations by any user |
| F-Other | (Any characteristic about the personal use aspects of the product that is not already defined or identified in this group). |

TABLE A3

CONDITION LEADING TO A SELECTION OF A CHARACTERISTIC FOR A PRODUCT

3. LEARNING:

| | |
|---|---|
| A-Auditory Reception | The use of this product requires hearing or listening ability of the user. |
| B-Auditory Assoc. | A characteristic value inherent in this product is associated with identifying where the sound is coming from or what it is that you are hearing. |
| C-Auditory Memory | A characteristic value inherent in this product is associated with auditory memory. |
| D-Grammar or Letter Reversals | A characteristic value inherent in this product is associated with language skills. |
| E-Visual Reception | The use of this product requires visual sight ability of the user. |
| F-Visual Association | A characteristic value inherent in this product is associated with identifying where the visualization is coming from or what it is that you are seeing. |
| G-Visual Memory | A characteristic value inherent in this product is associated with visual memory. |
| H-Perceptual Constancy | A characteristic value inherent in this product is associated with sizes, shapes and relativity of the position of objects to one another. |
| I-Spatial Relationships | A characteristic value inherent in this product is associated with the relationships of objects to each other. (e.i. sequence, near/far, up/down, above/below). |
| J-Eye/Hand Coordination | A characteristic value inherent in this product is associated with the synchronized movements of eye and hand in relationship to an object. |
| K-Balance | A characteristic value inherent in this product is associated with equilibrium, counterpoise. |
| L-Verbal Expression | A characteristic value inherent in this product is associated with lexical, vocabulary, phrasal, expressed. |
| M-Other | Any characteristic about the product relating to learning or physical deficits that is not already defined or identified in this group. |

4. EDUCATIONAL:

| | |
|---|---|
| Performance Level: A B C | Level of difficulty associated with the use of this product for the recommended age of the user and the purpose for which it was designed or intended. |
| D-Math | Product possesses the defined mathematical values in its characteristics. |
| E-Reading | Product possesses the defined reading values in its characteristics. |
| F-Science | Product possesses the defined science values in its characteristics. |
| G-Language | Product possesses the defined language values in its characteristics. |
| H-Social Studies | Product possesses the defined social studies values in its characteristics. |
| I-Art | Product possesses the defined art values in its characteristics. |
| J-Music | Product possesses the defined music values in its characteristics. |
| K-Other | (Any characteristic about an academic value that the product could relate to that is not already defined or identified in this group). |

5. INSTRUCTIONAL VARIABLES:

| | |
|---|---|
| B-Length of Time | (The amount of time that it should take on average to complete a cycled use of the product). If the time is undeterminable, this variable is entered as "open". This variable addresses attention span or deficit of a user. |
| C-No. of Factors | E.I., product is a puzzle to be assembled based on story read in accompanying book = 2 factors. |
| D-Performance Level_____ | If a product doesn't have education values, the levels of difficulty is identified here. |
| E-Communication/lang. clarity | The use of this product requires communicating and interaction between people. |
| F-Rapport/relationships/socialization | The use of this product will stimulate companionships and friendly connections among people or things. |
| G-Logic & Reasoning/Reaching Concl. Using Principles | The use of this product results in or requires reaching logical conclusions or stimulates reasoning skills. |
| H-Abstract Random Unpredictable | The use of this product requires use of imagination, or contains mysterious characteristics. |
| I-Moral Religious Principles of Right and Wrong | The use of this product will deal with a code of ethics or standards of life or religion. |
| J-Sensory Awareness-Sight, Sound, Touch, Taste & Smell | The use of this product requires the use of one or more bodily sensory functions. |
| K-Mental Images | A characteristic value inherent in this product will stimulate the mind to visualize people or things, such as a game that requires pictures to be drawn to describe an action or a thing. |

TABLE A3-continued

| | CONDITION LEADING TO A SELECTION OF A CHARACTERISTIC FOR A PRODUCT |
|---|---|
| L-Retention & Recall | The use of this product requires information to be held in visual or auditory memory subject to recall. |
| M-Imitate | A characteristic value inherent in this product requires the user to emulate by example. |
| N-Sm. & Lg. Motor Actions | The use of this product requires small manipulative touch (tactile) and/or large muscle (kinesthetic) use. |
| O-Pre-requisites required | This product requires prior experience or other knowledge before its use. |
| P-Familiarity, Assoc., Resemblance | A characteristic value inherent in this product is to match, unite or connect parts, pieces or ideas. |
| Q-Conceptualize-Beg. to understand | A characteristic value inherent in this product is designed for first time or inexperienced users. |
| R-Emotional Stimuli/Patience & intensity | The use of this product creates excitement and stimulates feelings & emotions or requires patience during use. |
| S-Other | (Any characteristic about an instructional variable that the product could relate to that is not already defined or identified in this group). |
| 6. VALUES-PERSONAL TRAITS: | |
| A-Age | Based on the relative safety and level of difficulty of the average user. |
| B-Grade | Based on the curriculum where the values of this product are normally dealt with. |
| C-Sex | Based on the norms or accepted sexual trends of a society where the product will be used. |
| D-Ethnic | Based on the norms or accepted ethnic and cultural tendencies of a society where the product will be used. |
| E-Handed | Only if the product is specifically designed for the use on the right or left hand/arm, foot/leg, or eye/ear, or any user or has specific physical use limitations by any user. |
| F-Other | (Any characteristic about the personal use aspects of the product the product that is not already defined or identified in this group). |

These identified characteristics (i.e., learning tool characterizing data) of the learning tools are then entered into the computer system 5, as shown at block 12 using a series of data entry screens (see Appendix II, screens IV-VI). Alternatively, the data may be initially entered directly into the computer system 5 using the screens. The entered data is then processed and sorted, thereby merging the data, as shown at block 14, into a Vendor data file 16 and storing the merged data on the mass storage device 8. A product data file 18 is also generated at block 14 and stored on the mass storage device 8. Each entry in the Vendor data file comprises vendor name, address, type and product information as illustrated in the example of a vendor listing shown in TABLE B. Other listings, reports, sorting of vendor data, and other data manipulation can be obtained within the data base structure using sorting and report writing options provided by the data base program (e.g., 4th DIMENSION).

TABLE B

© 1990 KDM Enterprises LTD.

| Company | Address | City | State | Zip | Phone | Retrieval |
|---|---|---|---|---|---|---|
| ACCELERATED DEVELOPMENT INC. PUB. | 3400 KILGORE AVE. | Muncie | IN | 47304 | (317) 284-7511 | BOOKS |
| ADDISON WESLEY PUBLISHING CO. | ROUTE 128 | Reading | MA | 01867 | 1-800-447-2226 | LEARNING MAT |
| ADICA-PONGO, INC. | P.O. BOX 1264 | Plattsburgh | NY | 12901 | 1-800-247-6144 | LEARNING MAT HOBBY KIT H1 MFGR |
| AKKLAIM ENTERTAINMENT INC. | 189 SOUTH ST. | Oyster Bay | NY | 11771 | (516) 922-2400 | TOYS NINTENDO GAM |
| AMERICAN GAMES | 16200 DALLAS PKWY | Dallas | TX | 75248 | 1-800-642-6202 | GAMES |
| AMERICAN TOY & FURNITURE CO., INC. | 8950 GROSS POINT RD. | Skokie | IL | 60077 | (312) 850-7977 | LEARNING MAT BLACKEDS-B3 MFGR TOYS |

Vendor data can also be entered separately (see Appendix II, screen II), as illustrated by block 15.

Each entry in the Product data file comprises information as illustrated in the example of a Product Matrix Listing shown in TABLE C.

TABLE C

© 1990 KDM Enterprises LTD.

| Code/Name/Avail | Personal Traits | Educational Value | Learning Value | Instructional Variables | Product Description |
|---|---|---|---|---|---|
| B009NDNRBG37 | H age: 8-12 | Perf Level: B | D-Grammar | Sight, Touch | NEWLY REVISED |

TABLE C-continued

© 1990 KDM Enterprises LTD.

| Code/Name/ Avail | Personal Traits | Educational Value | Learning Value | Instructional Variables | Product Description |
|---|---|---|---|---|---|
| DICTIONARY FOR CHILDREN $18.94 INTERNATIONAL PLAYTHINGS, INC. Avai: Cat: VM 76 156/2, | M grade: 3-7 I sex: A G ethnic: All O handed: A | G-Language | E-Visual Recpt F-Visual Assoc G-Visual Mem L-Verbal Expres Min-1 Max-1 | Length of time: 0 No. of Factors: 1 Pref Level: B E-Communication L-Retention | DICTIONARY FOR CHILDREN WITH OVER 35,000 ENTRIES & 1,100 FULL COLOR ILLUSTRATIONS |

The product data is cross-referenced to the vendor file by a vendor name identified when the data is entered.

The system 5, in response to an operator request, uses the data to generate vendor listings (such as shown in Table B), as illustrated at block 20 and to generate product maxtrix listings (such as shown in Table C), as illustrated at block 24. A simple inventory listing showing product name and code, vendor, and cost may also be generated from the Product Inventory data file 18, as illustrated at block 22. These listings can be either displayed on the monitor 4 or printed by the printer 6. The product data file information is also made available for matching as will be described hereinafter with reference to FIG. 2D.

FIG. 2B is a detailed flow diagram illustrating the methodology and structural flow for a specific routine for entry and compilation of individual child data. The process begins as illustrated at block 26 with completion of a two part questionnaire. The questionnaire in the illustrated embodiment is filled out by the parents or, if the child is old enough, by the child under the parents' supervision. The first section of the questionnaire is a Vital Information Profile (VIP). The VIP contains questions concerning the personal static information about the child and the child's family. This information is then entered into the computer, typically by a technical professional using a series of screens (see Appendix II, screens VIII-X), but may be entered directly in the computer without use of a written questionnaire. During entry of the data, an age equivalent is determined which is a modification of the chronological age of the child based upon an actual school grade and/or other developmental factors. For example, a child held back in school by one grade would have an age equivalent one less than chronological age, or a learning deficient child would have a reduced age equivalent to compensate appropriately for slowed development, etc. In matching products to the child, the age equivalent will normally be used in the illustrated embodiment, although in another embodiment, actual age may be used. An example of a suitable VIP questionnaire is shown in Table D.

TABLE D

© 1990 KDM Enterprises LTD. This form is copyright protected.

Vital Information Profile

Date_____

1. Participant's Full Name_____
   Address_____
   Day Phone No._____ Evening Phone No._____
   Relationship to user_____

2. Sponsor's Full Name_____
   Address_____
   Phone No._____ Type of Business_____

TABLE D-continued

3. Users Full Name_____
   Address_____
   Phone No._____ Date of Birth_____ Age_____ Male/Female_____
   Country of Birth_____
   Racial Influence or Cultural Preference_____
   Place in Family (Circle One): Only Child, First, Middle, Last Born
   Total Number of Children in Family_____ .

4. School's Full Name_____
   Grade in (or just completed)_____
   Address_____
   Phone No._____ Teacher's Names & Subjects_____

5A. Biological (Birth) Parents:
   i. Mother's Full Name_____Age_____
      Country of Birth_____Number of Years in this Country_____
      Occupation_____ ii. Father's Full Name_____ Age_____
      Country of Birth_____Number of Years in this Country_____
      Occupation_____ iii. Indicate if Biological Parents are: Separated_____
                                             Divorced_____ or
                                             Deceased_____

5B. Custodial Parents or Guardians: (If same as 5A above, Check here_____ and skip to question 6.)

i. Mother's Full Name_____ Age_____
      Country of Birth_____ Number of Years in this Country_____
      Occupation_____ ii. Father's Full Name_____ Age_____
      Country of Birth_____ Number of Years in this Country_____
      Occupation_____ iii. Indicate if Custodial Parents or Guardians are: Separated __
                                                        Divorced__ or Deceased__

6. Indicate the family structure in the home, with an (X) in which the User currently lives:

A____Mother        ____Step-mother     ____Legal Guardian
   B____Father        ____Step-father     ____Legal Guardian
   C____Grandmother   ____Grandfather     ____Aunt ____Uncle
   D____Brother       ____Sister ____Step-brother ____Step-sister
   E____Half-brother  ____Half-sister Specify any other family members_____

The second section of the questionnaire is a Preference Survey Model (PSM). The PSM contains questions concerning dynamic user developmental conditions such as the child's cognitive, social, emotional, and physical development, as well as medical conditions and nutritional habits, and the pregnancy and birthing events of the child and mother. There are three different PSM's designed for age groups zero to three years (PSM0-3), two to five years (PSM2-5), and six to fourteen years (PSM6-14). Children of ages two and three have both the PSM0-3 and the PSM2-5 completed because of the varying development and socio-economic differences that affect that age group. Examples of suitable PSM questionnaires are shown in Tables E1, E2 and E3.

TABLE E1

PSM0-3 for 0-3 Age Group

© 1990 KDM Enterprises LTD. This form is copyright protected.

Preference Survey Model (WRITE CLEARLY)

This form is designed to provide a permanent record of your child's developmental progress from birth to 36 months.

Please indicate child's age when activity was first performed:

1. Infant grasps and holds items in his/her hands _____
   Comment: _____

2. Infant fingers item with both hands _____
   Comment: _____

3. Infant hits at object that is suspended overhead _____
   Comment: _____

4. Infant's eyes follow moving objects or people _____
   Comment: _____

5. Infant likes to interact (socialize) with people _____
   Comment: _____

6. Infant responds to sounds _____
   Comment: _____

7. Baby turns over well by her/himself _____
   Comment: _____

8. Baby responds to sound of his/her own name when whispered from approximately 6-10 feet away _____
   Comment: _____

9. Baby makes contact with objects he/she hits at _____
   Comment: _____

10. Baby moves objects from hand to hand _____
    Comment: _____

11. Baby pulls him/herself to a near sitting position _____
    Comment: _____

12. Child sits up by her/himself _____
    Comment: _____

13. Child is uncomfortable with or fearful of strangers _____
    Comment: _____

14. Child understands words and responds when spoken to _____
    Comment: _____

15. Child speaks words or repeats sounds _____
    Comment: _____

16. Child crawls on level floors _____ on stairs _____
    Comment: _____

17. Child pulls him/herself up to a standing position _____
    Comment: _____

18. Child looks for toys she/he drops _____
    Comment: _____

19. Child walks steadily on level floors _____ on stairs _____
    Comment: _____

20. Child speaks in sentences _____
    Comment: _____

TABLE E1-continued

PSM0-3 for 0-3 Age Group

21. Child shows interest in playing and socializing with other children _____
    Comment: _____

22. Child safely rides in a small four wheeled wagon _____ on a tricycle _____
    Comment: _____

23. Child rolls or throws a ball to you _____
    Comment: _____

24. Child catches a ball that is rolled or thrown to him/her _____
    Comment: _____

25. Child frightens by objects that move electronically or under their own
    power _____
    Comment: _____

26. Child reads letters _____ words _____
    Comment: _____

27. Child engages in fantasy activities while alone _____ with others _____
    Comment: _____

28. Child does simple drawings _____ puzzles _____ building _____
    Comment: _____

29. Child interacts with peers as a leader _____ follower _____
    Comment: _____

30. Describe your child's dietary habits:

| | Yes | Mostly Yes | No | Mostly No |
|---|---|---|---|---|
| Sugar | | | | |
| Salt | | | | |
| Soda-Pop | | | | |
| Nutrasweet | | | | |
| Saccharin | | | | |
| Chocolate | | | | |
| Candy | | | | |
| Ice-cream | | | | |
| Cake & Cookies | | | | |

Please describe any special diet, allergies, or medication: _____

31. Does your child appear to have any problems with:

| | No | Yes | If Yes, Describe |
|---|---|---|---|
| Listening or hearing at 4 months and older | | | |
| Identifying the source of sound at 6 months and older | | | |
| Recalling what was said at 8 months and older | | | |
| Grammar or letter reversals at 24 months and older | | | |
| Seeing at 4 months and older | | | |
| Identifying the source of sight at 6 months and older | | | |
| Recalling what was seen at 8 months and older | | | |
| Accurately perceiving the shape, size and position of objects at 24 months and older | | | |
| Right/left, dressing: buttons and zippers at 24 months and older | | | |
| Tossing an item into a bucket, catching a ball, etc. at 24 months and older | | | |
| Walking straight line heel to toe at 24 months and older | | | |

TABLE E1-continued

PSM0-3 for 0-3 Age Group

Speaking clearly; speaking in complete sentences at 24 months and older _____ _____ _____

Motion sickness at 24 months and older _____ _____ _____

Middle (inner) ear at 4 months and older _____ _____ _____

Back or spine at 4 months and older _____ _____ _____

32. Pregnancy, birth, and infancy information:

A. Describe any special conditions that occurred during pregnancy or at the time or your child's birth: _____

B. Which infant formula did you choose for your child? _____

C. Check any of the following if they apply to your child's birth:

_____ Normal Delivery
   _____ Natural Childbirth
   _____ Cesarean Section
   _____ Induced Labor
   _____ Breach Delivery
   _____ Anesthetic - (circle one - Demoral, Epidural Block, Pericervical Block)

33. Take Action Now:

Is there a particular area of your child's development that you would like to address immediately? _____

TABLE E2

PSM2-5 for 2-5 Age Group

© 1990 KDM Enterprises LTD. This form is copyright protected.

Preference Survey Model
(WRITE CLEARLY)

7A. Family Relationships
   (Be sure that every comment line has an identifying X mark)

| | Mother | Father | Sister | Brother | Alone |
|---|---|---|---|---|---|
| This child is a person who ... | | | | | |
| enjoys being with my | _____ | _____ | _____ | _____ | _____ |
| frequently plays with | _____ | _____ | _____ | _____ | _____ |
| frequently reads with | _____ | _____ | _____ | _____ | _____ |
| asks for help from | _____ | _____ | _____ | _____ | _____ |

(Check only one answer)

| This child is a person who ... | Yes | Mostly Yes | No | Mostly No |
|---|---|---|---|---|
| enjoys being with a special aunt or uncle | _____ | _____ | _____ | _____ |
| enjoys being with a special grandmother or grandfather | _____ | _____ | _____ | _____ |

7B. Social relationships and moods:

| | Yes | Mostly Yes | No | Mostly No |
|---|---|---|---|---|
| enjoys companionship of other children | _____ | _____ | _____ | _____ |
| prefers playing alone | _____ | _____ | _____ | _____ |
| seems afraid to talk to people | _____ | _____ | _____ | _____ |
| gets mad if people laugh and poke fun at her/him | _____ | _____ | _____ | _____ |
| has a great deal of patience | _____ | _____ | _____ | _____ |

7C. Discipline and leadership style:
   lives up to commitments and responsi-

TABLE E2-continued

PSM2-5 for 2-5 Age Group bilities
always tries to cooperate
stays with an activity until it is completed
leads activities with playmates
uses time wisely
prefers to be alone
enjoys the game for the fun & not to win

| | All Day | Morning | Afternoon | Evening |
|---|---|---|---|---|
| 7D. Biological clock: | | | | |
| listens & understands better | | | | |
| reads & comprehends better | | | | |
| socializes better | | | | |

8. What is your child's knowledge of:

| | No Experience | Learning in Process | Has Basic Knowledge |
|---|---|---|---|
| Colors | | | |
| Alphabet | | | |
| Math | | | |
| Reading | | | |
| Time | | | |
| Right/Left | | | |
| Buttoning, zipping & tying shoes | | | |

9A. If your child attends a day care facility, how many hours per day? _____
How many days per week? _____

9B. What is your child's favorite activity at the facility? _____

9C. Can you bring toys and books to the facility for your child to use?
Yes _____ No _____

9D. Would a staff member spend time guiding or interacting with your child?
Yes _____ No _____

9E. Do other children interact with your child? Yes _____ No _____

10. How much time per day can you (or another family member) invest in your child?

| | Time in minutes |
|---|---|
| Playing | |
| Bathing | |
| Feeding | |
| Reading | |
| Other _____ | |

11. How much time per week does your child invest in the following organized activities?

| | Time in minutes |
|---|---|
| Gym (sports) | |
| Music | |
| Art | |
| Computer | |
| Library | |
| Other _____ | |

12. What would you like to do with your child if you had more free time? _____

13. Miscellaneous:

(A) What is your child's favorite quiet time activity? _____

(B) What is your child's favorite physical/sport activity? _____

(C) What kind of books:

(1) Does your child enjoy the most? _____
   (2) Does your child read alone? _____
   (3) Does child like read to her/him? _____

TABLE E2-continued
PSM2-5 for 2-5 Age Group (D) How do you and your child spend your leisure time together as a family? _____

(E) What kind of toys does your child enjoy the most? _____
        Why? _____

(F) What kind of games does your child enjoy the most? _____
        Why? _____

(G) 1. Name of child's favorite T.V. program _____
        2. Does he/she usually watch the entire program? Yes _____ No _____
        3. How many minutes long is the program? _____

(H) Child's approximate length of attention span in minutes at each sitting: Watching T.V. _____ Reading _____ Playing _____

(I) Child's favorite kind of audio record or cassette? _____
        Does your child usually listen to the entire record/cassette? _____

(J) Is your child short tempered (gets angry easily)? Yes _____ No _____

(K) Is your child timid (shy)? Yes _____ No _____ Assertive _____
        (confident)? Yes _____ No _____ Sociable (friendly)? Yes _____ No _____

(L) Does your child speak words? Yes _____ No _____ If yes, what are some of them? _____

Does your child speak sentences? Yes _____ No _____ If yes, are the sentences in the form of: Questions? _____ Comments? _____ Humor? _____

14. Do you have a personal computer in your home? Yes _____ No _____
    If yes, what model? _____
    Does your child already use this computer? Yes _____ No _____
    What kind of programs does your child use? _____

15. What instrument does your child play? _____
    How long has (s)he played? _____
    Describe playing ability: beginner _____ intermediate _____ advanced _____

16. Is your child right or left handed? _____

17. Does your child have any problems with:

| | No | Yes | If Yes, Describe |
|---|---|---|---|
| Auditory reception (listening or hearing) | _____ | _____ | _____ |
| Auditory association (identifying the source of sound) | _____ | _____ | _____ |
| Auditory memory (recalling what was said) | _____ | _____ | _____ |
| Grammar or letter reversals | _____ | _____ | _____ |
| Visual reception (seeing) | _____ | _____ | _____ |
| Visual association (identifying the source of sight) | _____ | _____ | _____ |
| Visual memory (recalling what was seen) | _____ | _____ | _____ |
| Perceptual Constancy (accurately perceiving the shape, size and position of objects) | _____ | _____ | _____ |
| Spatial relationships (right/left, dressing: buttons and zippers) | _____ | _____ | _____ |
| Eye/hand coordination (tossing an item into a bucket, catching a ball, etc.) | _____ | _____ | _____ |
| Balance (walking straight line heel to toe) | _____ | _____ | _____ |
| Verbal expression (speaking clearly; speaking in complete sentences) | _____ | _____ | _____ |

TABLE E2-continued

| PSM2-5 for 2-5 Age Group |

Motion sickness

Middle (inner) ear

Back or spine

18. DESCRIBE any medical history and current medical, physical, and/or psychological conditions of your child _____

19. IDENTIFY any special talents and abilities of your child _____

20. IDENTIFY any weaknesses and needs of your child _____

21. Describe your child's dietary habits:

| | Yes | Mostly Yes | No | Mostly No |
|---|---|---|---|---|
| Sugar | | | | |
| Salt | | | | |
| Soda-Pop | | | | |
| Nutrasweet | | | | |
| Saccharin | | | | |
| Sweets (Ice-cream, cake, cookies, candy) | | | | |

Special diets, allergies, or medications (DESCRIBE): _____

22. PREGNANCY, BIRTH, AND INFANCY INFORMATION:

A. Describe any special conditions that occurred during pregnancy or at the time of your child's birth: _____

B. What infant formula did you choose for your child? _____

C. Check which applies to your child's birth:

_____ Normal Delivery
   _____ Natural Childbirth
   _____ Cesarean Section
   _____ Induced Labor
   _____ Breach Delivery
   _____ Anesthetic - (circle one - Demoral, Epidural Block, Pericervical Block)

23. TAKE ACTION NOW:

Is there a particular area of your child's development that you would like to address immediately? _____

TABLE E3

| PSM6-14 for 6-14 Age Group |

© 1990 KDM Enterprises LTD. This form is copyright protected.

Preference Survey Model (WRITE CLEARLY)

7A. Family Relationships (Be sure that every comment line has an identifying X mark)

| I am a person who... | Alone | Mother | Father | Sister | Brother |
|---|---|---|---|---|---|
| enjoys being with my | | | | | |
| frequently argues with | | | | | |
| frequently plays with | | | | | |
| frequently does home- | | | | | |

TABLE E3-continued
PSM6–14 for 6–14 Age Group work with
frequently discusses school interests with
frequently discusses social interest with
frequently reads with (Check only one answer)

| I am a person who... | Yes | Mostly Yes | Mostly No | No |
|---|---|---|---|---|
| enjoys being with a special aunt or uncle | | | | |
| enjoys being with a special grandmother or grandfather | | | | |

7B. Social relationships

| | | | | |
|---|---|---|---|---|
| is loyal to friends | | | | |
| often feels quite lonesome | | | | |
| has difficulty staying friends with others | | | | |
| is often left out of activities others do | | | | |
| is popular with boys | | | | |
| is popular with girls | | | | |
| prefers playing alone | | | | |

7C. Discipline

| | | | | |
|---|---|---|---|---|
| lives up to commitments and is responsible | | | | |
| gets into trouble at school | | | | |
| is often punished by my parents | | | | |
| seldom fights with others | | | | |
| always tries to cooperate | | | | |
| stays with an activity until it is completed | | | | |
| loses interest in activities after a short time | | | | |

7D. Leadership and Conformity Style

| | | | | |
|---|---|---|---|---|
| is a good sport | | | | |
| wants to win all the time | | | | |
| enjoys the game for the fun and not to win | | | | |
| seems to always have problems | | | | |
| is a leader | | | | |
| prefers to follow the lead of others | | | | |
| wants to be the boss | | | | |

7E. Reality and Practicality

I am a person who...

| | | | | |
|---|---|---|---|---|
| always thinks I am right | | | | |
| holds grudges | | | | |
| seems afraid to talk to people | | | | |
| likes to get even with people | | | | |
| apologizes too much | | | | |
| talks too much | | | | |
| makes excuses | | | | |
| uses time wisely | | | | |
| prefers to be alone | | | | |

7F. Moods and Emotional Stability

| | | | | |
|---|---|---|---|---|
| is moody | | | | |
| blames others for things that go wrong | | | | |

TABLE E3-continued
PSM6-14 for 6-14 Age Group gets mad if other people disagree with me ___ ___ ___ ___
gets mad if other people laugh or poke fun at me ___ ___ ___ ___
quickly changes moods ___ ___ ___ ___
loves life and most things in it ___ ___ ___ ___
is short tempered ___ ___ ___ ___
has a lot of patience ___ ___ ___ ___
follows religious beliefs ___ ___ ___ ___

7G. Biological clock:

|  | ALL DAY | EARLY MORNING | MID DAY | AFTERNOON/ EVENING | AT NIGHT |
|---|---|---|---|---|---|
| listens/understands better | ___ | ___ | ___ | ___ | ___ |
| reads/comprehends better | ___ | ___ | ___ | ___ | ___ |
| socializes better | ___ | ___ | ___ | ___ | ___ |

8A. Hobbies (LIST the hobbies you pursue)

_____
_____

8B. TV (CIRCLE the kind of television programs you enjoy the most)

| Comedies | Sports | News |
| Cartoons | Mysteries | Documentaries |
| Monster Shows | Science Fiction | Movies |
| Westerns | Variety Shows | Adventure |
| Public Television | Educational | VCR Videos |
| Other_____ | | |

What are the names of the TV shows you like the best? _____
_____
Least? _____
How many hours a week do you spend watching television? _____

8C. Sports (CIRCLE the sports you enjoy playing)

| Baseball | Golf | Handball |
| Basketball | Bowling | Ice Skating |
| Football | Volleyball | Roller Skating |
| Jogging | Soccer | Swimming |
| Bicycling | Hockey | Boxing |
| Fishing | Tennis | Wrestling |
| Other_____ | | |

Now go back and put an X mark next to the sports you do not play yourself but enjoy watching.

8D. Reading (CIRCLE what you like to read)

| Comic Books | Animal Stories | Magazines |
| Mysteries | Humor | Newspapers |
| Romance | Stories about People | "How to" books |
| Adventure | History | Other_____ |

What is the name of the best book you have ever read? _____
_____

The worst book? _____

What is your favorite comic book? _____

8E. Miscellaneous:

1) How do you spend your time after school? _____
_____

2) How do you spend your time on weekends? _____
_____

3) What toys do you enjoy the most and why? _____
_____

TABLE E3-continued

PSM6-14 for 6-14 Age Group

4) What do you like to do the most and why? _____

5) What do you like to do the least and why? _____

6) Who is your real-life hero (heroine) and why? _____

7) Who is your favorite fictional hero (heroine) and why? _____

8) What is your favorite game and why? _____

9) What is your favorite movie? _____

10) What would you like to do if you had more free time? _____

11) What do you listen to on the radio? _____
    records?_____ tapes?_____

12) Do you have a personal computer at home?_____
    If yes, what model?_____ What do you use if for?_____
    _____ How many hours a
    week do you spend on your computer?_____

13) What instrument do you play?_____ For how long?_____ How
    well do you play (Circle) Poor    Fair    Good    Very Good    Excellent 14) Are you right or left handed?_____

8F. School

1) What is your favorite subject in school?_____

2) What subject do you like the least in school?_____

8G. Interests (CHECK the items that you would like to know more about)

| | | | |
|---|---|---|---|
| Auto Mechanics | Fairy Tales | History | Health |
| Television | Woodwork | Printing | Aviation |
| Famous People | Electricity | Electronics | Radio |
| Art | Music | Adventure | Dancing |
| Mystery | Foreign Lands | Poetry | Current Events |
| Comic Strips/Books | Riddles | Cowboys | Zoo Animals |
| Insects | Science | Transportation | Football |
| Skateboarding | Race Cars | Baseball | Cooking |
| Basketball | Hockey | Tennis | Soccer |
| Cars/Trucks | Monsters | Robots | Real Estate |
| Computers | Geography | Myths/Legends | Jokes |
| Word Search | Indians | Reptiles | The Circus |
| Detectives | Flowers/Plants | Nations | Space Travel |
| Farming | Astronomy | Singers | Engineering |
| Medicine | Banking | Advertising | Law |
| Mathematics | Government | Business | Architecture |
| Stock and the commodity markets | | Stories about people | |
| Communications | Other_____ | | |

(PARENTS SHOULD ASSIST FROM THIS POINT ON)

9. Does the user have any difficulties with:

| | No | Yes | If Yes, Describe |
|---|---|---|---|
| Auditory reception (listening or hearing) | ___ | ___ | _____ |
| Auditory association (identifying the source of sound) | ___ | ___ | _____ |
| Auditory memory (recalling what was said) | ___ | ___ | _____ |

TABLE E3-continued
PSM6-14 for 6-14 Age Group

| | | | |
|---|---|---|---|
| Grammar or Letter Reversals | ___ | ___ | _____ |
| Visual reception (seeing) | ___ | ___ | _____ |
| Visual association (identifying the source of sight) | ___ | ___ | _____ |
| Visual memory (recalling what was seen) | ___ | ___ | _____ |
| Perceptual Constancy (accurately perceiving the shape, size and position of objects) | ___ | ___ | _____ |
| Spatial relationships (right/left, dressing: buttons and zippers) | ___ | ___ | _____ |
| Eye/hand coordination (tossing an item into a bucket, catching a ball, etc.) | ___ | ___ | _____ |
| Balance (walking straight line heal to toe) | ___ | ___ | _____ |
| Verbal expression (speaking clearly; speaking in complete sentences) | ___ | ___ | _____ |
| Motion sickness | ___ | ___ | _____ |
| Middle (inner) ear | ___ | ___ | _____ |
| Back or spine | ___ | ___ | _____ |

10. DESCRIBE any medical history and current medical, physical, and/or psychological conditions _____
_____
_____

11. CHECK the user's learning level in each of the following academic categories: (Could be based on latest school report card)

| | BELOW GRADE LEVEL | GRADE LEVEL | ABOVE GRADE LEVEL |
|---|---|---|---|
| 1. Math | _____ | _____ | _____ |
| 2. Reading/Comprehension | _____ | _____ | _____ |
| 3. Science | _____ | _____ | _____ |
| 4. English Skills/Language | _____ | _____ | _____ |
| 5. Social Studies | _____ | _____ | _____ |
| 6. Art | _____ | _____ | _____ |
| 7. Music | _____ | _____ | _____ |
| 8. Other_____ | _____ | _____ | _____ |

12. IDENTIFY the user's very special talents and abilities _____
_____
_____

13. Also, IDENTIFY the user's weaknesses and needs _____
_____
_____

14. Describe user's dietary habits:

| | Yes | Mostly Yes | Mostly No | No |
|---|---|---|---|---|
| Sugar | ___ | ___ | ___ | ___ |
| Salt | ___ | ___ | ___ | ___ |
| Candy | ___ | ___ | ___ | ___ |
| Soda-Pop | ___ | ___ | ___ | ___ |
| Nutrasweet | ___ | ___ | ___ | ___ |
| Saccharin | ___ | ___ | ___ | ___ |

TABLE E3-continued
PSM6-14 for 6-14 Age Group

Special diets, allergies, or medication (DESCRIBE):_____

15. PREGNANCY, BIRTH, AND INFANCY INFORMATION:

A. Describe any special conditions that occurred during pregnancy or at the time of your child's birth:_____

B. What infant formula did you choose for your child?_____

C. Check which applies to your child's birth:

_____ Normal Delivery
      _____ Natural Childbirth
      _____ Cesarean Section
      _____ Induced Labor
      _____ Breach Delivery
      _____ Anesthetic - (circle one - Demoral, Epidural Block, Pericervical Block)

16. TAKE ACTION NOW:

Is there a particular area of your child's development that you would like to address immediately?_____

---

The information from the VIP and respective PSM's are then entered into the computer system 5, as illustrated at block 28. This information may also be entered directly instead of using a written form. Comments on the forms may be used by trained personnel to modify responses prior to entry. The computer system 5 then processes and sorts the entered data, as shown at block 30. Thus, the entered VIP data is merged into a VIP data file 32 stored on the mass storage device 8 and the entered PSM data is merged into a PSM data file 34 stored on the mass storage device 8. The VIP data and the PSM files for an individual child are cross-referenced by a user number.

The system 5 may generate a listing of the VIP data, as illustrated at block 36 and a listing of the PSM data as illustrated at block 38 for an individual child responsive to an operator request. These listings can be either displayed on the monitor 4 or printed by the printer 6. The VIP data and PSM data for an individual is also compiled for use in matching to product data (see FIG. 2D) and for generating a User Preference Analysis (see FIG. 2C), as shown by block 40.

Referring now to FIG. 2C, the computer system 5, as illustrated at block 41, retrieves data for an individual child from the compiled VIP data and the PSM data. The strengths, weaknesses, deficiencies, preferred interests, learning styles, and personal traits of the child are identified from the VIP and PSM data and a User Preference Analysis list is generated, as illustrated at block 41, which may be displayed on the monitor 4 or printed on the printer 6. The User Preference Analysis list summarizes the answers from the VIP and PSM and reports the current skill levels of the developmental and behavioral characteristics of the child in the categories listed in TABLE F.

TABLE F
(1) sensory learning style preferences (visual, auditory, tactile, etc.);
(2) hobbies, interests, talents, and sports;

TABLE F-continued
(3) academic conditions;
(4) medical conditions;
(5) social habits;
(6) emotional attitudes; and
(7) nutritional habits.

This User Preference Analysis list may be reviewed by a technical professional, as illustrated by block 42, and a User Preference Profile generated based upon the User Preference Analysis list, as illustrated at block 46. This User Preference Profile is a written report prepared by a technical professional analyzing the User Preference Analysis data. This report may then be reviewed and utilized by parents to aid in selection of learning tools.

FIG. 2D is a detailed block diagram illustrating the matching of Product Inventory data with compiled VIP/PSM data to generate a preferred product list. As illustrated at block 47 and 48, for an individual child, the computer system 5 retrieves data from the Product data file 18 (from FIG. 2A) and the compiled VIP/PSM data (from FIG. 2B) and performs a set of matching sequences. The sequences are processes which compare and match information and characteristics of the child with the characteristics of the products from the product data file, and each sequence makes product selections based upon different criteria. There are 45 to 57 sequences used in the illustrated embodiment depending on the age group, with 57 for the 0-3 age group, 49 for the 2-5 age group and 45 for the 6-14 age group. The sequences are listed in Tables G1 for the age group 0-3, G2 for the age group 2-5, and G3 for the age group 6-14. In each table G1, G2, and G3, there is first a sequence number followed by an indication of the VIP/PSM question (the question number on the VIP/PSM questionnaire is indicated in parentheses) for which respective answers are matched with product characteristics which are identified in the next column (i.e., SPEF characteristic indicated by the SPEF identifying number). The last column indicates a PNR code assigned. The source code setting out detail for each sequence in the illustrated embodiment are listed in Appendix IV for the 0-3 age group, Appendix V for the 2-4 age group, and Appendix VI for the 6-14 age group.

TABLE G1

MATCHING CRITERIA 0-3 SEQUENCING

| SEQ. NO. | VIP/PSM QUESTIONS | SPEF | PNR CODE |
|---|---|---|---|
| | PERSONAL TRAITS AND AGE EQUIVALENT[1] | | |
| 1. | Age Equivalent VIP (3) | 6A & 6B and other developmental stages of the child | |
| 2. | Sex VIP (3) | 6C | |
| 3. | Ethnic VIP (3) | 6D | |
| | EDUCATIONAL VALUES[2] | | |
| 4. | Numbers/Math | 4D | P |
| 5. | Alpha Letters/Reading | 4E | P |
| 6. | Life Skills/Science | 4F | P |
| 7. | Communication/Language | 4G | P |
| 8. | Relationships/Social Studies | 4H | P |
| 9. | Drawing, Puzzles & Bldg./Art | 4I | P |
| 10. | Music | 4J | P |
| 11. | Other | 4K | P |
| | LEARNING VALUES AND PHYSICAL VALUES[3] | | |
| 12. | Auditory Reception (31)A | 5J sound & 5M | N |
| 13. | Auditory Association (31)B | 5J sound & 5M or 5P | N |
| 14. | Auditory memory (31)C | 5J sound & 5M or 5K or 5L | N |
| 15. | Grammar (31)D | 5J sound & 5M or 5E | N |
| 16. | Visual Rec (31)E | 5J sight & 5M | N |
| 17. | Visual Assoc (31)F | 5J sight & 5M or 5P | N |
| 18. | Visual Memory (31)G | 5J sight & 5M or 5K or 5L | N |
| 19. | Percept. Constancy (31)H | 5J sight & 5K or 5L | N |
| 20. | Spatial Relationships (31)I | 5J sight & sound | N |
| 21. | Eye Hand Coord (31)J | 5J sight & touch & 5N | N |
| 22. | Balance (31)K | 5J sight & sound & 5N | N |
| 23. | Verbal Expression (31)L | 5J sight & sound & 5M or 5E | N |
| 24. | Reserved (Not Used) | | |

| Seq No. | Age Range Guide When Skill Normally is Performed | Child Development Stage or Skill Level Question in PSM | SPEF Characteristics | PNR Code |
|---|---|---|---|---|
| | | PLAY (EMOTIONAL) VALUES AND ENTERTAINMENT (SOCIAL) VALUES[4] | | |
| 25. | Infant 0-4 Months | Grasps items (1) | 5J touch | P or N |
| 26. | Infant 0-4 Months | Fingers items (2) | 5J touch | P or N |
| 27. | Infant 0-4 Months | Hits objects (3) | 5J touch or sound | P or N |
| 28. | Infant 0-4 Months | Eyes follow (4) | 5J sight | P or N |
| 29. | Infant 0-4 Months | Interacts (5) | 5J touch or sight | P or N |
| 30. | Infant 0-4 Months | Responds to sounds (6) | 5J sound | P or N |
| 31. | Baby 4-6 Months | Turns over (7) | 5N large motor | P or N |
| 32. | Baby 4-6 Months | Responds to name (8) | 5J sound | P or N |
| 33. | Baby 4-6 Months | Contact with objects (9) | 5J touch or sight | P or N |
| 34. | Baby 4-6 Months | Moves objects (10) | 5J touch | P or N |
| 35. | Baby 4-6 Months | Pulls to sitting position (11) | 5N large motor | P or N |
| 36. | Child 6-9 Months | Sits up (12) | 5N large motor | P or N |
| 37. | Child 6-9 Months | Fearful of strangers (13) | 5J sound or 5E | P or N |
| 38. | Child 6-9 Months | Understands words (14) | 5J sound or 5E or 4G | P or N |
| 39. | Child 6-9 Months | Speaks words (15) | 5J sound or 5E or 4G | P or N |
| 40. | Child 6-9 Months | Crawls floorw/stairs (16) | 5N large motor | P or N |
| 41. | Child 6-9 Months | Pulls to standing position (17) | 5N large motor | P or N |
| 42. | Child 6-9 Months | Looks for dropped toys (18) | 5J sight | P or N |
| 43. | Child 6-9 Months | Walks steadily (19) | 5N large motor | P or N |
| 44. | Child 14-24 Months | Speaks in sentences (20) | 5J sound or 5F | P or N |
| 45. | Child 14-24 Months | Plays with children (21) | 5J sound or sight or 5F | P or N |
| 46. | Child 14-24 Months | Rides wagon (22A) | 5N large motor | P or N |
| 47. | Child 14-24 Months | Rides tricycle (22B) | 5N large motor | P or N |
| 48. | Child 14-24 Months | Rolls/throws ball (23) | 5N large motor | P or N |
| 49. | Child 14-24 Months | Catches ball (24) | 5N large motor | P or N |
| 50. | Child 24-36 Months | Frightens by objects (25) | 5J sound and touch or 5F | P or N |
| 51. | Child 24-36 Months | Reads letters (26A) | 5J sight and 4E or 4G | P or N |
| 52. | Child 24-36 Months | Reads words (26B) | 5J sight and 4E or 4G | P or N |
| 53. | Child 24-36 Months | Fantasy activities alone (27A) | 4G and 5J sight or 5F or 5K | P or N |
| 54. | Child 24-36 Months | Fantasy activ. w/others (27B) | 4G and 5J sight or 5F or 5K | P or N |

TABLE G1-continued

| | | | | |
|---|---|---|---|---|
| 55. | Child 24–36 Months | Does drawings (28A) | 5J sight, touch and 5N small motor and 5K or 5P | P or N |
| 56. | Child 24–36 Months | Does puzzles (28B) | 5J sight, touch and 5N small motor and 5K or 5P | P or N |
| 57. | Child 24–36 Months | Does Building (28C) | 5J sight, touch and 5N small motor and 5K or 5P | P or N |
| 58. | Child 24–36 Months | Interacts with peers (29) | 5J sight, sound or 5F or 4G | P or N |

NOTES:

[1] The child's age (converted to an age equivalent), sex, and ethnic preference as answered on the VIP/PSM are matched to those same characteristics as identified on the SPEF resulting in the computer selection of products.

[2] All products selected in Sequence 1, 2, and 3 that are coded with the educational values identified in Sequences 4 through 11 are computer selected and identified with those educational values for all children in this age group.

[3] If the respective answer to any category in PSM question 31 indicates the child has a deficit in a learning or physical value, the computer will select product coded with characteristics (listed in column 2 (i.e., SPEF column) to the right of the specifically identified deficit value) from products already selected in Sequence 1, 2, and 3 that are age, sex, and ethnic suitable for that child.

[4] The answers to questions 1 through 29 on PSM0-3 identify the age of the child when (s)he first performed the skill described in each question. Products are computer selected based on specifically identified product characteristics matched with that question (i.e., listed in the SPEF characteristics column) and a "P" code is designated if the child already performs that skill or an "N" code is designated if the child does not yet perform that skill.

TABLE G2

MATCHING CRITERIA 2-5 SEQUENCING

| SEQ. NO. | VIP/PSM QUESTIONS | | PNR CODE |
|---|---|---|---|
| | | PERSONAL TRAITS AND AGE EQUIVALENT[1] | |
| 1. | Age Equivalent VIP (3) | 6A & 6B and other developmental stages or skill developments of the child | |
| 2. | Reserved (not used) | | |
| 3. | Sex VIP (3) | 6C | |
| 4. | Ethnic VIP (3) | 6D | |
| 5. | Handed PSM (16) | 6E | |
| | | EDUCATIONAL VALUES[2] | |
| 6. | Numbers/Math 8(3) | 4D | P |
| 7. | Alpha Letters/Reading 8(4) | 4E | P |
| 8. | Life Skills/Science 8(5) | 4F | P |
| 9. | Communication/Language 7B(3) | 4G | P |
| 10. | Relationships/Soc. Studies 7B(1) | 4H | P |
| 11. | Drawing, Puzzles & Bldg./Art 8(1) | 4I | P |
| 12. | Music 11(2) | 4J | P |
| 13. | Other | 4K | P |
| | | LEARNING VALUES AND PHYSICAL VALUES[3] | |
| 14. | Auditory Reception (17A) | 5J sound & 5M | N |
| 15. | Auditory Association (17B) | 5J sound & 5M or 5K | N |
| 16. | Auditory memory (17C) | 5J sound & 5M or 5K or 5L | N |
| 17. | Grammar (17D) | 5J sound & 5M or 5E | N |
| 18. | Visual Reception (17E) | 5J sight & 5M | N |
| 19. | Visual Assoc. (17F) | 5J sight & 5M or 5P | N |
| 20. | Visual Memory (17G) | 5J sight & 5M or 5K or 5L | N |
| 21. | Percept. Constancy (17H) | 5J sight & 5K or 5L | N |
| 22. | Spatial Relationships (17I) | 5J sight & sound | N |
| 23. | Eye/Hand Coord (17J) | 5J sight & touch & 5N | N |
| 24. | Balance (17K) | 5J sight & sound & 5N | N |
| 25. | Verbal Expression (17L) | 5J sight & sound & 5M or 5E | N |
| 26. | Reserved (Not Used) | | |
| | | PLAY (EMOTIONAL) VALUES AND ENTERTAINMENT (SOCIAL) VALUES[4] | |
| *27. | Plays 7A (2) | 5E or F and more than one participant ID | N |
| *28. | Plays Alone 7B (2) | 5E or F and more than one participant ID | N |
| *29. | Completes Activity 7C (3) | 5B or C or G or R | N |
| *30. | Prefers to be Alone 7C (6) | 5E or F & R and more than one participant ID | N |
| *31. | Game Fun 7C (7) | 5E or F & R and more than one participant ID | N |
| | | HOBBIES, INTERESTS, TALENTS, SPORTS (HITS)[5] | |
| 32. | Favorite Activity at School 9B | QUESTIONS 32-45, EXCEPT 40 & 41 MATCH | P |
| 33. | Favorite Quiet Time Activity 13(A) | THROUGH WORK SEARCH (i.e., SEARCH FOR WORDS | P |
| 34. | Favorite Sport Activity 13(B) | PRODIVED IN PSM ANSWERS) IN THE PRODUCT | R |
| 35. | Books Enjoy the Most 13(C) (1) | SUBCODES OR KEY WORDS IN THE PRODUCT | P |
| 36. | Leisure Time 13(D) | DESCRIPTION | P |
| 37. | Toys Enjoyed Most 13(E) | | P |
| 38. | Games Enjoyed Most 13(F) | | P |
| 39. | Favorite Record or Cassette 13(I) | | P |
| *40. | Child Speaks Words 13(L) (1) | 5E or 5F or 3L | N |
| *41. | Child Speaks Sentences 13 (L) (2) | 5E or 5F or 3L | N |

TABLE G2-continued

MATCHING CRITERIA 2-5 SEQUENCING

| SEQ. NO. | VIP/PSM QUESTIONS | | PNR CODE |
|---|---|---|---|
| *42. | Computer Model 14 | | P |
| *43. | Instrument Type 15 | | P |
| 44. | Special Talents & Abilities 19 | | P |
| 45. | Weaknesses and Needs 20 | | N |
| | PSYCHOLOGICAL - SOCIAL AND EMOTIONAL VALUES[6] | | |
| *46. | Afraid to Talk 7B (3) | 5E or 5F and more than one participant ID | N |
| *47. | Uses Time Wisely 7C (5) | 5B or 5G or 5H | N |
| *48. | Gets Angry Easily 13J | 5E or 5F and 5R | N |
| *49. | Shy 13K (1) | 5E or 5F and 5R | N |
| *50. | Confident 13 K (2) | 5E or 5F and 5R | N |
| *51. | Friendly 13 K (3) | 5E or 5F and 5R | N |

NOTES:
[1] The child's age (converted to an age equivalent), sex, and ethnic and handed preference as answered on the VIP/PSM are matched to those same characteristics as identified on the SPEF resulting in the computer selection of products.
[2] All products selected in Sequence 1, 3, 4, and 5 that are coded with the educational values identified in Sequences 6 through 13 are matched with the listed answers of specific questions on the PSM and are identified with a PNR code based on the skill level indicated by the answer.
[3] If the respective answer to any category in PSM question 17 indicates the child has a deficit in a learning or physical value, the computer in sequences 14-25 will select product coded with characteristics (in column 2 to the right of the specifically identified deficit value) from products already selected in Sequence 1, 3, 4, and 5 that are age, sex, ethnic, and handed suitable for that child.
[4,5&6] Pursuant to the respective answers to the specific questions on the PSM identified with each sequence 27-51, products are computer selected when those answers are matched with the specific product characteristics associated with those sequences or with key words (string selection) in the Product Subcodes or Product Descriptions.

TABLE G3

Matching Criteria 6-14 Sequencing

| SEQ. NO. | VIP/PSM QUESTIONS | SPEF | PNR CODE |
|---|---|---|---|
| | | PERSONAL TRAITS AND AGE EQUIVALENT[1] | |
| 1. | Age Equivalent VIP (3) | 6A & 6B and other developmental stages or skill developments of the child | |
| 2. | Reserved (not used) | | |
| 3. | Sex VIP (3) | 6C | |
| 4. | Ethnic VIP (3) | 6D | |
| 5. | Handed PSM 8E (14) | 6E | |
| | | EDUCATIONAL VALUES[2] | |
| 6. | Math 11 (1) | 4D | P or N |
| 7. | Reading 11 (2) | 4E | P or N |
| 6. | Science 11 (3) | 4F | P or N |
| 7. | Language 11 (4) | 4G | P or N |
| 8. | Social Studies 11 (5) | 4H | P or N |
| 9. | Art 11 (6) | 4I | P or N |
| 10. | Music 11 (7) | 4J | P or N |
| 11. | Other 11 (8) | 4K | P or N |
| | | LEARNING VALUES AND PHYSICAL VALUES[3] | |
| 12. | Auditory Reception (9A) | 5J sound & 5M | N |
| 13. | Auditory Association (9B) | 5J sound & 5M or 5P | N |
| 14. | Auditory Memory (9C) | 5J sound & 5M or 5K or 5L | N |
| 15. | Grammar (9D) | 5J sound & 5M or 5E | N |
| 16. | Visual Reception (9E) | 5J sight & 5M | N |
| 17. | Visual Assoc. (9F) | 5J sight & 5M or 5P | N |
| 18. | Visual Memory (9G) | 5J sight & 5M or 5K or 5L | N |
| 19. | Percept. Constancy (9H) | 5J sight & 5K or 5L | N |
| 20. | Spatial Relationships (9I) | 5J sight & sound | N |
| 21. | Eye/Hand Coord (9J) | 5J sight & touch & 5N | N |
| 22. | Balance (9K) | 5J sight & sound & 5N | N |
| 23. | Verbal Expression (9L) | 5J sight & sound & 5M or 5E | N |
| 24. | Reserved (Not Used) | | |
| | | PLAY (EMOTIONAL) VALUES AND ENTERTAINMENT (SOCIAL) VALUES[4] | |
| *27. | Plays 7A (1) | 5E or F and more than one participant ID | N |
| *28. | Plays Alone 7B (2) | 5E or F and more than one participant ID | N |
| *29. | Completes Activity 7C (3) | 5B or 5C or 5G or 5R | N |
| *30. | Game Fun 7D (7) | 5E or 5F & 5R and more than one participant ID | N |
| *31. | Good Sport 7D (3) | 5E or 5F & 5R and more than one participant ID | N |
| *32. | Prefers to be Alone 7E (9) | 5E or 5F & 5R and more than one participant ID | N |
| | | HOBBIES, INTERESTS, TALENTS, SPORTS (HITS)[5] | |
| 33. | Hobbies 8A | QUESTIONS 33-43: MATCH THROUGH WORD SEARCH | P |
| 34. | Reading 8D (1-12) | (i.e., SEARCH FOR WORDS PROVIDED IN PSM | P |
| 35. | Sports 8C (1-19) | ANSWERS) IN THE PRODUCT SUBCODES OR KEY | R |
| 36. | Toys Enjoyed Most 8E (3) | WORDS IN THE PRODUCT DESCRIPTIONS | P |

TABLE G3-continued

Matching Criteria 6-14 Sequencing

| SEQ. NO. | VIP/PSM QUESTIONS | SPEF | PNR CODE |
|---|---|---|---|
| 37. | Favorite Game 8e (8) | | P |
| 38. | Listen to 8E (11) (1) | | P |
| *39. | Computer 8E (12) | | P |
| *40. | Instrument 8E (13) (1) | | P |
| 41. | Interests 8G (1-35) | | P |
| 42. | Special Talents & Abilities 12 | | P |
| 43. | Weaknesses and Needs 13 | | N |
| *44. | Patience 7F (8) & (7) | 5R | N |
| *45. | Religious 7F (9) & (10) | 5I | R |
| *46. | Afraid to Talk 7E (1) & (2) | 5E or 5F and more than one participant ID | N |
| *47. | Uses Time Wisely 7E (8) & (7) | 5B or 5G or 5H | N |

NOTES:
[1] The child's age (converted to an age equivalent), sex, ethnic, and handed preference as answered on the VIP/PSM are matched to those same characteristics as identified on the SPEF resulting in the computer selection of products.
[2] All products selected in Sequence 1, 3, 4, and 5 that are coded with the educational values identified in Sequences 6 through 13 are matched with the corresponding answers of specific questions on the PSM and are identified with a PNR code based on the skill level indicated by the answer. If the answers to Question 11 indicate below grade level in any academic category, then the computer selects products at an age equivalent of one year younger than the age equivalent used in
sequence #1. If the answer is above grade level, than the computer will select products at an age equivalent of one year older than the age equivalent used in sequence #1. Otherwise, grade level will result in the computer selection using the sequence #1 age equivalent. Below grade level products will be coded "N". Grade level and above are coded "P".
[3] If the respective answer to any category in PSM question 9 indicates the child has a deficit in a learning or physical value, the computer will select product coded with characteristics (in column 2 to the right of the specifically identified deficit value) from products already selected in Sequence 1, 3, 4, and 5 that are age, sex, ethnic, and handed suitable for that child. A PNR code of N is assigned.
[4,5] Pursuant to the respective answers to the specific questions on the PSM identified with each sequence, products are computer selected when those answers are matched with the specific product characteristics associated with those sequences or with key words (string selection) in the Product Subcodes or Product Descriptions.

The sequences select products by first selecting all products from the product data file which match the individual child on the basis of age equivalency, sex, and ethnic background; and for older children, right or left handedness, as illustrated at block 47 and Tables G1, G2 and G3. Those selected products are then processed by additional sequences to allocate products into a series of categories, as illustrated at block 48 and Tables G1, G2, and G3. For the 0-3 age group, the categories are listed in Table H; for the 2-5 age group, the categories are listed in Table I; and for the 6-14 age group, the categories are listed in Table J.

For example, referring to Table G1, products are selected based upon the product data in the product data file for the personal traits and age equivalent category creating a file of all products with the proper age, sex, and ethnic characteristic for the individual child. Each one of those products is then matched to any of the educational values of the product by the sequences 4-11, and each product is coded for the identified values and assigned a "P" code representing positive reinforcement. Next, the learning/physical values sequences 12-23 check for a problem in each of the learning/physical value characteristics of the child from PSM question 17. If no deficit is indicated for the characteristics, no product is identified. If a deficit in a particular characteristic exists (e.g., Auditory Reception), then the sequence identifies the products for the first category which have that value and assigns an "N" for negative reinforcement. The play/entertainment values category sequences 25-58 are then performed to match child characteristics with product characteristics for products allocated in the first category. For these sequences, Table G1 shows the PSM question(s) being matched and the product characteristics being matched. Thus, for example, for sequence 25, question one of the PSM0-3 is matched with product data from section 5J of the product evaluation form (SPEF). As indicated, this sequence applies to a child of age equivalent 0-4 months. Sequences are not run for age equivalent levels below that assigned to a child, however, products are chosen for the child based upon an age suitability characteristic of the product ranging from three months less to six months greater than the age equivalent of the child. The Tables G1, G2 and G3 indicate in the last column the PNR code assigned to that sequence.

With regard to Tables G2, the processing of sequences in the first category is essentially similar to the first category of Table G1. The second and third categories are substantially similar except the PSM answers used are from various questions. The fourth category, play/entertainment Values, and fifth category, HITS, are processed substantially like the fourth category of Table G1, except that key word and string selection searches are also done in some sequences. Based upon the answer from the PSM question indicated immediately after the listed PSM question type (e.g., for Hobbies, the PSM question is 8A), the product characteristic listed in the second column is searched to identify product matches. A PNR code designation is also assigned as indicated in the last column in Table G2.

Table G3 shows the sequences for the six to fourteen age group wherein the sequences generally function substantially similar to those for the 2-5 age group, with the PSM question and product characteristics to be matched, and PNR codes to be assigned identified as they are identified in Table G2. In Tables G2 and G3, certain sequences (i.e., those marked with an asterisk) for play, entertainment, HITS and social and emotional values are based upon PSM questions with Yes/No type answers. These sequences select a product and designate a PNR code based upon a Yes or a No answer, and the opposite answer results in no selection being made.

The system then generates a Preferred Products List from the matches identified by the sequences, as illustrated by block 50, which may be listed on the monitor 4 or printed on the printer 6. The products in the Preferred Products List are listed in the separate categories which are shown on Tables H, I, and J. The Preferred Products List includes for each matched product a product code, a product name, the sequence that selected the product, the age and grade range for which the product is suitable, the price, and the instructional variables associated with the product.

The Preferred Product List also identifies each selected product with a "PNR" code wherein a "P" is used to designate products selected to enhance the child's strengths (i.e., positive reinforcement), an "N" is used to designate products selected to abate the child's weaknesses (i.e., negative reinforcement), and an "R" is used to designate products selected for recreation, fun, and entertainment or having religious significance (i.e., recreational tool).

For children ages zero to three, the categories are as follows:

TABLE H (1) age equivalency and personal traits;
(2) educational values;
(3) learning and physical values; and
(4) entertainment and play values.

For children age two to five the categories are as follows:

TABLE I (1) age equivalency and personal traits;
(2) educational values;
(3) learning and physical values;
(4) entertainment (social) values;
(5) Preferred HITS (hobbies, interests, talents, and sports); and
(6) play (medical, physical, psychological, and emotional) values.

For children age six to fourteen the categories are as follows:

TABLE J (1) personal traits;
(2) age equivalency;
(3) educational values;
(4) learning and physical values;
(5) entertainment (social) values;
(6) play (medical, physical, psychological, and emotional) values; and
(7) preferred HITS (hobbies, interests, talents, and sports).

The Preferred Products List and the Product Matrix Listing (Table C), which together with a User Preference Profile forms a Game Plan Analysis (GPA), are analyzed and reviewed by the parents. The parents make an informed selection of learning products from the computer generated Preferred Products List. The Product Matrix Listing and User Preference Profile may be used to assist in the final selection made from the Preferred Products List. The products chosen may be demonstrated to the parents, and then the parents may present and demonstrate the matched and selected products to the child resulting in important interaction between the parents and the child while the child benefits from the matched product values.

Appendixes I-VI are listings of the file structure, screens, and source code for a complete program for practice of the invention on a Macintosh Personal Computer (e.g., models: MAC SE, MAC SE30 or MAC PLUS) using the 4th Dimension database program. These listings and other portions of the disclosure of this patent document contain material which is subject to copyright protection. The copyright owner has no objection to the facsimile reproduction by anyone of the patent documents or the patent disclosure as it appears in the Patent and Trademark Office patent file, but otherwise reserves all copyright rights whatsoever.

Specific embodiments of novel methods and apparatus for automated learning tool selection have been described for the purposes of illustrating the manner in which the invention may be made and used. It should be understood that the implementation of other variations and modifications of the invention in its various aspects will be apparent to those skilled in art, and that the invention is not limited by the specific embodiments described. It is therefore contemplated to cover by the present invention any and all modifications, variations, or equivalents that fall within true spirit and scope of the basic underlying principles disclosed and claimed herein.

APPENDIX I
File Structure
Friday, September 28, 1990          Structure for KDM II
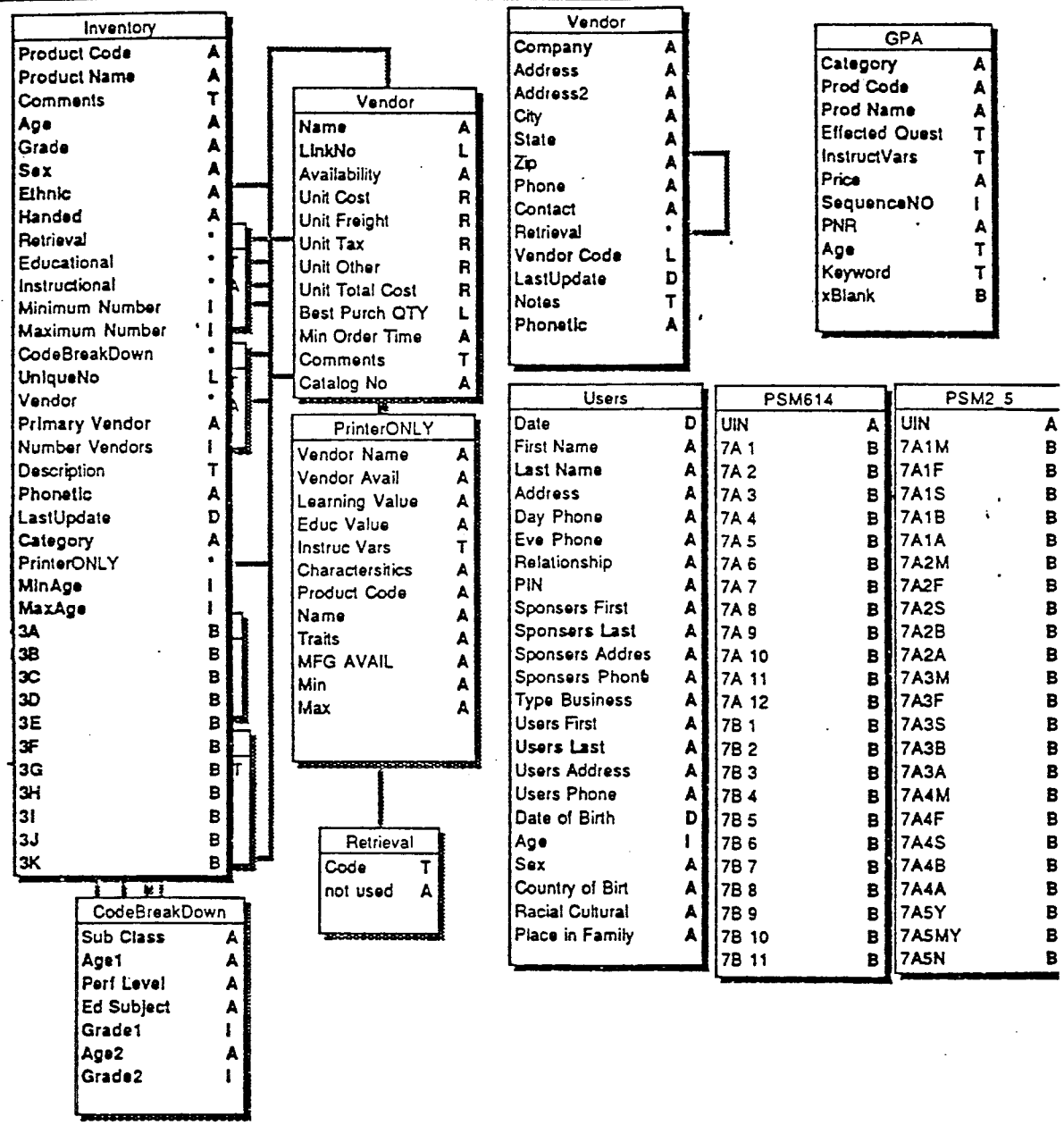

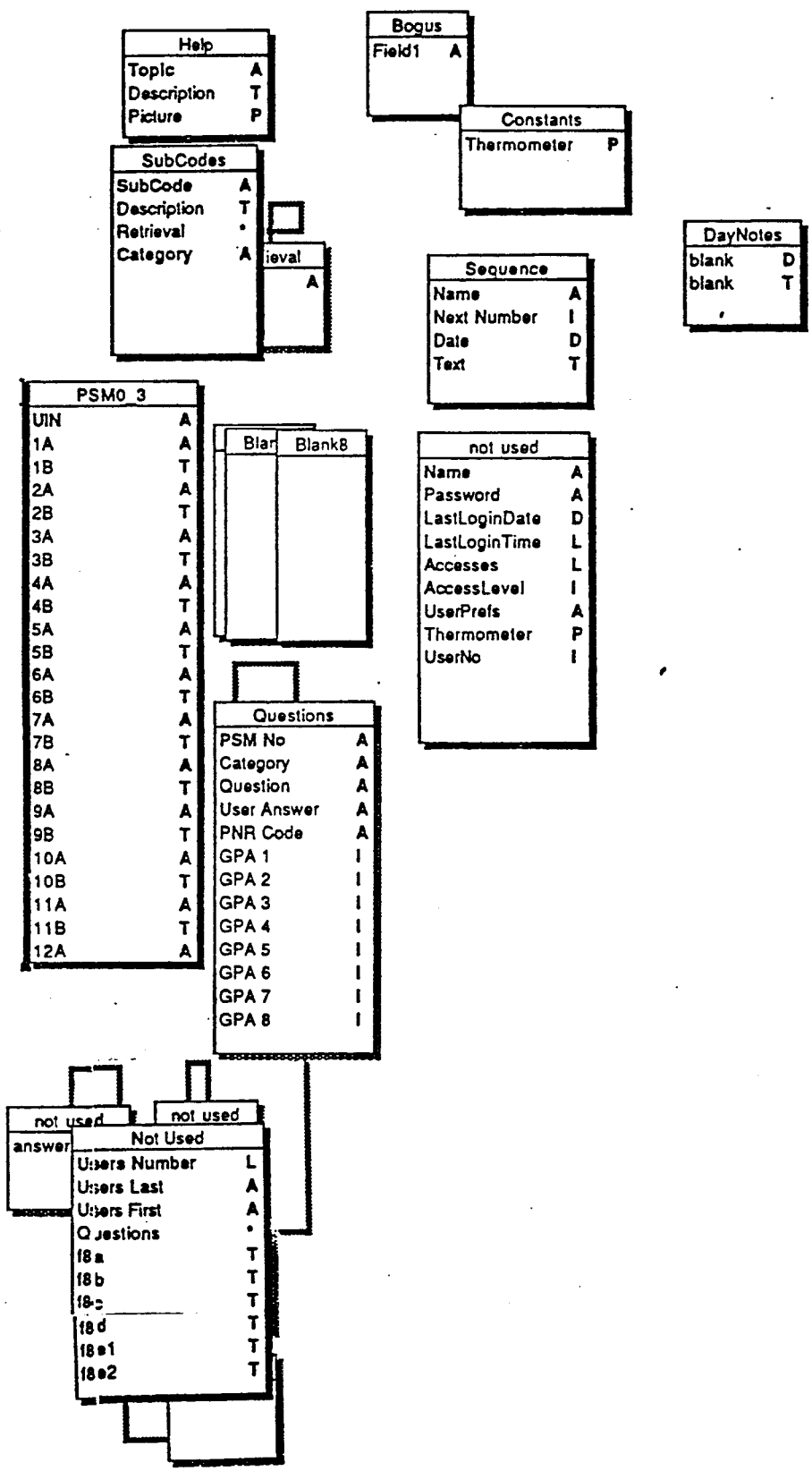

| Structure: Constants | | |
|---|---|---|
| Thermometer | Picture | Enterable; Modifiable |

| Structure: Sequence | | |
|---|---|---|
| Name | Alpha 20 | Indexed; Enterable; Modifiable |
| Next Number | Integer | Enterable; Modifiable |
| Date | Date | Enterable; Modifiable |
| Text | Text | Enterable; Modifiable |

| Structure: not used | | |
|---|---|---|
| Name | Alpha 20 | Indexed; Enterable; Modifiable |
| Password | Alpha 10 | Enterable; Modifiable |
| LastLoginDate | Date | Enterable; Modifiable |
| LastLoginTime | Long Integer | Enterable; Modifiable |
| Accesses | Long Integer | Enterable; Modifiable |
| AccessLevel | Integer | Enterable; Modifiable |
| UserPrefs | Alpha 20 | Enterable; Modifiable |
| Thermometer | Picture | Enterable; Modifiable |
| UserNo | Integer | Enterable; Modifiable |

| Structure: Help | | |
|---|---|---|
| Topic | Alpha 20 | Indexed; Enterable |
| Description | Text | Enterable |
| Picture | Picture | Enterable; Modifiable |

| Structure: Vendor | | |
|---|---|---|
| Company | Alpha 35 | Indexed; Enterable; Modifiable |
| Address | Alpha 20 | Enterable; Modifiable |
| Address2 | Alpha 20 | Enterable; Modifiable |
| City | Alpha 20 | Enterable; Modifiable |
| State | Alpha 2 | Enterable; Modifiable |
| Zip | Alpha 9 | Enterable; Modifiable |
| Phone | Alpha 15 | Enterable; Modifiable |
| Contact | Alpha 25 | Enterable; Modifiable |
| Retrieval | Subfile | |
| Vendor Code | Long Integer | Indexed; Unique; Enterable; Modifiable |
| LastUpdate | Date | Enterable; Modifiable |
| Notes | Text | Enterable; Modifiable |
| Phonetic | Alpha 4 | Indexed; Enterable; Modifiable |

| Structure: Retrieval | | |
|---|---|---|
| Code | Alpha 12 | Indexed; Enterable; Modifiable |

| Structure: Inventory | | |
|---|---|---|
| Product Code | Alpha 12 | Indexed; Unique; Enterable; Modifiable |
| Product Name | Alpha 38 | Indexed; Mandatory; Enterable; Modifiable |
| Comments | Text | Enterable; Modifiable |
| Age | Alpha 10 | Enterable; Modifiable |
| Grade | Alpha 6 | Enterable; Modifiable |
| Sex | Alpha 2 | Choices; Indexed; Enterable; Modifiable |
| Ethnic | Alpha 5 | Indexed; Enterable; Modifiable |
| Handed | Alpha 2 | Indexed; Enterable; Modifiable |
| Retrieval | Subfile | |
| Educational | Subfile | |
| Instructional | Subfile | |
| Minimum Number | Integer | Enterable; Modifiable |
| Maximum Number | Integer | Enterable; Modifiable |
| CodeBreakDown | Subfile | |
| UniqueNo | Long Integer | Indexed; Enterable; Modifiable |
| Vendor | Subfile | |
| Primary Vendor | Alpha 25 | Indexed; Modifiable |
| Number Vendors | Integer | Enterable; Modifiable |
| Description | Text | Enterable; Modifiable |
| Phonetic | Alpha 4 | Indexed; Enterable; Modifiable |
| LastUpdate | Date | Enterable; Modifiable |
| Category | Alpha 10 | Choices; Indexed; Enterable; Modifiable |
| PrinterONLY | Subfile | |
| MinAge | Integer | Indexed; Enterable; Modifiable |
| MaxAge | Integer | Indexed; Enterable; Modifiable |
| 3A | Boolean | Indexed; Enterable; Modifiable |
| 3B | Boolean | Indexed; Enterable; Modifiable |
| 3C | Boolean | Indexed; Enterable; Modifiable |
| 3D | Boolean | Indexed; Enterable; Modifiable |
| 3E | Boolean | Indexed; Enterable; Modifiable |
| 3F | Boolean | Indexed; Enterable; Modifiable |
| 3G | Boolean | Indexed; Enterable; Modifiable |
| 3H | Boolean | Indexed; Enterable; Modifiable |
| 3I | Boolean | Indexed; Enterable; Modifiable |
| 3J | Boolean | Indexed; Enterable; Modifiable |
| 3K | Boolean | Indexed; Enterable; Modifiable |
| 3L | Boolean | Indexed; Enterable; Modifiable |
| 3M | Alpha 20 | Indexed; Enterable; Modifiable |
| 4A | Boolean | Enterable; Modifiable |
| 4B | Boolean | Enterable; Modifiable |
| 4C | Boolean | Enterable; Modifiable |
| 4D | Boolean | Indexed; Enterable; Modifiable |
| 4E | Boolean | Indexed; Enterable; Modifiable |
| 4F | Boolean | Indexed; Enterable; Modifiable |
| 4G | Boolean | Indexed; Enterable; Modifiable |
| 4H | Boolean | Indexed; Enterable; Modifiable |
| 4I | Boolean | Indexed; Enterable; Modifiable |
| 4J | Boolean | Indexed; Enterable; Modifiable |
| 4K | Alpha 40 | Indexed; Enterable; Modifiable |
| 5B | Integer | Indexed; Enterable; Modifiable |
| 5C | Integer | Indexed; Enterable; Modifiable |
| 5D | Alpha 20 | Enterable; Modifiable |
| 5E | Boolean | Indexed; Enterable; Modifiable |
| 5F | Boolean | Indexed; Enterable; Modifiable |
| 5G | Boolean | Indexed; Enterable; Modifiable |
| 5H | Boolean | Indexed; Enterable; Modifiable |
| 5I | Boolean | Enterable; Modifiable |
| 5J | Boolean | Enterable; Modifiable |
| 5K | Boolean | Indexed; Enterable; Modifiable |
| 5L | Boolean | Indexed; Enterable; Modifiable |
| 5M | Boolean | Indexed; Enterable; Modifiable |
| 5N | Alpha 8 | Choices; Indexed; Enterable; Modifiable |
| 5O | Boolean | Enterable; Modifiable |
| 5P | Boolean | Indexed; Enterable; Modifiable |
| 5Q | Boolean | Enterable; Modifiable |
| 5R | Boolean | Indexed; Enterable; Modifiable |
| 5S | Text | Enterable; Modifiable |
| 6F | Text | Enterable; Modifiable |
| Max Participant | Integer | Indexed; Enterable; Modifiable |
| 2O | Alpha 15 | Enterable; Modifiable |
| 2P | Alpha 15 | Enterable; Modifiable |
| Sens Awareness | Alpha 10 | Enterable; Modifiable |
| Sight | Boolean | Indexed; Enterable; Modifiable |
| Sound | Boolean | Indexed; Enterable; Modifiable |
| Touch | Boolean | Indexed; Enterable; Modifiable |
| Taste | Boolean | Indexed; Enterable; Modifiable |
| Smell | Boolean | Indexed; Enterable; Modifiable |
| MatrixCol1 | Subfile | |
| Personal Traits | Subfile | |
| Notes | Text | Enterable; Modifiable |
| Key | Subfile | |
| Play Instruc | Text | Enterable; Modifiable |
| Retail Price | Real | Enterable; Modifiable |
| Min Participant | Integer | Indexed; Enterable; Modifiable |
| 4L | Boolean | Enterable; Modifiable |

| Structure: Retrieval | | |
|---|---|---|
| Code | Text | Enterable; Modifiable |
| not used | Alpha 2 | Enterable; Modifiable |

| Structure: Educational | | |
|---|---|---|
| Value | Text | Choices; Enterable; Modifiable |
| not used | Alpha 2 | Enterable; Modifiable |

| Structure: Instructional | | |
|---|---|---|
| Variables | Text | Enterable; Modifiable |
| not used | Alpha 2 | Enterable; Modifiable |

| Structure: CodeBreakDown | | |
|---|---|---|
| Sub Class | Alpha 2 | Indexed; Enterable; Modifiable |
| Age1 | Alpha 2 | Indexed; Enterable; Modifiable |
| Perf Level | Alpha 2 | Indexed; Enterable; Modifiable |
| Ed Subject | Alpha 2 | Indexed; Enterable; Modifiable |
| Grade1 | Integer | Indexed; Enterable; Modifiable |
| Age2 | Alpha 2 | Indexed; Enterable; Modifiable |
| Grade2 | Integer | Indexed; Enterable; Modifiable |

| Structure: Vendor | | |
|---|---|---|
| Name | Alpha 30 | Indexed; Enterable; Modifiable |
| LinkNo | Long Integer | Indexed; Enterable; Modifiable |
| Availability | Alpha 20 | Enterable; Modifiable |
| Unit Cost | Real | Enterable; Modifiable |
| Unit Freight | Real | Enterable; Modifiable |
| Unit Tax | Real | Enterable; Modifiable |
| Unit Other | Real | Enterable; Modifiable |
| Unit Total Cost | Real | Modifiable |
| Best Purch QTY | Long Integer | Enterable; Modifiable |
| Min Order Time | Alpha 20 | Enterable; Modifiable |
| Comments | Text | Enterable; Modifiable |
| Catalog No | Alpha 20 | Enterable; Modifiable |
| Page No | Alpha 6 | Enterable; Modifiable |

| Structure: PrinterONLY | | |
|---|---|---|
| Vendor Name | Alpha 25 | Enterable; Modifiable |
| Vendor Avail | Alpha 20 | Enterable; Modifiable |
| Learning Value | Alpha 20 | Enterable; Modifiable |
| Educ Value | Alpha 20 | Enterable; Modifiable |
| Instruc Vars | Text | Enterable; Modifiable |
| Charactersitics | Alpha 20 | Enterable; Modifiable |
| Product Code | Alpha 8 | Enterable; Modifiable |
| Name | Alpha 20 | Enterable; Modifiable |
| Traits | Alpha 20 | Enterable; Modifiable |
| MFG AVAIL | Alpha 20 | Enterable; Modifiable |
| Min | Alpha 3 | Enterable; Modifiable |
| Max | Alpha 3 | Enterable; Modifiable |

| Structure: MatrixCol1 | | |
|---|---|---|
| Value | Text | Enterable; Modifiable |

| Structure: Personal Traits | | |
|---|---|---|
| Value | Text | Enterable; Modifiable |

| Structure: Key | | |
|---|---|---|
| words | Alpha 20 | Indexed; Enterable; Modifiable |

| Structure: Users | | |
|---|---|---|
| Date | Date | Enterable; Modifiable |
| First Name | Alpha 20 | Enterable; Modifiable |
| Last Name | Alpha 20 | Indexed; Enterable; Modifiable |
| Address | Alpha 50 | Enterable; Modifiable |
| Day Phone | Alpha 14 | Enterable; Modifiable |
| Eve Phone | Alpha 14 | Enterable; Modifiable |
| Relationship | Alpha 30 | Enterable; Modifiable |
| PIN | Alpha 10 | Enterable; Modifiable |
| Sponsors First | Alpha 20 | Enterable; Modifiable |
| Sponsors Last | Alpha 30 | Indexed; Enterable; Modifiable |
| Sponsors Address | Alpha 50 | Enterable; Modifiable |
| Sponsors Phone | Alpha 14 | Enterable; Modifiable |
| Type Business | Alpha 30 | Enterable; Modifiable |
| Users First | Alpha 20 | Enterable; Modifiable |
| Users Last | Alpha 20 | Indexed; Enterable; Modifiable |
| Users Address | Alpha 50 | Enterable; Modifiable |
| Users Phone | Alpha 20 | Enterable; Modifiable |
| Date of Birth | Date | Enterable; Modifiable |
| Age | Integer | Enterable; Modifiable |
| Sex | Alpha 20 | Choices; Enterable; Modifiable |
| Country of Birt | Alpha 20 | Enterable; Modifiable |
| Racial Cultural | Alpha 30 | Enterable; Modifiable |
| Place in Family | Alpha 20 | Choices; Enterable; Modifiable |
| Total Children | Integer | Enterable; Modifiable |
| School | Alpha 40 | Enterable; Modifiable |
| School Address | Alpha 80 | Enterable; Modifiable |
| LIN | Alpha 10 | Enterable; Modifiable |
| Handed | Alpha 2 | Choices; Enterable; Modifiable |
| School Phone | Alpha 20 | Enterable; Modifiable |
| Teachers Name | Alpha 35 | Enterable; Modifiable |
| not used | Alpha 10 | Enterable; Modifiable |
| Grade | Alpha 2 | Enterable; Modifiable |
| BM Name | Alpha 30 | Enterable; Modifiable |
| BM Age | Integer | Enterable; Modifiable |
| BM Country | Alpha 20 | Enterable; Modifiable |
| BM Years | Integer | Enterable; Modifiable |
| BM Occupation | Alpha 30 | Enterable; Modifiable |
| BF Name | Alpha 20 | Enterable; Modifiable |
| BF Age | Integer | Enterable; Modifiable |
| BF Country | Alpha 30 | Enterable; Modifiable |
| BF Years | Integer | Enterable; Modifiable |
| BF Occupation | Alpha 20 | Enterable; Modifiable |
| BFM Status | Alpha 20 | Choices; Enterable; Modifiable |
| CM name | Alpha 20 | Enterable; Modifiable |
| CM Age | Integer | Enterable; Modifiable |
| CM Country | Alpha 20 | Enterable; Modifiable |
| CM Years | Integer | Enterable; Modifiable |
| CM Occupation | Alpha 20 | Enterable; Modifiable |
| CF Name | Alpha 30 | Enterable; Modifiable |
| CF Age | Integer | Enterable; Modifiable |
| CF Country | Alpha 20 | Enterable; Modifiable |
| CF Years | Integer | Enterable; Modifiable |
| CF Occupation | Alpha 20 | Enterable; Modifiable |
| CFM Status | Alpha 20 | Choices; Enterable; Modifiable |
| Fam Structure | Alpha 16 | Enterable; Modifiable |
| Other Members | Text | Enterable; Modifiable |
| Unique Number | Long Integer | Enterable; Modifiable |
| SIN | Alpha 10 | Enterable; Modifiable |
| UIN | Alpha 10 | Indexed; Unique; Mandatory; Enterable; Modifiable |
| Notes | Text | Enterable; Modifiable |
| GPA Visual | Text | Enterable; Modifiable |
| GPA Auditory | Text | Enterable; Modifiable |
| GPA Talents | Text | Enterable; Modifiable |
| GPA Interests | Text | Enterable; Modifiable |
| GPA Academic | Text | Enterable; Modifiable |
| GPA Medical | Text | Enterable; Modifiable |
| GPA Social | Text | Enterable; Modifiable |
| GPA Nutrition | Text | Enterable; Modifiable |
| Paragraph | Text | Enterable; Modifiable |
| 61 | Boolean | Enterable; Modifiable |
| 62 | Boolean | Enterable; Modifiable |
| 63 | Boolean | Enterable; Modifiable |
| 64 | Boolean | Enterable; Modifiable |

| | | |
|---|---|---|
| 6 5 | Boolean | Enterable; Modifiable |
| 6 6 | Boolean | Enterable; Modifiable |
| 6 7 | Boolean | Enterable; Modifiable |
| 6 8 | Boolean | Enterable; Modifiable |
| 6 9 | Boolean | Enterable; Modifiable |
| 6 10 | Boolean | Enterable; Modifiable |
| 6 11 | Boolean | Enterable; Modifiable |
| 6 12 | Boolean | Enterable; Modifiable |
| 6 13 | Boolean | Enterable; Modifiable |
| 6 14 | Boolean | Enterable; Modifiable |
| 6 15 | Boolean | Enterable; Modifiable |
| 6 16 | Boolean | Enterable; Modifiable |
| 5B | Boolean | Enterable; Modifiable |
| PSMChanged | Boolean | Enterable; Modifiable |
| MonthsOld | Integer | Enterable; Modifiable |
| Age Equiv | Alpha 2 | Choices; Mandatory; Enterable; Modifiable |
| Religion | Alpha 2 | Enterable; Modifiable |

| Structure: SubCodes | | |
|---|---|---|
| SubCode | Alpha 2 | Indexed; Enterable; Modifiable |
| Description | Text | Enterable; Modifiable |
| Retrieval | Subfile | |
| Category | Alpha 2 | Indexed; Enterable; Modifiable |

| Structure: Retrieval | | |
|---|---|---|
| Code | Alpha 20 | Indexed; Enterable; Modifiable |

| Structure: GPA | | |
|---|---|---|
| Category | Alpha 50 | Indexed; Enterable; Modifiable |
| Prod Code | Alpha 12 | Indexed; Enterable; Modifiable |
| Prod Name | Alpha 30 | Indexed; Enterable; Modifiable |
| Effected Quest | Text | Enterable; Modifiable |
| InstructVars | Text | Enterable; Modifiable |
| Price | Alpha 10 | Enterable; Modifiable |
| SequenceNO | Integer | Indexed; Enterable; Modifiable |
| PNR | Alpha 10 | Enterable; Modifiable |
| Age | Text | Enterable; Modifiable |
| Keyword | Text | Enterable; Modifiable |
| xBlank | Boolean | Enterable; Modifiable |

| Structure: PSM2_5 | | |
|---|---|---|
| UIN | Alpha 10 | Indexed; Unique; Enterable; Modifiable |
| 7A1M | Boolean | Enterable; Modifiable |
| 7A1F | Boolean | Enterable; Modifiable |
| 7A1S | Boolean | Enterable; Modifiable |
| 7A1B | Boolean | Enterable; Modifiable |
| 7A1A | Boolean | Enterable; Modifiable |
| 7A2M | Boolean | Enterable; Modifiable |
| 7A2F | Boolean | Enterable; Modifiable |
| 7A2S | Boolean | Enterable; Modifiable |
| 7A2B | Boolean | Enterable; Modifiable |
| 7A2A | Boolean | Enterable; Modifiable |
| 7A3M | Boolean | Enterable; Modifiable |
| 7A3F | Boolean | Enterable; Modifiable |
| 7A3S | Boolean | Enterable; Modifiable |
| 7A3B | Boolean | Enterable; Modifiable |
| 7A3A | Boolean | Enterable; Modifiable |
| 7A4M | Boolean | Enterable; Modifiable |
| 7A4F | Boolean | Enterable; Modifiable |
| 7A4S | Boolean | Enterable; Modifiable |
| 7A4B | Boolean | Enterable; Modifiable |
| 7A4A | Boolean | Enterable; Modifiable |
| 7A5Y | Boolean | Enterable; Modifiable |
| 7A5MY | Boolean | Enterable; Modifiable |
| 7A5N | Boolean | Enterable; Modifiable |
| 7A5MN | Boolean | Enterable; Modifiable |

| | | |
|---|---|---|
| 7A6Y | Boolean | Enterable; Modifiable |
| 7A6MY | Boolean | Enterable; Modifiable |
| 7A6N | Boolean | Enterable; Modifiable |
| 7A6MN | Boolean | Enterable; Modifiable |
| 7B1Y | Boolean | Enterable; Modifiable |
| 7B1MY | Boolean | Enterable; Modifiable |
| 7B1N | Boolean | Enterable; Modifiable |
| 7B1MN | Boolean | Enterable; Modifiable |
| 7B2Y | Boolean | Enterable; Modifiable |
| 7B2MY | Boolean | Enterable; Modifiable |
| 7B2N | Boolean | Enterable; Modifiable |
| 7B2MN | Boolean | Enterable; Modifiable |
| 7B3Y | Boolean | Enterable; Modifiable |
| 7B3MY | Boolean | Enterable; Modifiable |
| 7B3N | Boolean | Enterable; Modifiable |
| 7B3MN | Boolean | Enterable; Modifiable |
| 7B4Y | Boolean | Enterable; Modifiable |
| 7B4MY | Boolean | Enterable; Modifiable |
| 7B4N | Boolean | Enterable; Modifiable |
| 7B4MN | Boolean | Enterable; Modifiable |
| 7B5Y | Boolean | Enterable; Modifiable |
| 7B5MY | Boolean | Enterable; Modifiable |
| 7B5N | Boolean | Enterable; Modifiable |
| 7B5MN | Boolean | Enterable; Modifiable |
| 7C1Y | Boolean | Enterable; Modifiable |
| 7C1MY | Boolean | Enterable; Modifiable |
| 7C1N | Boolean | Enterable; Modifiable |
| 7C1MN | Boolean | Enterable; Modifiable |
| 7C2Y | Boolean | Enterable; Modifiable |
| 7C2MY | Boolean | Enterable; Modifiable |
| 7C2N | Boolean | Enterable; Modifiable |
| 7C2MN | Boolean | Enterable; Modifiable |
| 7C3Y | Boolean | Enterable; Modifiable |
| 7C3MY | Boolean | Enterable; Modifiable |
| 7C3N | Boolean | Enterable; Modifiable |
| 7C3MN | Boolean | Enterable; Modifiable |
| 7C4Y | Boolean | Enterable; Modifiable |
| 7C4MY | Boolean | Enterable; Modifiable |
| 7C4N | Boolean | Enterable; Modifiable |
| 7C4MN | Boolean | Enterable; Modifiable |
| 7C5Y | Boolean | Enterable; Modifiable |
| 7C5MY | Boolean | Enterable; Modifiable |
| 7C5N | Boolean | Enterable; Modifiable |
| 7C5MN | Boolean | Enterable; Modifiable |
| 7C6Y | Boolean | Enterable; Modifiable |
| 7C6MY | Boolean | Enterable; Modifiable |
| 7C6N | Boolean | Enterable; Modifiable |
| 7C6MN | Boolean | Enterable; Modifiable |
| 7C7Y | Boolean | Enterable; Modifiable |
| 7C7MY | Boolean | Enterable; Modifiable |
| 7C7N | Boolean | Enterable; Modifiable |
| 7C7MN | Boolean | Enterable; Modifiable |
| 7D1A | Boolean | Enterable; Modifiable |
| 7D1M | Boolean | Enterable; Modifiable |
| 7D1N | Boolean | Enterable; Modifiable |
| 7D1E | Boolean | Enterable; Modifiable |
| 7D2A | Boolean | Enterable; Modifiable |
| 7D2M | Boolean | Enterable; Modifiable |
| 7D2N | Boolean | Enterable; Modifiable |
| 7D2E | Boolean | Enterable; Modifiable |
| 7D3A | Boolean | Enterable; Modifiable |
| 7D3M | Boolean | Enterable; Modifiable |
| 7D3N | Boolean | Enterable; Modifiable |
| 7D3E | Boolean | Enterable; Modifiable |
| 81N | Boolean | Enterable; Modifiable |
| 81L | Boolean | Enterable; Modifiable |
| 81K | Boolean | Enterable; Modifiable |
| 82N | Boolean | Enterable; Modifiable |
| 82L | Boolean | Enterable; Modifiable |
| 82K | Boolean | Enterable; Modifiable |
| 83N | Boolean | Enterable; Modifiable |
| 83L | Boolean | Enterable; Modifiable |
| 83K | Boolean | Enterable; Modifiable |
| 84N | Boolean | Enterable; Modifiable |
| 84L | Boolean | Enterable; Modifiable |
| 84K | Boolean | Enterable; Modifiable |
| 85N | Boolean | Enterable; Modifiable |
| 85L | Boolean | Enterable; Modifiable |
| 85K | Boolean | Enterable; Modifiable |
| 86N | Boolean | Enterable; Modifiable |
| 86L | Boolean | Enterable; Modifiable |
| 86K | Boolean | Enterable; Modifiable |
| 87N | Boolean | Enterable; Modifiable |

| | | |
|---|---|---|
| 87L | Boolean | Enterable; Modifiable |
| 87K | Boolean | Enterable; Modifiable |
| 17_15 | Alpha 44 | Enterable; Modifiable |
| 21_diets | Text | Enterable; Modifiable |
| 9A1 | Real | Enterable; Modifiable |
| 9A2 | Real | Enterable; Modifiable |
| 9B | Text | Enterable; Modifiable |
| 9C | Boolean | Enterable; Modifiable |
| 9D | Boolean | Enterable; Modifiable |
| 9E | Boolean | Enterable; Modifiable |
| 10A1 | Integer | Enterable; Modifiable |
| 10A2 | Integer | Enterable; Modifiable |
| 10A3 | Integer | Enterable; Modifiable |
| 10A4 | Integer | Enterable; Modifiable |
| 10A5 | Integer | Enterable; Modifiable |
| 10A5other | Alpha 20 | Enterable; Modifiable |
| 11A1 | Integer | Enterable; Modifiable |
| 11A2 | Integer | Enterable; Modifiable |
| 11A3 | Integer | Enterable; Modifiable |
| 11A4 | Integer | Enterable; Modifiable |
| 11A5 | Integer | Enterable; Modifiable |
| 11A6 | Integer | Enterable; Modifiable |
| 11A6other | Alpha 20 | Enterable; Modifiable |
| 12_A | Text | Enterable; Modifiable |
| 13A | Alpha 30 | Enterable; Modifiable |
| 13B | Alpha 30 | Enterable; Modifiable |
| 13C1 | Alpha 30 | Enterable; Modifiable |
| 13C2 | Alpha 30 | Enterable; Modifiable |
| 13C3 | Alpha 30 | Enterable; Modifiable |
| 13_D | Text | Enterable; Modifiable |
| 13E1 | Text | Enterable; Modifiable |
| 13E_2 | Text | Enterable; Modifiable |
| 13F1 | Alpha 30 | Enterable; Modifiable |
| 13F_2 | Text | Enterable; Modifiable |
| 13G1 | Alpha 30 | Enterable; Modifiable |
| 13G2 | Boolean | Enterable; Modifiable |
| 13G3 | Real | Enterable; Modifiable |
| 13H1 | Real | Enterable; Modifiable |
| 13H2 | Real | Enterable; Modifiable |
| 13H3 | Real | Enterable; Modifiable |
| 13I1 | Alpha 30 | Enterable; Modifiable |
| 13I2 | Alpha 20 | Enterable; Modifiable |
| 13J | Boolean | Enterable; Modifiable |
| 13K1 | Boolean | Enterable; Modifiable |
| 13K2 | Boolean | Enterable; Modifiable |
| 13K3 | Boolean | Enterable; Modifiable |
| 13L1 | Boolean | Enterable; Modifiable |
| 13L2 | Text | Enterable; Modifiable |
| 13L3 | Boolean | Enterable; Modifiable |
| 13L4 | Boolean | Enterable; Modifiable |
| 13L5 | Boolean | Enterable; Modifiable |
| 13L6 | Boolean | Enterable; Modifiable |
| 14A1 | Boolean | Enterable; Modifiable |
| 14A2 | Alpha 30 | Enterable; Modifiable |
| 14A3 | Boolean | Enterable; Modifiable |
| 14A4 | Text | Enterable; Modifiable |
| 15A1 | Alpha 20 | Enterable; Modifiable |
| 15A2 | Alpha 20 | Enterable; Modifiable |
| 15A3 | Alpha 20 | Choices; Enterable; Modifiable |
| 16A1 | Alpha 2 | Choices; Enterable; Modifiable |
| 17_1 | Alpha 44 | Enterable; Modifiable |
| 17_2 | Alpha 44 | Enterable; Modifiable |
| 17_3 | Alpha 44 | Enterable; Modifiable |
| 17_4 | Alpha 44 | Enterable; Modifiable |
| 17_5 | Alpha 44 | Enterable; Modifiable |
| 17_6 | Alpha 44 | Enterable; Modifiable |
| 17_7 | Alpha 44 | Enterable; Modifiable |
| 17_8 | Alpha 44 | Enterable; Modifiable |
| 17_9 | Alpha 44 | Enterable; Modifiable |
| 17_10 | Alpha 44 | Enterable; Modifiable |
| 17_11 | Alpha 44 | Enterable; Modifiable |
| 17_12 | Alpha 44 | Enterable; Modifiable |
| 17_13 | Alpha 44 | Enterable; Modifiable |
| 17_14 | Alpha 44 | Enterable; Modifiable |
| 18A_1 | Text | Enterable; Modifiable |
| 19A_1 | Text | Enterable; Modifiable |
| 20A_1 | Text | Enterable; Modifiable |
| 211Y | Boolean | Enterable; Modifiable |
| 211MY | Boolean | Enterable; Modifiable |
| 211N | Boolean | Enterable; Modifiable |
| 211MN | Boolean | Enterable; Modifiable |
| 212Y | Boolean | Enterable; Modifiable |
| 212MY | Boolean | Enterable; Modifiable |

| | | |
|---|---|---|
| 212N | Boolean | Enterable; Modifiable |
| 212MN | Boolean | Enterable; Modifiable |
| 213Y | Boolean | Enterable; Modifiable |
| 213MY | Boolean | Enterable; Modifiable |
| 213N | Boolean | Enterable; Modifiable |
| 213MN | Boolean | Enterable; Modifiable |
| 214Y | Boolean | Enterable; Modifiable |
| 214MY | Boolean | Enterable; Modifiable |
| 214N | Boolean | Enterable; Modifiable |
| 214MN | Boolean | Enterable; Modifiable |
| 215Y | Boolean | Enterable; Modifiable |
| 215MY | Boolean | Enterable; Modifiable |
| 215N | Boolean | Enterable; Modifiable |
| 215MN | Boolean | Enterable; Modifiable |
| 216Y | Boolean | Enterable; Modifiable |
| 216MY | Boolean | Enterable; Modifiable |
| 216N | Boolean | Enterable; Modifiable |
| 216MN | Boolean | Enterable; Modifiable |
| 22_A | Text | Enterable; Modifiable |
| 22_B | Text | Enterable; Modifiable |
| 22C1 | Boolean | Enterable; Modifiable |
| 22C2 | Boolean | Enterable; Modifiable |
| 22C3 | Boolean | Enterable; Modifiable |
| 22C4 | Boolean | Enterable; Modifiable |
| 22C5 | Boolean | Enterable; Modifiable |
| 22C6 | Boolean | Enterable; Modifiable |
| Create Date | Date | Enterable; Modifiable |
| Last Update | Date | Enterable; Modifiable |
| ImmediateDev | Text | Enterable; Modifiable |
| 22C7 | Boolean | Enterable; Modifiable |
| 22C8 | Boolean | Enterable; Modifiable |
| 22C9 | Boolean | Enterable; Modifiable |

| Structure: DayNotes | | |
|---|---|---|
| blank | Date | Enterable; Modifiable |
| blank | Text | Enterable; Modifiable |

| Structure: PSM0_3 | | |
|---|---|---|
| UIN | Alpha 10 | Indexed; Unique; Enterable; Modifiable |
| 1A | Alpha 10 | Enterable; Modifiable |
| 1B | Text | Enterable; Modifiable |
| 2A | Alpha 10 | Enterable; Modifiable |
| 2B | Text | Enterable; Modifiable |
| 3A | Alpha 10 | Enterable; Modifiable |
| 3B | Text | Enterable; Modifiable |
| 4A | Alpha 10 | Enterable; Modifiable |
| 4B | Text | Enterable; Modifiable |
| 5A | Alpha 10 | Enterable; Modifiable |
| 5B | Text | Enterable; Modifiable |
| 6A | Alpha 10 | Enterable; Modifiable |
| 6B | Text | Enterable; Modifiable |
| 7A | Alpha 10 | Enterable; Modifiable |
| 7B | Text | Enterable; Modifiable |
| 8A | Alpha 10 | Enterable; Modifiable |
| 8B | Text | Enterable; Modifiable |
| 9A | Alpha 10 | Enterable; Modifiable |
| 9B | Text | Enterable; Modifiable |
| 10A | Alpha 10 | Enterable; Modifiable |
| 10B | Text | Enterable; Modifiable |
| 11A | Alpha 10 | Enterable; Modifiable |
| 11B | Text | Enterable; Modifiable |
| 12A | Alpha 10 | Enterable; Modifiable |
| 12B | Text | Enterable; Modifiable |
| 13A | Alpha 10 | Enterable; Modifiable |
| 13B | Text | Enterable; Modifiable |
| 14A | Alpha 10 | Enterable; Modifiable |
| 14B | Text | Enterable; Modifiable |
| 15A | Alpha 10 | Enterable; Modifiable |
| 15B | Text | Enterable; Modifiable |
| 16A | Alpha 10 | Enterable; Modifiable |
| 16B | Alpha 10 | Enterable; Modifiable |
| 16C | Text | Enterable; Modifiable |
| 17A | Alpha 10 | Enterable; Modifiable |
| 17B | Text | Enterable; Modifiable |

| | | |
|---|---|---|
| 18A | Alpha 10 | Enterable; Modifiable |
| 18B | Text | Enterable; Modifiable |
| 19A | Alpha 10 | Enterable; Modifiable |
| 19B | Alpha 10 | Enterable; Modifiable |
| 19C | Text | Enterable; Modifiable |
| 20A | Alpha 10 | Enterable; Modifiable |
| 20B | Text | Enterable; Modifiable |
| 21A | Alpha 10 | Enterable; Modifiable |
| 21B | Text | Enterable; Modifiable |
| 22A | Alpha 10 | Enterable; Modifiable |
| 22B | Alpha 10 | Enterable; Modifiable |
| 22C | Text | Enterable; Modifiable |
| 23A | Alpha 10 | Enterable; Modifiable |
| 23B | Text | Enterable; Modifiable |
| 24A | Alpha 10 | Enterable; Modifiable |
| 24B | Text | Enterable; Modifiable |
| 25A | Alpha 10 | Enterable; Modifiable |
| 25B | Text | Enterable; Modifiable |
| 26A | Alpha 10 | Enterable; Modifiable |
| 26B | Alpha 10 | Enterable; Modifiable |
| 26C | Text | Enterable; Modifiable |
| 27A | Alpha 10 | Enterable; Modifiable |
| 27B | Alpha 10 | Enterable; Modifiable |
| 27C | Text | Enterable; Modifiable |
| 28A | Alpha 10 | Enterable; Modifiable |
| 28B | Alpha 10 | Enterable; Modifiable |
| 28C | Alpha 10 | Enterable; Modifiable |
| 28D | Text | Enterable; Modifiable |
| 29A | Alpha 10 | Enterable; Modifiable |
| 29B | Alpha 10 | Enterable; Modifiable |
| 29C | Text | Enterable; Modifiable |
| 14 1 Y | Boolean | Enterable; Modifiable |
| 14 1 MY | Boolean | Enterable; Modifiable |
| 14 1 N | Boolean | Enterable; Modifiable |
| 14 1 MN | Boolean | Enterable; Modifiable |
| 14 2 Y | Boolean | Enterable; Modifiable |
| 14 2 MY | Boolean | Enterable; Modifiable |
| 14 2 N | Boolean | Enterable; Modifiable |
| 14 2 MN | Boolean | Enterable; Modifiable |
| 14 3 Y | Boolean | Enterable; Modifiable |
| 14 3 MY | Boolean | Enterable; Modifiable |
| 14 3 N | Boolean | Enterable; Modifiable |
| 14 3 MN | Boolean | Enterable; Modifiable |
| 14 4 Y | Boolean | Enterable; Modifiable |
| 14 4 MY | Boolean | Enterable; Modifiable |
| 14 4 N | Boolean | Enterable; Modifiable |
| 14 4 MN | Boolean | Enterable; Modifiable |
| 14 5 Y | Boolean | Enterable; Modifiable |
| 14 5 MY | Boolean | Enterable; Modifiable |
| 14 5 N | Boolean | Enterable; Modifiable |
| 14 5 MN | Boolean | Enterable; Modifiable |
| 14 6 Y | Boolean | Enterable; Modifiable |
| 14 6 MY | Boolean | Enterable; Modifiable |
| 14 6 N | Boolean | Enterable; Modifiable |
| 14 6 MN | Boolean | Enterable; Modifiable |
| 14 7 Y | Boolean | Enterable; Modifiable |
| 14 7 MY | Boolean | Enterable; Modifiable |
| 14 7 N | Boolean | Enterable; Modifiable |
| 14 7 MN | Boolean | Enterable; Modifiable |
| 14 8 Y | Boolean | Enterable; Modifiable |
| 14 8 MY | Boolean | Enterable; Modifiable |
| 14 8 N | Boolean | Enterable; Modifiable |
| 14 8 MN | Boolean | Enterable; Modifiable |
| 14 9 Y | Boolean | Enterable; Modifiable |
| 14 9 MY | Boolean | Enterable; Modifiable |
| 14 9 N | Boolean | Enterable; Modifiable |
| 14 9 MN | Boolean | Enterable; Modifiable |
| 14 diets | Text | Enterable; Modifiable |
| 31A1 | Text | Enterable; Modifiable |
| 31A2 | Text | Enterable; Modifiable |
| 31A3 | Text | Enterable; Modifiable |
| 31A4 | Text | Enterable; Modifiable |
| 31A5 | Text | Enterable; Modifiable |
| 31A6 | Text | Enterable; Modifiable |
| 31A7 | Text | Enterable; Modifiable |
| 31A8 | Text | Enterable; Modifiable |
| 31A9 | Text | Enterable; Modifiable |
| 31A10 | Text | Enterable; Modifiable |
| 31A11 | Text | Enterable; Modifiable |
| 31A12 | Text | Enterable; Modifiable |
| 31A13 | Text | Enterable; Modifiable |
| 31A14 | Text | Enterable; Modifiable |
| 31A15 | Text | Enterable; Modifiable |
| 32A | Text | Enterable; Modifiable |
| 32B | Text | Enterable; Modifiable |
| 32C1 | Boolean | Enterable; Modifiable |

| | | |
|---|---|---|
| 32C2 | Boolean | Enterable; Modifiable |
| 32C3 | Boolean | Enterable; Modifiable |
| 32C4 | Boolean | Enterable; Modifiable |
| 32C5 | Boolean | Enterable; Modifiable |
| 32C6 | Boolean | Enterable; Modifiable |
| Create Date | Date | Enterable; Modifiable |
| Last Update | Date | Enterable; Modifiable |
| ImmediateDev | Text | Enterable; Modifiable |
| 32C7 | Boolean | Enterable; Modifiable |
| 32C8 | Boolean | Enterable; Modifiable |
| 32C9 | Boolean | Enterable; Modifiable |

| Structure: Bogus | | |
|---|---|---|
| Field1 | Alpha 20 | Enterable; Modifiable |

| Structure: Blank8 | | |
|---|---|---|

| Structure: Blank9 | | |
|---|---|---|

| Structure: Blank10 | | |
|---|---|---|

| Structure: Not Used | | |
|---|---|---|
| Users Number | Long Integer | Indexed; Enterable; Modifiable |
| Users Last | Alpha 20 | Modifiable |
| Users First | Alpha 20 | Modifiable |
| Questions | Subfile | |
| f8a | Text | Enterable; Modifiable |
| f8b | Text | Enterable; Modifiable |
| f8c | Text | Enterable; Modifiable |
| f8d | Text | Enterable; Modifiable |
| f8e1 | Text | Enterable; Modifiable |
| f8e2 | Text | Enterable; Modifiable |
| f8e3 | Text | Enterable; Modifiable |
| f8e4 | Text | Enterable; Modifiable |
| f8e5 | Text | Enterable; Modifiable |
| f8e6 | Text | Enterable; Modifiable |
| f8e8 | Text | Enterable; Modifiable |
| f8e10 | Text | Enterable; Modifiable |
| f8e11a | Text | Enterable; Modifiable |
| f8e11b | Text | Enterable; Modifiable |
| f8e11c | Text | Enterable; Modifiable |
| f8e12a | Text | Choices; Enterable; Modifiable |
| f8e12b | Text | Enterable; Modifiable |
| f8e12c | Text | Enterable; Modifiable |
| f8e13a | Text | Enterable; Modifiable |
| f8e13b | Text | Enterable; Modifiable |
| f8e13c | Text | Choices; Enterable; Modifiable |
| f8f1 | Text | Enterable; Modifiable |
| f8f2 | Text | Enterable; Modifiable |
| f8Other | Text | Enterable; Modifiable |
| f8g1 | Text | Enterable; Modifiable |
| f8g2 | Text | Enterable; Modifiable |
| f8g3 | Text | Enterable; Modifiable |
| f8g4 | Text | Enterable; Modifiable |
| f8g5 | Text | Enterable; Modifiable |
| f8g6 | Text | Enterable; Modifiable |
| f8g7 | Text | Enterable; Modifiable |
| f8g8 | Text | Enterable; Modifiable |
| f8g9 | Text | Enterable; Modifiable |
| f8g10 | Text | Enterable; Modifiable |
| f8g11 | Text | Enterable; Modifiable |

| | | |
|---|---|---|
| f8g12 | Text | Enterable; Modifiable |
| f8g13 | Text | Enterable; Modifiable |
| f8g14 | Text | Enterable; Modifiable |
| f8g15 | Text | Enterable; Modifiable |
| f8g16 | Text | Enterable; Modifiable |
| f8g17 | Text | Enterable; Modifiable |
| f8g18 | Text | Enterable; Modifiable |
| f8g19 | Text | Enterable; Modifiable |
| f8g20 | Text | Enterable; Modifiable |
| Buttons | Text | Enterable; Modifiable |
| 7A2 | Text | Enterable; Modifiable |
| 7A3 | Text | Enterable; Modifiable |
| 7B1 | Text | Enterable; Modifiable |
| 7B2 | Text | Enterable; Modifiable |
| 7B3 | Text | Enterable; Modifiable |
| 7C1 | Text | Enterable; Modifiable |
| 7C2 | Text | Enterable; Modifiable |
| 7C3 | Text | Enterable; Modifiable |
| 7D1 | Text | Enterable; Modifiable |
| 7D2 | Text | Enterable; Modifiable |
| 7D3 | Text | Enterable; Modifiable |
| 7E1 | Text | Enterable; Modifiable |
| 7E2 | Text | Enterable; Modifiable |
| 7E3 | Text | Enterable; Modifiable |
| 7F1 | Text | Enterable; Modifiable |
| 7F2 | Text | Enterable; Modifiable |
| 7F3 | Text | Enterable; Modifiable |
| 7G1 | Text | Enterable; Modifiable |
| 7G2 | Text | Enterable; Modifiable |
| 7G3 | Text | Enterable; Modifiable |
| not used | Subfile | |
| not used | Subfile | |
| not used | Subfile | |
| not used | Subfile | |
| Last Update | Date | Enterable; Modifiable |
| f8e12d | Text | Enterable; Modifiable |
| f8e14 | Text | Choices; Enterable; Modifiable |
| f91 | Text | Enterable; Modifiable |
| f92 | Text | Enterable; Modifiable |
| f93 | Text | Enterable; Modifiable |
| f94 | Text | Enterable; Modifiable |
| f95 | Text | Enterable; Modifiable |
| f96 | Text | Enterable; Modifiable |
| f97 | Text | Enterable; Modifiable |
| f98 | Text | Enterable; Modifiable |
| f99 | Text | Enterable; Modifiable |
| f910 | Text | Enterable; Modifiable |
| f911 | Text | Enterable; Modifiable |
| f912 | Text | Enterable; Modifiable |
| f913 | Text | Enterable; Modifiable |
| f914 | Text | Enterable; Modifiable |
| f915 | Text | Enterable; Modifiable |
| f10 | Text | Enterable; Modifiable |
| f12 | Text | Enterable; Modifiable |
| f13 | Text | Enterable; Modifiable |
| f14 | Text | Enterable; Modifiable |
| f8B | Alpha 20 | Enterable; Modifiable |
| f8C | Alpha 20 | Enterable; Modifiable |
| f8D | Alpha 20 | Enterable; Modifiable |
| f8G | Alpha 20 | Enterable; Modifiable |
| f11 | Alpha 20 | Enterable; Modifiable |
| f14 | Alpha 20 | Enterable; Modifiable |

| Structure: Questions | | |
|---|---|---|
| PSM No | Alpha 6 | Indexed; Enterable; Modifiable |
| Category | Alpha 20 | Enterable; Modifiable |
| Question | Alpha 20 | Enterable; Modifiable |
| User Answer | Alpha 20 | Enterable; Modifiable |
| PNR Code | Alpha 20 | Enterable; Modifiable |
| GPA 1 | Integer | Enterable; Modifiable |
| GPA 2 | Integer | Enterable; Modifiable |
| GPA 3 | Integer | Enterable; Modifiable |
| GPA 4 | Integer | Enterable; Modifiable |
| GPA 5 | Integer | Enterable; Modifiable |
| GPA 6 | Integer | Enterable; Modifiable |
| GPA 7 | Integer | Enterable; Modifiable |
| GPA 8 | Integer | Enterable; Modifiable |

| | | Structure: not used |
|---|---|---|

| | | Structure: not used |
|---|---|---|
| answer | integer | Enterable; Modifiable |

| | | Structure: not used |
|---|---|---|
| answer | integer | Enterable; Modifiable |

| | | Structure: not used |
|---|---|---|
| answers | integer | Enterable; Modifiable |

| | | Structure: PSM614 |
|---|---|---|
| UIN | Alpha 10 | Indexed; Unique; Enterable; Modifiable |
| 7A 1 | Boolean | Enterable; Modifiable |
| 7A 2 | Boolean | Enterable; Modifiable |
| 7A 3 | Boolean | Enterable; Modifiable |
| 7A 4 | Boolean | Enterable; Modifiable |
| 7A 5 | Boolean | Enterable; Modifiable |
| 7A 6 | Boolean | Enterable; Modifiable |
| 7A 7 | Boolean | Enterable; Modifiable |
| 7A 8 | Boolean | Enterable; Modifiable |
| 7A 9 | Boolean | Enterable; Modifiable |
| 7A 10 | Boolean | Enterable; Modifiable |
| 7A 11 | Boolean | Enterable; Modifiable |
| 7A 12 | Boolean | Enterable; Modifiable |
| 7B 1 | Boolean | Enterable; Modifiable |
| 7B 2 | Boolean | Enterable; Modifiable |
| 7B 3 | Boolean | Enterable; Modifiable |
| 7B 4 | Boolean | Enterable; Modifiable |
| 7B 5 | Boolean | Enterable; Modifiable |
| 7B 6 | Boolean | Enterable; Modifiable |
| 7B 7 | Boolean | Enterable; Modifiable |
| 7B 8 | Boolean | Enterable; Modifiable |
| 7B 9 | Boolean | Enterable; Modifiable |
| 7B 10 | Boolean | Enterable; Modifiable |
| 7B 11 | Boolean | Enterable; Modifiable |
| 7B 12 | Boolean | Enterable; Modifiable |
| 7C 1 | Boolean | Enterable; Modifiable |
| 7C 2 | Boolean | Enterable; Modifiable |
| 7C 3 | Boolean | Enterable; Modifiable |
| 7C 4 | Boolean | Enterable; Modifiable |
| 7C 5 | Boolean | Enterable; Modifiable |
| 7C 6 | Boolean | Enterable; Modifiable |
| 7C 7 | Boolean | Enterable; Modifiable |
| 7C 8 | Boolean | Enterable; Modifiable |
| 7C 9 | Boolean | Enterable; Modifiable |
| 7C 10 | Boolean | Enterable; Modifiable |
| 7C 11 | Boolean | Enterable; Modifiable |
| 7C 12 | Boolean | Enterable; Modifiable |
| 7D 1 | Boolean | Enterable; Modifiable |
| 7D 2 | Boolean | Enterable; Modifiable |
| 7D 3 | Boolean | Enterable; Modifiable |
| 7D 4 | Boolean | Enterable; Modifiable |
| 7D 5 | Boolean | Enterable; Modifiable |
| 7D 6 | Boolean | Enterable; Modifiable |
| 7D 7 | Boolean | Enterable; Modifiable |
| 7D 8 | Boolean | Enterable; Modifiable |
| 7D 9 | Boolean | Enterable; Modifiable |
| 7D 10 | Boolean | Enterable; Modifiable |
| 7D 11 | Boolean | Enterable; Modifiable |
| 7D 12 | Boolean | Enterable; Modifiable |
| 7E 1 | Boolean | Enterable; Modifiable |
| 7E 2 | Boolean | Enterable; Modifiable |
| 7E 3 | Boolean | Enterable; Modifiable |

| | | |
|---|---|---|
| 7E 4 | Boolean | Enterable; Modifiable |
| 7E 5 | Boolean | Enterable; Modifiable |
| 7E 6 | Boolean | Enterable; Modifiable |
| 7E 7 | Boolean | Enterable; Modifiable |
| 7E 8 | Boolean | Enterable; Modifiable |
| 7E 9 | Boolean | Enterable; Modifiable |
| 7E 10 | Boolean | Enterable; Modifiable |
| 7E 11 | Boolean | Enterable; Modifiable |
| 7E 12 | Boolean | Enterable; Modifiable |
| 7F 1 | Boolean | Enterable; Modifiable |
| 7F 2 | Boolean | Enterable; Modifiable |
| 7F 3 | Boolean | Enterable; Modifiable |
| 7F 4 | Boolean | Enterable; Modifiable |
| 7F 5 | Boolean | Enterable; Modifiable |
| 7F 6 | Boolean | Enterable; Modifiable |
| 7F 7 | Boolean | Enterable; Modifiable |
| ImmediateDev | Text | Enterable; Modifiable |
| 7F 8 | Boolean | Enterable; Modifiable |
| 7F 9 | Boolean | Enterable; Modifiable |
| 7F 10 | Boolean | Enterable; Modifiable |
| 7F 11 | Boolean | Enterable; Modifiable |
| 7F 12 | Boolean | Enterable; Modifiable |
| 7G 1 | Boolean | Enterable; Modifiable |
| 7G 2 | Boolean | Enterable; Modifiable |
| 7G 3 | Boolean | Enterable; Modifiable |
| 7G 4 | Boolean | Enterable; Modifiable |
| 7G 5 | Boolean | Enterable; Modifiable |
| 7G 6 | Boolean | Enterable; Modifiable |
| 7G 7 | Boolean | Enterable; Modifiable |
| 7G 8 | Boolean | Enterable; Modifiable |
| 7G 9 | Boolean | Enterable; Modifiable |
| 7G 10 | Boolean | Enterable; Modifiable |
| 7G 11 | Boolean | Enterable; Modifiable |
| 7G 12 | Boolean | Enterable; Modifiable |
| 8_A | Text | Enterable; Modifiable |
| 8B 1 | Boolean | Enterable; Modifiable |
| 8B 2 | Boolean | Enterable; Modifiable |
| 8B 3 | Boolean | Enterable; Modifiable |
| 8B 4 | Boolean | Enterable; Modifiable |
| 8B 5 | Boolean | Enterable; Modifiable |
| 8B 6 | Boolean | Enterable; Modifiable |
| 8B 7 | Boolean | Enterable; Modifiable |
| 8B 8 | Boolean | Enterable; Modifiable |
| 8B 9 | Boolean | Enterable; Modifiable |
| 8B 10 | Boolean | Enterable; Modifiable |
| 8C 17 | Boolean | Enterable; Modifiable |
| 8B 11 | Boolean | Enterable; Modifiable |
| 8B 12 | Boolean | Enterable; Modifiable |
| 8B 13 | Boolean | Enterable; Modifiable |
| 8B 14 | Boolean | Enterable; Modifiable |
| 8B 15 | Boolean | Enterable; Modifiable |
| 8B_16 | Text | Enterable; Modifiable |
| 8B_17 | Text | Enterable; Modifiable |
| 8B_18 | Text | Enterable; Modifiable |
| 8B_19 | Text | Enterable; Modifiable |
| 8C 1 | Boolean | Enterable; Modifiable |
| 8C 2 | Boolean | Enterable; Modifiable |
| 8C 3 | Boolean | Enterable; Modifiable |
| 8C 4 | Boolean | Enterable; Modifiable |
| 8C 5 | Boolean | Enterable; Modifiable |
| 8C 6 | Boolean | Enterable; Modifiable |
| 8C 7 | Boolean | Enterable; Modifiable |
| 8C 8 | Boolean | Enterable; Modifiable |
| 8C 9 | Boolean | Enterable; Modifiable |
| 8C 10 | Boolean | Enterable; Modifiable |
| 8C 11 | Boolean | Enterable; Modifiable |
| 8C 12 | Boolean | Enterable; Modifiable |
| 8C 13 | Boolean | Enterable; Modifiable |
| 8C 14 | Boolean | Enterable; Modifiable |
| 8C 15 | Boolean | Enterable; Modifiable |
| 8C 16 | Boolean | Enterable; Modifiable |
| 8D 1 | Boolean | Enterable; Modifiable |
| 8D 2 | Boolean | Enterable; Modifiable |
| 8D 3 | Boolean | Enterable; Modifiable |
| 8D 4 | Boolean | Enterable; Modifiable |
| 8D 5 | Boolean | Enterable; Modifiable |
| 8D 6 | Boolean | Enterable; Modifiable |
| 8D 7 | Boolean | Enterable; Modifiable |
| 8D 8 | Boolean | Enterable; Modifiable |
| 8D 9 | Boolean | Enterable; Modifiable |
| 8D 10 | Boolean | Enterable; Modifiable |
| 8D 11 | Boolean | Enterable; Modifiable |
| 8D 12 | Text | Enterable; Modifiable |

| | | |
|---|---|---|
| 8E1 | Alpha 50 | Enterable; Modifiable |
| 8E2 | Alpha 50 | Enterable; Modifiable |
| 8E3 | Alpha 50 | Enterable; Modifiable |
| 8E4 | Alpha 50 | Enterable; Modifiable |
| 8E5 | Alpha 50 | Enterable; Modifiable |
| 8E6 | Alpha 50 | Enterable; Modifiable |
| 8E7 | Alpha 50 | Enterable; Modifiable |
| 8E8 | Alpha 50 | Enterable; Modifiable |
| 8E9 | Alpha 50 | Enterable; Modifiable |
| 8E10 | Alpha 50 | Enterable; Modifiable |
| spare field | Boolean | Enterable; Modifiable |
| 8E11_1 | Text | Enterable; Modifiable |
| 8E11_2 | Text | Enterable; Modifiable |
| 8E11_3 | Text | Enterable; Modifiable |
| 8E 12 | Boolean | Enterable; Modifiable |
| 8E12 1 | Text | Enterable; Modifiable |
| 8E12 2 | Text | Enterable; Modifiable |
| 8E12 3 | Text | Enterable; Modifiable |
| Computer | Boolean | Enterable; Modifiable |
| 813_1 | Text | Enterable; Modifiable |
| 813_2 | Text | Enterable; Modifiable |
| 813_3 | Text | Choices; Enterable; Modifiable |
| 8_14 | Text | Choices; Enterable; Modifiable |
| 8_F1 | Text | Enterable; Modifiable |
| 8_F2 | Text | Enterable; Modifiable |
| 8G 1 | Boolean | Enterable; Modifiable |
| 8G 2 | Boolean | Enterable; Modifiable |
| 8G 3 | Boolean | Enterable; Modifiable |
| 8G 4 | Boolean | Enterable; Modifiable |
| 8G 5 | Boolean | Enterable; Modifiable |
| 8G 6 | Boolean | Enterable; Modifiable |
| 8G 7 | Boolean | Enterable; Modifiable |
| 8G 8 | Boolean | Enterable; Modifiable |
| 8G 9 | Boolean | Enterable; Modifiable |
| 8G 10 | Boolean | Enterable; Modifiable |
| 8G 11 | Boolean | Enterable; Modifiable |
| 8G 12 | Boolean | Enterable; Modifiable |
| 8G 13 | Boolean | Enterable; Modifiable |
| 8G 14 | Boolean | Enterable; Modifiable |
| 8G 15 | Boolean | Enterable; Modifiable |
| 8G 16 | Boolean | Enterable; Modifiable |
| 8G 17 | Boolean | Enterable; Modifiable |
| 8G 18 | Boolean | Enterable; Modifiable |
| 8G 19 | Boolean | Enterable; Modifiable |
| 8G 20 | Boolean | Enterable; Modifiable |
| 8G 21 | Boolean | Enterable; Modifiable |
| 8G 22 | Boolean | Enterable; Modifiable |
| 8G 23 | Boolean | Enterable; Modifiable |
| 8G 24 | Boolean | Enterable; Modifiable |
| 8G 25 | Boolean | Enterable; Modifiable |
| 8G 26 | Boolean | Enterable; Modifiable |
| 8G 27 | Boolean | Enterable; Modifiable |
| 8G 28 | Boolean | Enterable; Modifiable |
| 8G 29 | Boolean | Enterable; Modifiable |
| 8G 30 | Boolean | Enterable; Modifiable |
| 8G 31 | Boolean | Enterable; Modifiable |
| 8G 32 | Boolean | Enterable; Modifiable |
| 8G 33 | Boolean | Enterable; Modifiable |
| 8G 34 | Boolean | Enterable; Modifiable |
| 8G_35 | Text | Enterable; Modifiable |
| 8G 36 | Boolean | Enterable; Modifiable |
| 8G 37 | Boolean | Enterable; Modifiable |
| 8G 38 | Boolean | Enterable; Modifiable |
| 8G 39 | Boolean | Enterable; Modifiable |
| 8G 40 | Boolean | Enterable; Modifiable |
| 8G 41 | Boolean | Enterable; Modifiable |
| 8G 42 | Boolean | Enterable; Modifiable |
| 8G 43 | Boolean | Enterable; Modifiable |
| 8G 44 | Boolean | Enterable; Modifiable |
| 8G 45 | Boolean | Enterable; Modifiable |
| 8G 46 | Boolean | Enterable; Modifiable |
| 8G 47 | Boolean | Enterable; Modifiable |
| 8G 48 | Boolean | Enterable; Modifiable |
| 8G 49 | Boolean | Enterable; Modifiable |
| 8G 50 | Boolean | Enterable; Modifiable |
| 8G 51 | Boolean | Enterable; Modifiable |
| 8G 52 | Boolean | Enterable; Modifiable |
| spare field | Boolean | Enterable; Modifiable |
| 8G 53 | Boolean | Enterable; Modifiable |
| 8G 54 | Boolean | Enterable; Modifiable |
| 8G 55 | Boolean | Enterable; Modifiable |
| 8G 56 | Boolean | Enterable; Modifiable |
| 8G 57 | Boolean | Enterable; Modifiable |

| | | |
|---|---|---|
| 8G 58 | Boolean | Enterable; Modifiable |
| 8G 59 | Boolean | Enterable; Modifiable |
| 8G 60 | Boolean | Enterable; Modifiable |
| 8G 61 | Boolean | Enterable; Modifiable |
| 8G 62 | Boolean | Enterable; Modifiable |
| 8G 63 | Boolean | Enterable; Modifiable |
| 8G 64 | Boolean | Enterable; Modifiable |
| 8G 65 | Boolean | Enterable; Modifiable |
| 8G 66 | Boolean | Enterable; Modifiable |
| 8G 67 | Boolean | Enterable; Modifiable |
| 8G 68 | Boolean | Enterable; Modifiable |
| spare field | Text | Enterable; Modifiable |
| 9A1 | Text | Enterable; Modifiable |
| 9A2 | Text | Enterable; Modifiable |
| 9A3 | Text | Enterable; Modifiable |
| 9A4 | Text | Enterable; Modifiable |
| 9A5 | Text | Enterable; Modifiable |
| 9A6 | Text | Enterable; Modifiable |
| 9A7 | Text | Enterable; Modifiable |
| 9A8 | Text | Enterable; Modifiable |
| 9A9 | Text | Enterable; Modifiable |
| 9A10 | Text | Enterable; Modifiable |
| 9A11 | Text | Enterable; Modifiable |
| 9A12 | Text | Enterable; Modifiable |
| 9A13 | Text | Enterable; Modifiable |
| 9A14 | Text | Enterable; Modifiable |
| 9A15 | Text | Enterable; Modifiable |
| 10A1 | Text | Enterable; Modifiable |
| 11 1A | Boolean | Enterable; Modifiable |
| 11 1C | Boolean | Enterable; Modifiable |
| 11 1D | Boolean | Enterable; Modifiable |
| 11 2A | Boolean | Enterable; Modifiable |
| 11 2C | Boolean | Enterable; Modifiable |
| 11 2D | Boolean | Enterable; Modifiable |
| 11 3A | Boolean | Enterable; Modifiable |
| 11 3C | Boolean | Enterable; Modifiable |
| 11 3D | Boolean | Enterable; Modifiable |
| 11 4A | Boolean | Enterable; Modifiable |
| 11 4C | Boolean | Enterable; Modifiable |
| 11 4D | Boolean | Enterable; Modifiable |
| 11 5A | Boolean | Enterable; Modifiable |
| 11 5C | Boolean | Enterable; Modifiable |
| 11 5D | Boolean | Enterable; Modifiable |
| 11 6A | Boolean | Enterable; Modifiable |
| 11 6C | Boolean | Enterable; Modifiable |
| 11 6D | Boolean | Enterable; Modifiable |
| 11 7A | Boolean | Enterable; Modifiable |
| 11 7C | Boolean | Enterable; Modifiable |
| 11 7D | Boolean | Enterable; Modifiable |
| 11 8A | Boolean | Enterable; Modifiable |
| 11 8C | Boolean | Enterable; Modifiable |
| 11 8D | Boolean | Enterable; Modifiable |
| 11 8 | Text | Enterable; Modifiable |
| 12 | Text | Enterable; Modifiable |
| 13 | Text | Enterable; Modifiable |
| 14 1 Y | Boolean | Enterable; Modifiable |
| 14 1 MY | Boolean | Enterable; Modifiable |
| 14 1 MN | Boolean | Enterable; Modifiable |
| 14 1 N | Boolean | Enterable; Modifiable |
| 14 2 Y | Boolean | Enterable; Modifiable |
| 14 2 MY | Boolean | Enterable; Modifiable |
| 14 2 MN | Boolean | Enterable; Modifiable |
| 14 2 N | Boolean | Enterable; Modifiable |
| 14 3 Y | Boolean | Enterable; Modifiable |
| 14 3 MY | Boolean | Enterable; Modifiable |
| 14 3 MN | Boolean | Enterable; Modifiable |
| 14 3 N | Boolean | Enterable; Modifiable |
| 14 4 Y | Boolean | Enterable; Modifiable |
| 14 4 MY | Boolean | Enterable; Modifiable |
| 14 4 MN | Boolean | Enterable; Modifiable |
| 14 4 N | Boolean | Enterable; Modifiable |
| 14 5 Y | Boolean | Enterable; Modifiable |
| 14 5 MY | Boolean | Enterable; Modifiable |
| 14 5 MN | Boolean | Enterable; Modifiable |
| 14 5 N | Boolean | Enterable; Modifiable |
| 14 6 Y | Boolean | Enterable; Modifiable |
| 14 6 MY | Boolean | Enterable; Modifiable |
| 14 6 MN | Boolean | Enterable; Modifiable |
| 14 6 N | Boolean | Enterable; Modifiable |
| 14 diets | Text | Enterable; Modifiable |
| Create Date | Date | Modifiable |
| Last Update | Date | Modifiable |
| 7A 13 | Boolean | Enterable; Modifiable |

| | | |
|---|---|---|
| 7A 14 | Boolean | Enterable; Modifiable |
| 7A 15 | Boolean | Enterable; Modifiable |
| 8C 18 | Boolean | Enterable; Modifiable |
| 8C19 | Text | Enterable; Modifiable |
| 8D13 | Text | Enterable; Modifiable |
| 8D14 | Text | Enterable; Modifiable |
| 8D15 | Text | Enterable; Modifiable |
| 7G 13 | Boolean | Enterable; Modifiable |
| 7G 14 | Boolean | Enterable; Modifiable |
| 7G 15 | Boolean | Enterable; Modifiable |
| 15A | Text | Enterable; Modifiable |
| 15B | Text | Enterable; Modifiable |
| 15 C1 | Boolean | Enterable; Modifiable |
| 15 C2 | Boolean | Enterable; Modifiable |
| 15 C3 | Boolean | Enterable; Modifiable |
| 15 C4 | Boolean | Enterable; Modifiable |
| 15 C5 | Boolean | Enterable; Modifiable |
| 15 C6 | Boolean | Enterable; Modifiable |
| 15 C7 | Boolean | Enterable; Modifiable |
| 15 C8 | Boolean | Enterable; Modifiable |
| 15 C9 | Boolean | Enterable; Modifiable |

APPENDIX II

Screens

Friday, September 28, 1990            Layout: Output

| ID # | Company | Contact | Phone |
|---|---|---|---|
| Vendor Co | Company | Contact | Phone |

Delete   Export   Import   Add Records   Vendor Listing   Sort   Search by Example   Done Friday, September 28, 1990            Layout: Input

Vendor Screen

Retrieval Code [+] [−]

Retrieval

| Code # | Vendor Cod |
| Company | Company |
| Address | Address |
| Address2 | Address2 |
| Zip | Zip |
| City | City | State | Sta |
| Contact | Contact |
| Phone | Phone |

Notes...

Save
Cancel

Page 1

Friday, September 28, 1990            Layout: Output

| Code # | Product Name | Primary Vendor | Vendors |
|---|---|---|---|
| Product Code | Product Name | Primary Vendor | Numbe |

1 4 7 Select   2 5 8 Export   3 6 Import   Add Records   Product Matrix Listing   Inventory Listing   Sort   Search   Done Friday, September 28, 1990      87    5,122,952    88      Layout: Input last update: LastUpdate

Code Product Code
Name Product Name
No of Partic. Min – Max    Environ. Needed 20
Compon. Needed 2P
Price Retail Price

VENDORS Vendor

Description
Description

[ Save ]
[ Cancel ]
|◀ ◀ ▶ ▶|

[ Play Instructions ]   Page 1
[ Notes ]   ◀ ▶

---

Friday, September 28, 1990      Layout: Input

LEARNING
☒ A-Auditory Reception
☒ B-Auditory Assoc.
☒ C-Auditory Memory
☒ D-Grammar
☒ E-Visual Reception
☒ F-Visual Assoc.
☒ G-Visual Memory
☒ H-Perceptual Constancy
☒ I-Spatial Relationships
☒ J-Eye/Hand Coordination
☒ K-Balance
☒ L-Verbal Expression
M-Other 3M

EDUCATIONAL
Peformance Level: ☒ A   ☒ B   ☒ C
☒ D-Math
☒ E-Reading
☒ F-Science
☒ G-Language
☒ H-Social Studies
☒ I-Art
☒ J-Music
K-Other 4K
☒ L-Recreational

[ Save ]
[ Cancel ]
|◀ ◀ ▶ ▶|

[ Play Instructions ]   Page 2
[ Notes ]   ◀ ▶

Friday, September 28, 1990      Layout: Input

INSTRUCTIONAL VARIABLES

B-Length of Time [5B]    minutes (0=open)
C-No. Of Factors [5C]
D-Perfrmce Lvl [5D]
☒ E-Communication/lang. clarity
☒ F-Rapport/Relationships/social
☒ G-Logic & Reasoning/Reaching Concl.
☒ H-Abstract Random Unpredictable
☒ I-Moral Religious Principles of right & wrong
☒ Sight ☒ Sound ☒ Touch ☒ Taste ☒ Smell
☒ K-Mental Images
☒ L-Retention & Recall
☒ M-Immitate
N-Motor [5N]
☒ O-Pre-requisites required
☒ P-Familiarity, Assoc. Resmblance
☒ Q-Conceptualize-Beg to understand
☒ R-Emotional Stimuli/Patience & Intensity
S-Other [5S]

VALUES-PERSONAL TRAITS:

Age       calculated from Product Code#

Grade [Grade]    Sex [Sex]
Ethnic [Ethnic]    Handed [Handed]
Other [6F]

[Save]
[Cancel]
|◀ ◀ ▶ ▶|
[Play Instructions]  Page 3
[Notes]  ◀ ▶

---

Friday, September 28, 1990      Layout: Output

| Users Last | Users First | Age | UIN |
|---|---|---|---|
| Users Last | Users First | Age | UIN |

Delete   [Export] [Import]   Add Records   Sort   Search by Example   Done

---

Friday, September 28, 1990      Layout: Input

Vital Information Profile    Date [Date]

1. Participant's Name  [First Name] [Last Name] PIN # [PIN] ?
   Address  [Address]
   Day Phone No.  [Day Phone] Evening Phone No [Eve Phone]
   Relationship to User  [Relationship]

2. Sponsor's Name  [Sponsers First] [Sponsers Last] SIN # [SIN] ?
   Address  [Sponsers Addres]
   Phone No.  [Sponsers Phone] Type of Business [Type Business]

3. Users Name  [Users First] [Users Last] UIN # 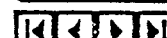 ?
   Address  [Users Address]
   Phone No.  [Users Phone] Birthday [Date of Bir] [Ag] yrs
   Country of Birth  [Country of Birt] Sx [Sex] Handed [Handed]
   Racial/Cultural Influence  [Racial Cultural]
   Place in Family  [Place in Family]
   Total Number of Children in Family [Total Child]

Age Equivalent: [Age Eq] [PSM 0-3] [PSM 2-5] [PSM 6-14]
   Religious Code: [Religio] [Match Items] [Match Items] [Match Items]
              [GPA] [GPA] [GPA]

[Save]
[Cancel]
|◀ ◀ ▶ ▶|
[Print VIP only]  Page 1
[Notes]  ◀ ▶

Friday, September 28, 1990            Layout: Input

4. School Name    `School`    LIN # `LIN`   ?
    Address       `School Address`
    Phone No.     `School Phone`    Teachers Name `Teachers Name`
    Grade         `Grade`

5.(A) Biological (Birth) Parents:

Mother's Name    `BM Name`      Age `BM`
Country of Birth   `BM Country`    Number of Years in this Country `BM`
Occupation       `BM Occupation`

Father's Name     `BF Name`      Age `BF`
Country of Birth   `BF Country`     Number of Years in this Country `BF`
Occupation       `BF Occupation`

Biological Parents are: `BFM Status`

[ Save ]
[ Cancel ]
|◄ ◄ ► ►|
Page 2
[ Notes ] ◄ ►

---

Friday, September 28, 1990            Layout: Input

5.(B) Custodial Parents or Guardians: (If same as 5(A) above, Check Here ☒ and skip to question 6

Mother's Name    `CM name`      Age `CM`
Country of Birth   `CM Country`    Number of Years in this Country `CM`
Occupation       `CM Occupation`

Father's Name     `CF Name`      Age `CF`
Country of Birth   `CF Country`     Number of Years in this Country `CF`
Occupation       `CF Occupation`

Biological Parents are: `CFM Status`

6. Check the appropriate boxes:

☒ Mother       ☒ Step-Mother    ☒ Legal Guardian
☒ Father        ☒ Step-Father    ☒ Legal Guardian
☒ GrandMother   ☒ GrandFather    ☒ Aunt          ☒ Uncle
☒ Brother       ☒ Sister          ☒ Step-Brother   ☒ Step-Sister
☒ Half-Brother    ☒ Half-Sister
Specify other family members `Other Members`

[ Save ]
[ Cancel ]
|◄ ◄ ► ►|
Page 3
[ Notes ] ◄ ►

APPENDIX III

Control Code

Saturday, October 6, 1990         Menu Bar #1

File
   About...                                    About
   Preferences...                              Preferences
   Page Setup...                               PageSetup
   Quit                                        Quit

Vendors
   Add New                                     VendorAdd
   List All                                    VendorList
   Find...                                     VendorFind
   Print Reports...                            VendorPrint1

Inventory
   Add New                                     InventAdd
   List All                                    InventList
   Find...                                     InventFind
   Print Reports                               InventPrint1

Users
   Add New                                     UsersAdd
   List All                                    UsersList
   Find...                                     UsersFind

PSM
   6-14 List All                               PSM614LIST
   6-14 Search                                 PSM614SBE
   0-3 List All                                PSM03LIST
   0-3 Search                                  PSM03SBE
   2-5 List All                                PSM2_5LIST
   2-5 Search                                  PSM2_5SBE

GPA
   List                                        gpaLIST
   Print...                                    PrintGPA
   Export...                                   gpaEXPORT
   Import...                                   gpaIMPORT Saturday, October 6, 1990         Procedure: About

```
 ┌If (OptionKey)
 │   RunTime
 │   ABORT
 └End If
OpenMyWindow
DIALOG([Constants];"About Box")
CLOSE WINDOW
```

Saturday, October 6, 1990          Layout: About Box

Designed by:

MDG COMPUTER SERVICES
634 S. Dunton
Arlington Heights, IL 60005
(708) 818-9991

Produced for: `gCompany`

Program Version: `gProgramVer`
Program Last Update: `gProgDate`

[ OK ]

[ MyFileUtils ⌘F ]     [ Return ]

---

Saturday, October 6, 1990          Procedure: Preferences

```
v1:=LoadNo ("InvMatchNo";50)
v0:=LoadNo ("SeqProgYN";1)
OpenMyWindow
DIALOG([Constants];"Preferences")
CLOSE WINDOW
If (OK=1)
    AssignNo ("InvMatchNo";v1)
    AssignNo ("SeqProgYN";v0)
End If
Case of
    : (b1=1)
        DEFAULT FILE([SubCodes])
        vFilename:="SubCodes"
        pFileName:=->[SubCodes]
        ALL RECORDS
        MyDialog
        MyMessage ("Sorting Sub-Codes...")
        SORT SELECTION([SubCodes];[SubCodes]Category;>;[SubCodes]SubCode;>)
        MyCloseWindow
        MODIFY SELECTION
        EnableAll
    : (b2=1)
        CONFIRM("Do You Really Want to Do This?")
        If (OK=1)
            CONFIRM("It Will Take Some Time!")
            If (OK=1)
                CONFIRM("Click OK, Just To Make Sure")
                If (OK=1)
                    ALL RECORDS([Inventory])
                    $Num:=Records In selection([Inventory])
                    For ($i;1;$Num)
                        FillProdMatrix
                        SAVE RECORD([Inventory])
                        NEXT RECORD([Inventory])
                        MESSAGE("Updating "+[Inventory]Product Name+Char(13)+Char(13)+String($Num-$i)+" to go")
                    End for
                End If
            End If
        End If
End case
```

Procedure: FillProdMatrix

```
CR:=Char(13)

FieldPtr:=→[Inventory]MatrixCol1
MyDelSubrecord
CREATE SUBRECORD(FieldPtr→)
[Inventory]MatrixCol1`Value:=[Inventory]Product Code+CR+[Inventory]Product Name+CR+CR+String([Inventory]Retail Price;"$###,###.
ALL SUBRECORDS([Inventory]Vendor)
FIRST SUBRECORD([Inventory]Vendor)
While (Not(End subselection([Inventory]Vendor)))
    [Inventory]MatrixCol1`Value:=[Inventory]MatrixCol1`Value+[Inventory]VendorName+CR+" Avail: "+[Inventory]VendorAvailability+","+
    NEXT SUBRECORD([Inventory]Vendor)
End while FieldPtr:=→[Inventory]Personal Traits
MyDelSubrecord
CREATE SUBRECORD(FieldPtr→)
[Inventory]Personal Traits`Value:="H age: "+[Inventory]Age+CR+"M grade: "+[Inventory]Grade+CR+"I sex: "+[Inventory]Sex+CR+"G eth
If ([Inventory]2O#"")
    [Inventory]Personal Traits`Value:=[Inventory]Personal Traits`Value+CR+CR+"Environ.'Needed:"+CR+" "+[Inventory]2O
End If
If ([Inventory]2P#"")
    [Inventory]Personal Traits`Value:=[Inventory]Personal Traits`Value+CR+CR+"Components Needed:"+CR+" "+[Inventory]2P
End If
FieldPtr:=→[Inventory]Educational
MyDelSubrecord
CREATE SUBRECORD(FieldPtr→)
[Inventory]Educational`Value:=([Inventory]Educational`Value+CR+CR+"Min-"+String([Inventory]Min Participant)+CR+"Max-"+String([Inv
FieldPtr:=→[Inventory]Retrieval
MyDelSubrecord
CREATE SUBRECORD(FieldPtr→)
[Inventory]Retrieval`Code:=((Num([Inventory]3A)*("A-Auditory Recpt"+CR))+(Num([Inventory]3B)*("B-Auditory Assoc"+CR))+(Num([Inve FieldPtr:=→[Inventory]Instructional
MyDelSubrecord
CREATE SUBRECORD(FieldPtr→)
[Inventory]Instructional`Variables:=(Num([Inventory]Sight)*"Sight, ")+(Num([Inventory]Sound)*"Sound, ")+(Num([Inventory]Touch)*"Touc
If ([Inventory]Instructional`Variables#"")
    [Inventory]Instructional`Variables:=[Inventory]Instructional`Variables+CR+CR
End If
[Inventory]Instructional`Variables:=[Inventory]Instructional`Variables+"Length of time: "+String([Inventory]5B)+CR+"No. of Factors: "+Strl
[Inventory]Instructional`Variables:=[Inventory]Instructional`Variables+(Num([Inventory]5E)*("E-Communication"+CR))+(Num([Inventory]5
[Inventory]Instructional`Variables:=[Inventory]Instructional`Variables+(Num([Inventory]5M)*("M-Immitate"+CR))+((Num([Inventory]5N#"")
[Inventory]Instructional`Variables:=[Inventory]Instructional`Variables+(Num([Inventory]5O)*("O-Prereq. Required"+CR))+(Num([Inventory
```

Procedure: MyDelSubrecord

```
ALL SUBRECORDS(FieldPtr→)
While (Not(End subselection(FieldPtr→)))
    DELETE SUBRECORD(FieldPtr→)
    ALL SUBRECORDS(FieldPtr→)
End while
```

Procedure: PageSetup

PRINT SETTINGS

Procedure: Quit

```
CONFIRM("Do You Really Want to Quit?"+Char(13)+Char(13)+"remember to backup data!")
If (OK=1)
    QUIT 4D
End If
```

Procedure: VendorAdd

```
UseVendors
IO
Adding:=True
ADD RECORD
While (bOK=1)
    ADD RECORD
End while
Adding:=False
```

Saturday, October 6, 1990          Procedure: VendorList

```
UseVendors
ID
ALL RECORDS
MyDialog
MyMessage ("Sorting By Vendor...")
SORT SELECTION([Vendor];[Vendor]Company;>)
MyCloseWindow
MODIFY SELECTION
EnableAll
```

Saturday, October 6, 1990          Procedure: VendorFind

```
UseVendors
If (OptionKey)
    SET WINDOW TITLE("Search By Example")
    SEARCH BY LAYOUT([Vendor])
    If (OK=1)
        ID
        MODIFY SELECTION
    End If
Else
    If (VendorSearch)
        ID
        MODIFY SELECTION
        EnableAll
    End If
End If
```

Saturday, October 6, 1990          Procedure: VendorSearch

```
$0:=False
OpenMyWindow "VendorSearch
DIALOG([Constants];"SearchVendor")
CLOSE WINDOW
If (OK=1)
    Case of
        : (bSearch=1)
            SEARCH BY FORMULA
            bSearch:=0
            If (OK=1)
                $0:=True
            End If
        Else
            ALL RECORDS
            CREATE SET("SetFound")
            Case of
                : (vCompany#"") & (bSound=0)
                    SEARCH BY INDEX([Vendor]Company=vCompany+"@")
                    CREATE SET("SetFound1")
                    INTERSECTION("SetFound";"SetFound1";"SetAll")
                    USE SET("SetAll")
                    CREATE SET("SetFound")
                : (vCompany#"") & (bSound=1)
                    $Temp:=Soundex (vCompany)
                    SEARCH BY INDEX([Vendor]Phonetic=$Temp)
                    CREATE SET("SetFound1")
                    INTERSECTION("SetFound";"SetFound1";"SetAll")
                    USE SET("SetAll")
                    CREATE SET("SetFound")
            End case
            If (bRetrieval=1)
                $Temp:=Request("Enter Retrieval Code to Look For:")
                SEARCH BY INDEX([Vendor]Retrieval'Code=$Temp)
                CREATE SET("SetFound1")
                INTERSECTION("SetFound";"SetFound1";"SetAll")
                USE SET("SetAll")
                CREATE SET("SetFound")
            End If
            USE SET("SetFound")
            CLEAR SET("Set")
            If (Records in selection>0)
                $0:=True
            Else
                ALERT("No Matching Vendors Were Found!")
                $0:=False
            End If
    End case
End If
```

Layout: SearchVendor

Lookup Vendors by:

Company  [vCompany            ]

☐ Search By Sound

☐ Search Retrieval Code

[ Cancel ✗. ]   [ Search Editor ]   [ OK ]

---

Procedure: VendorPrint

```
MyOpenWindow (400;260;1) `Vendor Print
DIALOG([Constants];"Print Vendor")
CLOSE WINDOW
Case of
   : (b1=1) `Mail Labels 1 across
      PRINT LABEL([Vendor];"Vendor Labels")
   : (b2=1) `Vendor Listing
      REPORT("Vendor Listing")
End case
```

Layout: Print Vendor

 Choose Report Type

○ Mail Labels (1 across)   

○ Vendor Listing

[ OK ]

[ Cancel ]

---

Procedure: InventAdd

```
UseInventory
ID
Adding:=True
ADD RECORD
While (bNext=1)
   ADD RECORD
End while
Adding:=False
EnableAll
```

Saturday, October 6, 1990     Procedure: InventList

```
UseInventory
ID
ALL RECORDS
MyDialog
MyMessage ("Sorting By Product Code")
SORT SELECTION([Inventory];[Inventory]Product Code;>)
MyCloseWindow
MODIFY SELECTION
EnableAll
```

Saturday, October 6, 1990     Procedure: InventFind

```
UseInventory
If (OptionKey)
    SET WINDOW TITLE ("Search By Example")
    SEARCH BY LAYOUT([Inventory])
    If (OK=1)
        ID
        MODIFY SELECTION
    End If
Else
    If (InventSearch)
        ID
        MODIFY SELECTION
        EnableAll
    End If
End If
```

Saturday, October 6, 1990     Procedure: InventSearch

```
$0:=False
OpenMyWindow "InventSearch
DIALOG([Constants];"SearchInvent")
CLOSE WINDOW
If (OK=1)
    MyDialog
    MyMessage ("Searching For Matching Inventory...")
    ALL RECORDS
    CREATE SET("SetFound")
    If (vProduct#"")
        SEARCH([Inventory];[Inventory]Product Name=vProduct+"@")
        CREATE SET("SetInv")
        INTERSECTION("SetFound";"SetInv";"SetFound")
    End If
    Case of
        : (b0=1) `ALL
            ALL RECORDS
        : (b1=1) `Books
            SEARCH([Inventory];[Inventory]Product Code="B@")
        : (b2=1) `Toys
            SEARCH([Inventory];[Inventory]Product Code="T@")
        : (b3=1) `Games
            SEARCH([Inventory];[Inventory]Product Code="G@")
        : (b4=1) `Learning Materials
            SEARCH([Inventory];[Inventory]Product Code="L@")
        : (b5=1) `Lifestyle
            SEARCH([Inventory];[Inventory]Product Code="S@")
        : (b6=1) `Record/tapes/cd
            SEARCH([Inventory];[Inventory]Product Code="A@")
    End case
    CREATE SET("SetInv")
    INTERSECTION("SetFound";"SetInv";"SetFound")

If (vCode#"")
        SEARCH([Inventory];[Inventory]Product Code=vCode)
        CREATE SET("SetInv")
        INTERSECTION("SetFound";"SetInv";"SetFound")
    End If Case of
        : (c0=1)
        : (c1=1)
            SEARCH([Inventory];[Inventory]CodeBreakDownPerf Level="A")
            CREATE SET("SetInv")
            INTERSECTION("SetFound";"SetInv";"SetFound")
        : (c2=1)
            SEARCH([Inventory];[Inventory]CodeBreakDownPerf Level="B")
            CREATE SET("SetInv")
            INTERSECTION("SetFound";"SetInv";"SetFound")
        : (c3=1)
            SEARCH([Inventory];[Inventory]CodeBreakDownPerf Level="C")
            CREATE SET("SetInv")
            INTERSECTION("SetFound";"SetInv";"SetFound")
    End case
```

```
If (v1#"") & (v2#"")
    SEARCH([Inventory];[Inventory]CodeBreakDown'Age1<=v1;")
    SEARCH([Inventory]; & [Inventory]CodeBreakDown'Age2>=v2)
    CREATE SET("SetInv")
    INTERSECTION("SetFound";"SetInv";"SetFound")
End If If (vGrade1#"") & (vGrade2#"")
    $Search1:=Num(vGrade1)
    $Search2:=Num(vGrade2)
    SEARCH([Inventory];[Inventory]CodeBreakDown'Grade1<=$Search1;")
    SEARCH([Inventory]; & [Inventory]CodeBreakDown'Grade2>=$Search2)
    CREATE SET("SetInv")
    INTERSECTION("SetFound";"SetInv";"SetFound")
End If If (vSubClass#"")
    SEARCH([Inventory];[Inventory]CodeBreakDown'Sub Class=vSubClass)
    CREATE SET("SetInv")
    INTERSECTION("SetFound";"SetInv";"SetFound")
End If If (vRetr#"")
    SEARCH([Inventory];[Inventory]Retrieval'Code=vRetr)
    CREATE SET("SetInv")
    INTERSECTION("SetFound";"SetInv";"SetFound")
End If If (vSubject#"")
    SEARCH([Inventory]CodeBreakDown'Ed Subject=vSubject)
    CREATE SET("SetInv")
    INTERSECTION("SetFound";"SetInv";"SetFound")
End If If (vWord#"")
    StringSelection (vWord)
    INTERSECTION("SetString";"SetFound";"SetFound")
End If USE SET("SetFound")
CLEAR SET("Set")
MyCloseWindow
If (Records in selection>0)
    $0:=True
Else
    ALERT("No Matching Inventory Items Found!")
    $0:=False
End If
End If
```

Saturday, October 6, 1990          Layout:  SearchInvent

Lookup Inventory by:

Product Code    vCode
Product Name    vProduct

Educational Subject  vSubject
Sub Class            vSubClass
Search Word:         vWord from  to
age   [ ] [ ]
grade [ ] [ ]

- ○ All Categories
- ○ Books
- ○ Toys
- ○ Games
- ○ Learning Materials
- ○ Lifestyle
- ○ Records/Tapes/CD

- ○ All Levels
- ○ Basic
- ○ Competency
- ○ Mastery

Cancel ✗.

OK

Saturday, October 6, 1990    Procedure: InventPrint

```
MyOpenWindow(400;260;1) `Invent Print
DIALOG([Constants];"Print Invent")
CLOSE WINDOW
Case of
  : (b1=1) `Matrix listing
      REPORT([Inventory];"Matrix Report")
  : (b2=1) `by code
      REPORT([Inventory];"Inventory by Code")
  : (b3=1) `inventory by Vendor
      `default file
      ALL RECORDS([Vendor])
      REPORT([Vendor];"Inventory by Vendor")
End case
```

Saturday, October 6, 1990    Layout: Print Invent

INVENTORY

Choose Report Type

O Product Matrix Listing

O Inventory by Code#

O Inventory by Vendor

[ Cancel ]    [ OK ]

Saturday, October 6, 1990    Procedure: UsersAdd

```
UseUsers
ID
Adding:=True
ADD RECORD
While (bNext=1)
    ADD RECORD
End while
Adding:=False
EnableAll
```

Saturday, October 6, 1990    Procedure: UsersList

```
UseUsers
ID
ALL RECORDS
MyDialog
MyMessage ("Sorting By Last Name...")
SORT SELECTION([Users];[Users]Users Last)
MyCloseWindow
MODIFY SELECTION
EnableAll
```

Procedure: UsersFind

```
UseUsers
If (OptionKey)
    SEARCH BY FORMULA
    If (OK=1)
        ID
        MODIFY SELECTION
        EnableAll
    End If
Else
    SET WINDOW TITLE("Users: Search By Example")
    SEARCH BY LAYOUT
    If (OK=1)
        ID
        MODIFY SELECTION
        EnableAll
    End If
End If
```

Procedure: PSM614LIST

```
DEFAULT FILE([PSM614])
vFileName:="PSM614"
pFileName:==[PSM614]

ALL RECORDS
MODIFY SELECTION
EnableAll
```

Procedure: PSM614SBE

```
UsePSM614
ID
vName:=""
SET WINDOW TITLE("Search By Example")
SEARCH BY LAYOUT([PSM614])
MODIFY SELECTION
EnableAll
```

Procedure: PSM03LIST

```
UsePSM03
DisableAll
ID
ALL RECORDS
MODIFY SELECTION
EnableAll
```

Procedure: PSM03SBE

```
UsePSM03
ID
vName:=""
SET WINDOW TITLE("Search By Example")
SEARCH BY LAYOUT([PSM0_3])
MODIFY SELECTION
EnableAll
```

Procedure: PSM2_5LIST

```
UsePSM2_5
DisableAll
ID
ALL RECORDS
MODIFY SELECTION
EnableAll
```

Procedure: PSM2_5SBE

```
UsePSM2_5
ID
vName:=""
SET WINDOW TITLE("Search By Example")
SEARCH BY LAYOUT([PSM2_5])
MODIFY SELECTION
EnableAll
```

Saturday, October 6, 1990    Procedure: gpaLIST

```
useGPA
O
SEARCH([GPA];[GPA]SequenceNO#0)
MyDialog
MyMessage ("Sorting GPA by Product Code...")
SORT SELECTION([GPA];[GPA]Prod Code;>)
MyCloseWindow
MODIFY SELECTION
EnableAll
```

Saturday, October 6, 1990    Procedure: PrintGPA

```
MyOpenWindow (400;150;1;"GPA")
DIALOG([Constants];"PrintGPA")
CLOSE WINDOW
Case of
  : (bModify=1)
    gpaLIST
  : (bPrint=1)
    PRINT SETTINGS
    If (OK=1)
      If (Records in file([Bogus])#1)  `make sure 1 is there for included report
        ALL RECORDS([Bogus])
        DELETE SELECTION([Bogus])
        CREATE RECORD([Bogus])
        [Bogus]Field1:="XXX"
        SAVE RECORD([Bogus])
      End if ALL RECORDS([GPA])
      CREATE SET([GPA];"Set1")
      CREATE EMPTY SET([GPA];"Set2")
      SORT SELECTION([GPA]Category>;[GPA]SequenceNO;>;[GPA]PNR;>)
      FIRST RECORD([GPA])
      vUser:=[GPA]Prod Name
      ADD TO SET([GPA];"Set2")
      DIFFERENCE("Set1";"Set2";"Set1")
      USE SET("Set1")
      SEARCH([GPA];[GPA]SequenceNO=0)
      CREATE SET([GPA];"Set2")
      DIFFERENCE("Set1";"Set2";"Set1")
      USE SET("Set1")
      SORT SELECTION([GPA]Category>;[GPA]Prod Name;>)
      vTime:=String(Current time)
      vPage:=0
      OUTPUT LAYOUT([GPA];"ProductList")
      PRINT SELECTION([GPA];")
      OUTPUT LAYOUT([GPA];"Output")
      CLEAR SET("Set1")
      CLEAR SET("Set2")
    End if
  Else
    MyRedraw
End case
```

Saturday, October 6, 1990    Layout: PrintGPA

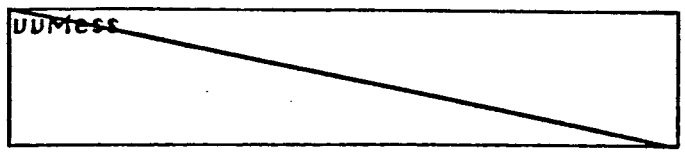

[ Cancel ⌘. ]    [ Print ⌘P ]    [ Modify ]

[ Return ]

Procedure: gpaEXPORT

```
vUser:=gpaUserName
$Num:=Records in selection([GPA])
CONFIRM("Really Export "+vUser+"'s GPA?")
If (OK=1)
    $Name:=vUser+".GPA"
    SET CHANNEL(12;$Name)
    If (OK=1)
        MyDialog
        ALL RECORDS([GPA])
        FIRST RECORD([GPA])
        $Num:=Records in selection([GPA])
        For ($i;1;$num)
            SEND RECORD([GPA])
            NEXT RECORD([GPA])
            $Num:=$Num-1
            MyMessage (String($Num)+" Items To Go!")
        End for
        CLOSE WINDOW
    End If
    SET CHANNEL(11)
End If
```

Procedure: gpaIMPORT

```
ALERT("Select the GPA To Import.")
SET CHANNEL(10;"")
If (OK=1)
    vUser:=gpaUserName
    CONFIRM("OK to Overwrite GPA for "+vUser+"?")
    If (OK=1)
        ALL RECORDS([GPA])
        DELETE SELECTION([GPA])
        $Num:=1
        MyDialog
        CREATE RECORD([GPA])
        RECEIVE RECORD([GPA])
        While (OK=1)
            SAVE RECORD([GPA])
            CREATE RECORD([GPA])
            RECEIVE RECORD([GPA])
            MyMessage ("Imported "+String($Num)+" to GPA")
            $num:=$Num+1
        End while
        CLOSE WINDOW
    End If
    SET CHANNEL(11)
End If
```

Menu Bar #5

Action
| | |
|---|---|
| Search Editor... | ActionMenu |
| Search by Example... | ActionMenu |
| Show All | ActionMenu |
| Show Subset | ActionMenu |
| Omit Subset | ActionMenu |
| Sort Selection... | ActionMenu |
| Sort File... | ActionMenu |
| Delete Selection... | ActionMenu |
| Quick Reports... | ActionMenu |
| Quick Labels... | ActionMenu |
| Quick Graphs... | ActionMenu |
| Print Screen | ActionMenu |
| Quit | |

Procedure: ActionMenu

```
$MenuItem:=Menu selected%65536 `handle the Action Menu
Case of
   :($MenuItem=1)
      SEARCH
   :($MenuItem=2)
      SET WINDOW TITLE("Search By Example")
      SEARCH BY LAYOUT(pFileName») `use a pointer
   :($MenuItem=4)
      ALL RECORDS
   :($MenuItem=5)
      USE SET("UserSet")
   :($MenuItem=6)
      CREATE SET("SetAll")
      USE SET("UserSet")
      CREATE SET("Set")
      DIFFERENCE("SetAll";"Set";"SetFound")
      USE SET("SetFound")
      CLEAR SET("Set") `compatible with compiler?
   :($MenuItem=8)
      SORT SELECTION
   :($MenuItem=9)
      CONFIRM("This Can Take Some Time, OK to Proceed?")
      If (OK=1)
         Case of
            :(vFileName="Vendor")
               SORT FILE([Vendor];[Vendor]Company>)
            :(vFileName="Inventory")
               SORT FILE([Inventory];[Inventory]Product Name;>)
         End case
      End If
   :($MenuItem=11)

DELETE

:($MenuItem=13)
      REPORT("""")
   :($MenuItem=14)
      PRINT LABEL("""")
   :($MenuItem=15)
      GRAPH FILE
   :($MenuItem=17)
      PRINT SELECTION
End case
```

Menu Bar #6

Action
   Accept [enter]                         MyAccept
   Cancel [esc]                           MyCancel Procedure: MyAccept

ACCEPT

Procedure: MyCancel

CANCEL

APPENDIX IV

PSM0-3 Matching Code

Friday, September 28, 1990     Procedure: PSM0_3Match

```
$UserNum:=$1
vAgeEquiv:=Substring([Users]Age Equiv;1;1)
SEARCH([PSM0_3];[PSM0_3]UIN=$UserNum)
If (Records in selection([PSM0_3])=1)
    CONFIRM("Medical Conditions and Other Conditions Reviewed?  Click OK to Proceed.")
    If (OK=1)
        GPA Setup $Temp:=LoadNo ("SeqProgYN")
        If ($Temp=1)
            vEnabled:=True
        Else
            vEnabled:=False
        End If
        CREATE EMPTY SET([Inventory];"Bucket 1")
        CREATE EMPTY SET([Inventory];"Bucket 2")
        CREATE EMPTY SET([Inventory];"Bucket 3")
        CREATE EMPTY SET([Inventory];"Bucket 4")
        CREATE EMPTY SET([Inventory];"Bucket 5")
        CREATE EMPTY SET([Inventory];"Bucket 6")
        CREATE EMPTY SET([Inventory];"Bucket 7")
        ALL RECORDS([Inventory])
        CREATE SET([Inventory];"Bucket 1")

PSM0_3Seq3
        PSM0_3Seq11
        PSM0_3Seq24
        PSM0_3Seq30
        PSM0_3Seq35
        PSM0_3Seq42
        PSM0_3Seq49
        PSM0_3Seq58

PrintGPA
    Else
        BEEP
    End If
Else
    ALERT("Please Enter PSM information FIRST!")
End If
```

Friday, September 28, 1990     Procedure: PSM0_3Seq3

```
vSequence:=1
vQuestion:="Age"
$Age:=[Users]Age Equiv
$AgeCode:=Substring([Users]Age Equiv;1;1)
Case of
    :($AgeCode="A")  ` 1-3 months  (A-C)
        SEARCH([Inventory];[Inventory]CodeBreakDown'Age1<="A";*)
        SEARCH([Inventory]; & [Inventory]CodeBreakDown'Age2>="A")
        CREATE SET("Set1")
        SEARCH([Inventory];[Inventory]CodeBreakDown'Age1<="B";*)
        SEARCH([Inventory]; & [Inventory]CodeBreakDown'Age2>="B")
        CREATE SET("Set2")
        SEARCH([Inventory];[Inventory]CodeBreakDown'Age1<="C";*)
        SEARCH([Inventory]; & [Inventory]CodeBreakDown'Age2>="C")
        CREATE SET("Set3")
        UNION("Set1";"Set2";"SetFound")
        UNION("SetFound";"Set3";"SetFound")
        USE SET("SetFound")
        CLEAR SET("Set1")
        CLEAR SET("Set2")
        CLEAR SET("Set3")
        CLEAR SET("SetFound")

:($AgeCode="B")  ` 4-6 months  (A-D)
        SEARCH([Inventory];[Inventory]CodeBreakDown'Age1<="A";*)
        SEARCH([Inventory]; & [Inventory]CodeBreakDown'Age2>="A")
        CREATE SET("Set1")
```

```
    SEARCH([Inventory];[Inventory]CodeBreakDown'Age1<="B";")
    SEARCH([Inventory]; & [Inventory]CodeBreakDown'Age2>="B")
    CREATE SET("Set2")
    SEARCH([Inventory];[Inventory]CodeBreakDown'Age1<="C";")
    SEARCH([Inventory]; & [Inventory]CodeBreakDown'Age2>="C")
    CREATE SET("Set3")
    SEARCH([Inventory];[Inventory]CodeBreakDown'Age1<="D";")
    SEARCH([Inventory]; & [Inventory]CodeBreakDown'Age2>="D")
    CREATE SET("Set4")
    UNION("Set1";"Set2";"SetFound")
    UNION("SetFound";"Set3";"SetFound")
    UNION("SetFound";"Set4";"SetFound")
    USE SET("SetFound")
    CLEAR SET("Set1")
    CLEAR SET("Set2")
    CLEAR SET("Set3")
    CLEAR SET("Set4")
    CLEAR SET("SetFound")

:($AgeCode="C") ` 7-9 months   (B-E)
    SEARCH([Inventory];[Inventory]CodeBreakDown'Age1<="B";")
    SEARCH([Inventory]; & [Inventory]CodeBreakDown'Age2>="B")
    CREATE SET("Set1")
    SEARCH([Inventory];[Inventory]CodeBreakDown'Age1<="C";")
    SEARCH([Inventory]; & [Inventory]CodeBreakDown'Age2>="C")
    CREATE SET("Set2")
    SEARCH([Inventory];[Inventory]CodeBreakDown'Age1<="D";")
    SEARCH([Inventory]; & [Inventory]CodeBreakDown'Age2>="D")
    CREATE SET("Set3")
    SEARCH([Inventory];[Inventory]CodeBreakDown'Age1<="E";")
    SEARCH([Inventory]; & [Inventory]CodeBreakDown'Age2>="E")
    CREATE SET("Set4")
    UNION("Set1";"Set2";"SetFound")
    UNION("SetFound";"Set3";"SetFound")
    UNION("SetFound";"Set4";"SetFound")
    USE SET("SetFound")
    CLEAR SET("Set1")
    CLEAR SET("Set2")
    CLEAR SET("Set3")
    CLEAR SET("Set4")
    CLEAR SET("SetFound")
:($AgeCode="D") ` 10-12 months   (C-F)
    SEARCH([Inventory];[Inventory]CodeBreakDown'Age1<="C";")
    SEARCH([Inventory]; & [Inventory]CodeBreakDown'Age2>="C")
    CREATE SET("Set1")
    SEARCH([Inventory];[Inventory]CodeBreakDown'Age1<="D";")
    SEARCH([Inventory]; & [Inventory]CodeBreakDown'Age2>="D")
    CREATE SET("Set2")
    SEARCH([Inventory];[Inventory]CodeBreakDown'Age1<="E";")
    SEARCH([Inventory]; & [Inventory]CodeBreakDown'Age2>="E")
    CREATE SET("Set3")
    SEARCH([Inventory];[Inventory]CodeBreakDown'Age1<="F";")
    SEARCH([Inventory]; & [Inventory]CodeBreakDown'Age2>="F")
    CREATE SET("Set4")
    UNION("Set1";"Set2";"SetFound")
    UNION("SetFound";"Set3";"SetFound")
    UNION("SetFound";"Set4";"SetFound")
    USE SET("SetFound")
    CLEAR SET("Set1")
    CLEAR SET("Set2")
    CLEAR SET("Set3")
    CLEAR SET("Set4")
    CLEAR SET("SetFound")

:($AgeCode="E") ` 13-15 months    (D-G)
    SEARCH([Inventory];[Inventory]CodeBreakDown'Age1<="D";")
    SEARCH([Inventory]; & [Inventory]CodeBreakDown'Age2>="D")
    CREATE SET("Set1")
    SEARCH([Inventory];[Inventory]CodeBreakDown'Age1<="E";")
    SEARCH([Inventory]; & [Inventory]CodeBreakDown'Age2>="E")
    CREATE SET("Set2")
    SEARCH([Inventory];[Inventory]CodeBreakDown'Age1<="F";")
    SEARCH([Inventory]; & [Inventory]CodeBreakDown'Age2>="F")
    CREATE SET("Set3")
    SEARCH([Inventory];[Inventory]CodeBreakDown'Age1<="G";")
    SEARCH([Inventory]; & [Inventory]CodeBreakDown'Age2>="G")
    CREATE SET("Set4")
    UNION("Set1";"Set2";"SetFound")
    UNION("SetFound";"Set3";"SetFound")
    UNION("SetFound";"Set4";"SetFound")
    USE SET("SetFound")
    CLEAR SET("Set1")
    CLEAR SET("Set2")
```

```
  CLEAR SET("Set3")
  CLEAR SET("Set4")
  CLEAR SET("SetFound")

:($AgeCode="F") ` 16-19 months (E-G)
  SEARCH([Inventory];[Inventory]CodeBreakDown'Age1<="E";)
  SEARCH([Inventory]; & [Inventory]CodeBreakDown'Age2>="E")
  CREATE SET("Set1")
  SEARCH([Inventory];[Inventory]CodeBreakDown'Age1<="F";)
  SEARCH([Inventory]; & [Inventory]CodeBreakDown'Age2>="F")
  CREATE SET("Set2")
  SEARCH([Inventory];[Inventory]CodeBreakDown'Age1<="G";)
  SEARCH([Inventory]; & [Inventory]CodeBreakDown'Age2>="G")
  CREATE SET("Set3")
  UNION("Set1";"Set2";"SetFound")
  UNION("SetFound";"Set3";"SetFound")
  USE SET("SetFound")
  CLEAR SET("Set1")
  CLEAR SET("Set2")
  CLEAR SET("Set3")
  CLEAR SET("SetFound")

:($AgeCode="G") ` 20-24 months (F-H)
  SEARCH([Inventory];[Inventory]CodeBreakDown'Age1<="F";)
  SEARCH([Inventory]; & [Inventory]CodeBreakDown'Age2>="F")
  CREATE SET("Set1")
  SEARCH([Inventory];[Inventory]CodeBreakDown'Age1<="G";)
  SEARCH([Inventory]; & [Inventory]CodeBreakDown'Age2>="G")
  CREATE SET("Set2")
  SEARCH([Inventory];[Inventory]CodeBreakDown'Age1<="H";)
  SEARCH([Inventory]; & [Inventory]CodeBreakDown'Age2>="H")
  CREATE SET("Set3")
  UNION("Set1";"Set3";"Set1")
  UNION("Set1";"Set2";"SetFound")
  USE SET("SetFound")
  CLEAR SET("Set1")
  CLEAR SET("Set2")
  CLEAR SET("Set3")
  CLEAR SET("SetFound")

:($AgeCode="H")
  SEARCH([Inventory];[Inventory]CodeBreakDown'Age1<="G";)
  SEARCH([Inventory]; & [Inventory]CodeBreakDown'Age2>="G")
  CREATE SET("Set1")
  SEARCH([Inventory];[Inventory]CodeBreakDown'Age1<="H";)
  SEARCH([Inventory]; & [Inventory]CodeBreakDown'Age2>="H")
  CREATE SET("Set2")
  SEARCH([Inventory];[Inventory]CodeBreakDown'Age1<="I";)
  SEARCH([Inventory]; & [Inventory]CodeBreakDown'Age2>="I")
  CREATE SET("Set3")
  UNION("Set1";"Set3";"Set1")
  UNION("Set1";"Set2";"SetFound")
  USE SET("SetFound")
  CLEAR SET("Set1")
  CLEAR SET("Set2")
  CLEAR SET("Set3")
  CLEAR SET("SetFound")

:($AgeCode="I")
  SEARCH([Inventory];[Inventory]CodeBreakDown'Age1<="H";)
  SEARCH([Inventory];  & [Inventory]CodeBreakDown'Age2>="H")
  CREATE SET("Set1")
  SEARCH([Inventory];[Inventory]CodeBreakDown'Age1<="I";)
  SEARCH([Inventory]; & [Inventory]CodeBreakDown'Age2>="I")
  CREATE SET("Set2")
  UNION("Set1";"Set2";"SetFound")
  USE SET("SetFound")
  CLEAR SET("Set1")
  CLEAR SET("Set2")
  CLEAR SET("SetFound")

Else
  BEEP
  BEEP
  BEEP
  ALERT("Age Code is Beyond 'I', using 'H'")

SEARCH([Inventory];[Inventory]CodeBreakDown'Age1<="H";)
  SEARCH([Inventory]; & [Inventory]CodeBreakDown'Age2>="H")
  CREATE SET("Set1")
  SEARCH([Inventory];[Inventory]CodeBreakDown'Age1<="I";)
  SEARCH([Inventory]; & [Inventory]CodeBreakDown'Age2>="I")
  CREATE SET("Set2")
```

```
            UNION("Set1";"Set2";"SetFound")
            USE SET("SetFound")
            CLEAR SET("Set1")
            CLEAR SET("Set2")
            CLEAR SET("SetFound")
    End case
    CREATE SET("SetTemp")
    INTERSECTION("Bucket 1";"SetTemp";"Bucket 1")
    PSMDebug
    vSequence:=2
    vQuestion:="Sex"
    $Search:=Substring([Users]Sex;1;1)+" "
    SEARCH([Inventory];[Inventory]Sex=$Search;*)
    SEARCH([Inventory]; | [Inventory]Sex="A ")
    CREATE SET("SetTemp")
    INTERSECTION("Bucket 1";"SetTemp";"Bucket 1")
    PSMDebug vSequence:=3
    vQuestion:="Ethnic"
    $Search:=[Users]Racial Cultural
    SEARCH([Inventory];[Inventory]Ethnic=$Search;*)
    SEARCH([Inventory]; | [Inventory]Ethnic="All")
    CREATE SET("SetTemp")
    INTERSECTION("Bucket 1";"SetTemp";"Bucket 1")
    PSMDebug
```

Friday, September 28, 1990          Procedure:   PSM0_3Seq11                              1

```
vQuestion:="Numbers"
vSequence:=4
vCategory:="2. Educational"
vKeyWord:=""
vPNR:=""
SEARCH([Inventory];[Inventory]4D=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug vQuestion:="Alpha Letters"
vSequence:=5
vCategory:="2. Educational"
vKeyWord:=""
vPNR:=""
SEARCH([Inventory];[Inventory]4E=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug vQuestion:="Life Skills"
vSequence:=6
vCategory:="2. Educational"
vKeyWord:=""
vPNR:=""
SEARCH([Inventory];[Inventory]4F=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug
```

```
vQuestion:="Communication"
vSequence:=7
vCategory:="2. Educational"
vKeyWord:=""
vPNR:=""
SEARCH([Inventory];[Inventory]4G=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug
vQuestion:="Relationships"
vSequence:=8
vCategory:="2. Educational"
vKeyWord:=""
vPNR:=""
SEARCH([Inventory];[Inventory]4H=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug vQuestion:="Drawing, puzzles, building"
vSequence:=9
vCategory:="2. Educational"
vKeyWord:=""
vPNR:=""
SEARCH([Inventory];[Inventory]4I=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug vQuestion:="Music"
vSequence:=10
vCategory:="2. Educational"
vKeyWord:=""
vPNR:=""
SEARCH([Inventory];[Inventory]4J=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug vQuestion:="Other"
vSequence:=11
vCategory:="2. Educational"
vKeyWord:=""
vPNR:=""
SEARCH([Inventory];[Inventory]4K=True)
CREATE SET("SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
If ($Num>0)
    AddToGPA
End If
PSMDebug
```

```
vQuestion:="Auditory Reception"
vSequence:=12
vCategory:="3. Learning"
vKeyWord:=""
vPNR:=""
If ([PSM0_3]31A1#"")
    SEARCH([Inventory];[Inventory]3A=True;")
    SEARCH([Inventory]; & [Inventory]Sound=True;")
    SEARCH([Inventory]; | [Inventory]5M=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records In set("SetTemp1")
    UNION("SetTemp1";"Bucket 3";"Bucket 3")
    If ($Num>0)
        AddToGPA
    End If
End If
PSMDebug vQuestion:="Auditory Association"
vSequence:=13
vCategory:="3. Learning"
vKeyWord:=""
vPNR:=""
If ([PSM0_3]31A2#"")
    SEARCH([Inventory];[Inventory]3B=True;")
    SEARCH([Inventory]; & [Inventory]Sound=True;")
    SEARCH([Inventory]; | [Inventory]5M=True;")
    SEARCH([Inventory]; | [Inventory]5P=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records In set("SetTemp1")
    UNION("SetTemp1";"Bucket 3";"Bucket 3")
    If ($Num>0)
        AddToGPA
    End If
End If
PSMDebug vQuestion:="Auditory Memory"
vSequence:=14
vCategory:="3. Learning"
vKeyWord:=""
vPNR:=""
If ([PSM0_3]31A3#"")
    SEARCH([Inventory];[Inventory]3C=True;")
    SEARCH([Inventory]; & [Inventory]Sound=True;")
    SEARCH([Inventory]; | [Inventory]5M=True;")
    SEARCH([Inventory]; | [Inventory]5K=True;")
    SEARCH([Inventory]; | [Inventory]5L=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records In set("SetTemp1")
    UNION("SetTemp1";"Bucket 3";"Bucket 3")
    If ($Num>0)
        AddToGPA
    End If
End If
PSMDebug vQuestion:="Grammer"
vSequence:=15
vCategory:="3. Learning"
vKeyWord:=""
vPNR:=""
If ([PSM0_3]31A4#"")
    SEARCH([Inventory];[Inventory]3D=True;")
    SEARCH([Inventory]; & [Inventory]Sound=True;")
    SEARCH([Inventory]; | [Inventory]5M=True;")
    SEARCH([Inventory]; | [Inventory]5E=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
```

```
        $Num:=Records in set("SetTemp1")
        UNION("SetTemp1";"Bucket 3";"Bucket 3")
        ┌If ($Num>0)
        │    AddToGPA
        └End If
    └End If
    PSMDebug vQuestion:="Visual Rec."
    vSequence:=16
    vCategory:="3. Learning"
    vKeyWord:=""
    vPNR:=""
    ┌If ([PSM0_3]31A5#"")
    │    SEARCH([Inventory];[Inventory]3E=True;")
    │    SEARCH([Inventory]; & [Inventory]Sight=True;")
    │    SEARCH([Inventory]; | [Inventory]5M=True)
    │    CREATE SET("SetTemp")
    │    INTERSECTION("SetTemp";"Bucket 1";"SetTemp1")
    │    DIFFERENCE("SetTemp1";"Bucket 3";"SetTemp1")
    │    USE SET("SetTemp1")
    │    $Num:=Records in set("SetTemp1")
    │    UNION("SetTemp1";"Bucket 3";"Bucket 3")
    │    ┌If ($Num>0)
    │    │    AddToGPA
    │    └End If
    └End If
    PSMDebug vQuestion:="Visual Assoc."
    vSequence:=17
    vCategory:="3. Learning"
    vKeyWord:=""
    vPNR:=""
    ┌If ([PSM0_3]31A6#"")
    │    SEARCH([Inventory];[Inventory]3F=True;")
    │    SEARCH([Inventory]; & [Inventory]Sight=True;")
    │    SEARCH([Inventory]; | [Inventory]5M=True;")
    │    SEARCH([Inventory]; | [Inventory]5P=True)
    │    CREATE SET("SetTemp")
    │    INTERSECTION("SetTemp";"Bucket 1";"SetTemp1")
    │    DIFFERENCE("SetTemp1";"Bucket 3";"SetTemp1")
    │    USE SET("SetTemp1")
    │    $Num:=Records in set("SetTemp1")
    │    UNION("SetTemp1";"Bucket 3";"Bucket 3")
    │    ┌If ($Num>0)
    │    │    AddToGPA
    │    └End If
    └End If
    PSMDebug vQuestion:="Visual Memory"
    vSequence:=18
    vCategory:="3. Learning"
    vKeyWord:=""
    vPNR:=""
    ┌If ([PSM0_3]31A7#"")
    │    SEARCH([Inventory];[Inventory]3G=True;")
    │    SEARCH([Inventory]; & [Inventory]Sight=True;")
    │    SEARCH([Inventory]; | [Inventory]5M=True;")
    │    SEARCH([Inventory]; | [Inventory]5K=True;")
    │    SEARCH([Inventory]; | [Inventory]5L=True)
    │    CREATE SET("SetTemp")
    │    INTERSECTION("SetTemp";"Bucket 1";"SetTemp1")
    │    DIFFERENCE("SetTemp1";"Bucket 3";"SetTemp1")
    │    USE SET("SetTemp1")
    │    $Num:=Records in set("SetTemp1")
    │    UNION("SetTemp1";"Bucket 3";"Bucket 3")
    │    ┌If ($Num>0)
    │    │    AddToGPA
    │    └End If
    └End If
    PSMDebug vQuestion:="Perceptual Const."
    vSequence:=19
    vCategory:="3. Learning"
    vKeyWord:=""
    vPNR:=""
    ┌If ([PSM0_3]31A8#"")
    │    SEARCH([Inventory];[Inventory]3H=True;")
    │    SEARCH([Inventory]; & [Inventory]Sight=True;")
    │    SEARCH([Inventory]; | [Inventory]5K=True;")
```

```
    SEARCH([Inventory]; | [Inventory]5L=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records In set("SetTemp1")
    UNION("SetTemp1";"Bucket 3";"Bucket 3")
    If ($Num>0)
        AddToGPA
    End If
End If
PSMDebug vQuestion:="Spatial Relationship"
vSequence:=20
vCategory:="3. Learning"
vKeyWord:=""
vPNR:=""
If ([PSM0_3]31A9#"")
    SEARCH([Inventory];[Inventory]3I=True;")
    SEARCH([Inventory]; & [Inventory]Sound=True;")
    SEARCH([Inventory]; | [Inventory]Sight=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records In set("SetTemp1")
    UNION("SetTemp1";"Bucket 3";"Bucket 3")
    If ($Num>0)
        AddToGPA
    End If
End If
PSMDebug vQuestion:="Eye/Hand"
vSequence:=21
vCategory:="3. Learning"
vKeyWord:=""
vPNR:=""
If ([PSM0_3]31A10#"")
    SEARCH([Inventory];[Inventory]3J=True;")
    SEARCH([Inventory]; & [Inventory]Touch=True;")
    SEARCH([Inventory]; | [Inventory]5N=True;")
    SEARCH([Inventory]; | [Inventory]Sight=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records In set("SetTemp1")
    UNION("SetTemp1";"Bucket 3";"Bucket 3")
    If ($Num>0)
        AddToGPA
    End If
End If
PSMDebug vQuestion:="Balance"
vSequence:=22
vCategory:="3. Learning"
vKeyWord:=""
vPNR:=""
If ([PSM0_3]31A11#"")
    SEARCH([Inventory];[Inventory]3K=True;")
    SEARCH([Inventory]; & [Inventory]Sound=True;")
    SEARCH([Inventory]; | [Inventory]5N=True;")
    SEARCH([Inventory]; | [Inventory]Sight=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records In set("SetTemp1")
    UNION("SetTemp1";"Bucket 3";"Bucket 3")
    If ($Num>0)
        AddToGPA
    End If
End If
PSMDebug vQuestion:="Verbal Expression"
vSequence:=23
vCategory:="3. Learning"
vKeyWord:=""
vPNR:=""
```

```
┌ If ([PSM0_3]31A12#"")
│    SEARCH([Inventory];[Inventory]3L=True;")
│    SEARCH([Inventory]; & [Inventory]Sound=True;")
│    SEARCH([Inventory]; | [Inventory]5M=True;")
│    SEARCH([Inventory]; | [Inventory]5E=True;")
│    SEARCH([Inventory]; | [Inventory]Sight=True)
│    CREATE SET("SetTemp")
│    INTERSECTION("SetTemp";"Bucket 1";"SetTemp1")
│    DIFFERENCE("SetTemp1";"Bucket 3";"SetTemp1")
│    USE SET("SetTemp1")
│    $Num:=Records In set("SetTemp1")
│    UNION("SetTemp1";"Bucket 3";"Bucket 3")
│  ┌ If ($Num>0)
│  │    AddToGPA
│  └ End If
└ End If
  PSMDebug
```

Friday, September 28, 1990          Procedure:   PSM0_3Seq30

```
┌ If (vAgeEquiv="A")
│
│    vQuestion:="Infant Grasps"
│    vSequence:=25
│    vCategory:="4. Infant 0-4"
│    vKeyWord:=""
│  ┌ If ([PSM0_3]1A="")
│  │    vPNR:="(N)"
│  │ Else
│  │    vPNR:="(P)"
│  └ End If
│
│    SEARCH([Inventory];[Inventory]Touch=True)
│    CREATE SET("SetTemp")
│    INTERSECTION("SetTemp";"Bucket 1";"SetTemp1")
│    DIFFERENCE("SetTemp1";"Bucket 4";"SetTemp1")
│    USE SET("SetTemp1")
│    $Num:=Records In set("SetTemp1")
│    UNION("SetTemp1";"Bucket 4";"Bucket 4")
│  ┌ If ($Num>0)
│  │    AddToGPA
│  └ End If
│    PSMDebug
│
│    vQuestion:="Infant uses both hands"
│    vSequence:=26
│    vCategory:="4. Infant 0-4"
│    vKeyWord:="3E, 3F, 3J"
│  ┌ If ([PSM0_3]2A="")
│  │    vPNR:="(N)"
│  │ Else
│  │    vPNR:="(P)"
│  └ End If
│    SEARCH([Inventory];[Inventory]Touch=True)
│    CREATE SET("SetTemp")
│    INTERSECTION("SetTemp";"Bucket 1";"SetTemp1")
│    DIFFERENCE("SetTemp1";"Bucket 4";"SetTemp1")
│    USE SET("SetTemp1")
│    $Num:=Records In set("SetTemp1")
│    UNION("SetTemp1";"Bucket 4";"Bucket 4")
│  ┌ If ($Num>0)
│  │    AddToGPA
│  └ End If
│    PSMDebug
│
│    vQuestion:="Infant/Object Above Head"
│    vSequence:=27
│    vCategory:="4. Infant 0-4"
│    vKeyWord:="3E, 3F"
│  ┌ If ([PSM0_3]3A="")
│  │    vPNR:="(N)"
│  │ Else
│  │    vPNR:="(P)"
│  └ End If
│    SEARCH([Inventory];[Inventory]Touch=True;")
│    SEARCH([Inventory]; | [Inventory]Sight=True)
│    CREATE SET("SetTemp")
│    INTERSECTION("SetTemp";"Bucket 1";"SetTemp1")
│    DIFFERENCE("SetTemp1";"Bucket 4";"SetTemp1")
│    USE SET("SetTemp1")
```

```
$Num:=Records in set("SetTemp1")
UNION("SetTemp1";"Bucket 4";"Bucket 4")
If ($Num>0)
    AddToGPA
End If
PSMDebug vQuestion:="Infant/Eyes Follow"
vSequence:=28
vCategory:="4. Infant 0-4"
vKeyWord:="3E, 3F"
If ([PSM0_3]4A="")
    vPNR:="(N)"
Else
    vPNR:="(P)"
End If
SEARCH([Inventory];[Inventory]Sight=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records in set("SetTemp1")
UNION("SetTemp1";"Bucket 4";"Bucket 4")
If ($Num>0)
    AddToGPA
End If
PSMDebug vQuestion:="Infant Socializes"
vSequence:=29
vCategory:="4. Infant 0-4"
vKeyWord:="3E, 3F, 3A, 3B"
If ([PSM0_3]5A="")
    vPNR:="(N)"
Else
    vPNR:="(P)"
End If
SEARCH([Inventory];[Inventory]Touch=True;"")
SEARCH([Inventory]; | [Inventory]Sight=True;")
SEARCH([Inventory]; | [Inventory]Sound=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records in set("SetTemp1")
UNION("SetTemp1";"Bucket 4";"Bucket 4")
If ($Num>0)
    AddToGPA
End If
PSMDebug vQuestion:="Infant Responds to Sounds"
vSequence:=30
vCategory:="4. Infant 0-4"
vKeyWord:="3A, 3B"
If ([PSM0_3]6A="")
    vPNR:="(N)"
Else
    vPNR:="(P)"
End If
SEARCH([Inventory];[Inventory]Sound=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records in set("SetTemp1")
UNION("SetTemp1";"Bucket 4";"Bucket 4")
If ($Num>0)
    AddToGPA
End If
PSMDebug End If
```

```
If (vAgeEquiv="B")
   vCategory::="5. Baby 4-6"

vQuestion:="Baby Turns"
   vSequence:=31
   vKeyWord:="3A, 3B"
   If ([PSM0_3]7A="")
      vPNR:="(N)"
   Else
      vPNR:="(P)"
   End If
   SEARCH([Inventory];[Inventory]5N="Large")
   CREATE SET("SetTemp")
   INTERSECTION("SetTemp";"Bucket 1";"SetTemp1")
   DIFFERENCE("SetTemp1";"Bucket 4";"SetTemp1")
   USE SET("SetTemp1")
   $Num:=Records in set("SetTemp1")
   UNION("SetTemp1";"Bucket 4";"Bucket 4")
   If ($Num>0)
      AddToGPA
   End If
   PSMDebug vQuestion:="Baby Responds"
   vSequence:=32
   vKeyWord:="3A, 3B"
   If ([PSM0_3]8A="")
      vPNR:="(N)"
   Else
      vPNR:="(P)"
   End If
   SEARCH([Inventory];[Inventory]Sound=True)
   CREATE SET("SetTemp")
   INTERSECTION("SetTemp";"Bucket 1";"SetTemp1")
   DIFFERENCE("SetTemp1";"Bucket 4";"SetTemp1")
   USE SET("SetTemp1")
   $Num:=Records in set("SetTemp1")
   UNION("SetTemp1";"Bucket 4";"Bucket 4")
   If ($Num>0)
      AddToGPA
   End If
   PSMDebug vQuestion:="Baby Makes Contact"
   vSequence:=33
   vKeyWord:="3E, 3F, 3J"
   If ([PSM0_3]9A="")
      vPNR:="(N)"
   Else
      vPNR:="(P)"
   End If
   SEARCH([Inventory];[Inventory]Touch=True;"")
   SEARCH([Inventory]; | [Inventory]Sight=True)
   CREATE SET("SetTemp")
   INTERSECTION("SetTemp";"Bucket 1";"SetTemp1")
   DIFFERENCE("SetTemp1";"Bucket 4";"SetTemp1")
   USE SET("SetTemp1")
   $Num:=Records in set("SetTemp1")
   UNION("SetTemp1";"Bucket 4";"Bucket 4")
   If ($Num>0)
      AddToGPA
   End If
   PSMDebug vQuestion:="Baby Moves Objects"
   vSequence:=34
   vKeyWord:="3E, 3F, 3J"
   If ([PSM0_3]9A="")
      vPNR:="(N)"
   Else
      vPNR:="(P)"
   End If
   SEARCH([Inventory];[Inventory]Touch=True)
   CREATE SET("SetTemp")
   INTERSECTION("SetTemp";"Bucket 1";"SetTemp1")
   DIFFERENCE("SetTemp1";"Bucket 4";"SetTemp1")
   USE SET("SetTemp1")
   $Num:=Records in set("SetTemp1")
   UNION("SetTemp1";"Bucket 4";"Bucket 4")
```

```
If ($Num>0)
    AddToGPA
End If
PSMDebug vQuestion:="Baby Sits Up"
vSequence:=35
vKeyWord:="3E, 3F, 3J"
If ([PSM0_3]9A="")
    vPNR:="(N)"
Else
    vPNR:="(P)"
End If
SEARCH([Inventory];[Inventory]5N="Large")
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug End If
```

Friday, September 28, 1990        Procedure:  PSM0_3Seq42        1

```
If (vAgeEquiv="C")
    vCategory:="5. Child 6-9"

vQuestion:="Child Sits Up"
    vSequence:=36
    vKeyWord:="3E, 3F, 3J"
    If ([PSM0_3]12A="")
        vPNR:="(N)"
    Else
        vPNR:="(P)"
    End If
    SEARCH([Inventory];[Inventory]5N="Large")
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records In set("SetTemp1")
    UNION("SetTemp1";"Bucket 4";"Bucket 4")
    If ($Num>0)
        AddToGPA
    End If
    PSMDebug vQuestion:="Child fearful strangers"
    vSequence:=37
    vKeyWord:="3A, 3B, 3E, 3F"
    If ([PSM0_3]13A="")
        vPNR:="(N)"
    Else
        vPNR:="(P)"
    End If
    SEARCH([Inventory];[Inventory]Sight=True;")
    SEARCH([Inventory]; | [Inventory]Sound=True;")
    SEARCH([Inventory]; | [Inventory]5E=True)
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records In set("SetTemp1")
    UNION("SetTemp1";"Bucket 4";"Bucket 4")
    If ($Num>0)
        AddToGPA
    End If
    PSMDebug vQuestion:="Child understands words"
    vSequence:=38
    vKeyWord:="3A, 3B, 3L"
```

```
If ([PSM0_3]14A="")
    vPNR:="(N)"
Else
    vPNR:="(P)"
End If
SEARCH([Inventory];[Inventory]Sound=True;")
SEARCH([Inventory]; | [Inventory]5E=True;")
SEARCH([Inventory]; | [Inventory]4G=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child speaks words"
vSequence:=39
vKeyWord:="3A, 3B, 3L"
If ([PSM0_3]15A="")
    vPNR:="(N)"
Else
    vPNR:="(P)"
End If
SEARCH([Inventory];[Inventory]Sound=True;")
SEARCH([Inventory]; | [Inventory]5E=True;")
SEARCH([Inventory]; | [Inventory]4G=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Crawls"
vSequence:=40
vKeyWord:="3E, 3F, 3K"
If ([PSM0_3]16A="")
    vPNR:="(N)"
Else
    vPNR:="(P)"
End If
SEARCH([Inventory];[Inventory]5N="Large")
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Stands"
vSequence:=41
vKeyWord:="3E, 3F, 3K"
If ([PSM0_3]17A="")
    vPNR:="(N)"
Else
    vPNR:="(P)"
End If
SEARCH([Inventory];[Inventory]5N="Large")
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug
```

```
vQuestion:="Child Looks for Toys"
vSequence:=42
vKeyWord:="3E, 3F, 3J"
If ([PSM0_3]18A="")
    vPNR:="(N)"
Else
    vPNR:="(P)"
End If
SEARCH([Inventory];[Inventory]Sight=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug End If
If (vAgeEquiv>="C") | (vAgeEquiv<="F")
    vCategory:="6. Child 14-24"

vQuestion:="Child Sits Up"
    vSequence:=43
    vKeyWord:="3K"
    If ([PSM0_3]19A="")
        vPNR:="(N)"
    Else
        vPNR:="(P)"
    End If
    SEARCH([Inventory];[Inventory]5N="Large")
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records In set("SetTemp1")
    UNION("SetTemp1";"Bucket 4";"Bucket 4")
    If ($Num>0)
        AddToGPA
    End If
    PSMDebug If (vAgeEquiv>="D") | (vAgeEquiv<="H")
        vQuestion:="Child Speaks Sentences"
        vSequence:=44
        vKeyWord:="3A, 3B, 3C, 3L, 4G"
        If ([PSM0_3]20A="")
            vPNR:="(N)"
        Else
            vPNR:="(P)"
        End If
        SEARCH([Inventory];[Inventory]Sound=True;")
        SEARCH([Inventory]; | [Inventory]Sight=True;")
        SEARCH([Inventory]; | [Inventory]5E=True;")
        SEARCH([Inventory]; | [Inventory]5F=True)
        CREATE SET("SetTemp")
        INTERSECTION("SetTemp";"Bucket 1";"SetTemp1")
        DIFFERENCE("SetTemp1";"Bucket 4";"SetTemp1")
        USE SET("SetTemp1")
        $Num:=Records In set("SetTemp1")
        UNION("SetTemp1";"Bucket 4";"Bucket 4")
        If ($Num>0)
            AddToGPA
        End If
    End If
    PSMDebug vQuestion:="Child Socializes"
    vSequence:=45
    vKeyWord:="3A, 3B, 3C, 3L, 4G"
    If ([PSM0_3]21A="")
        vPNR:="(N)"
    Else
        vPNR:="(P)"
    End If
    SEARCH([Inventory];[Inventory]5F=True;")
    SEARCH([Inventory]; | [Inventory]Sound=True)
```

```
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Wagon"
vSequence:=46
vKeyWord:="3E, 3F, 3K"
If ([PSM0_3]22A="")
    vPNR:="(N)"
Else
    vPNR:="(P)"
End If
SEARCH([Inventory];[Inventory]5N="Large";)
SEARCH([Inventory]; | [Inventory]Sight=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Tricycle"
vSequence:=47
vKeyWord:="3E, 3F, 3K"
If ([PSM0_3]22B="")
    vPNR:="(N)"
Else
    vPNR:="(P)"
End If
SEARCH([Inventory];[Inventory]5N="Large";)
SEARCH([Inventory]; | [Inventory]Sight=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Throws Ball"
vSequence:=48
vKeyWord:="3E, 3F, 3J"
If ([PSM0_3]23A="")
    vPNR:="(N)"
Else
    vPNR:="(P)"
End If
SEARCH([Inventory];[Inventory]5N="Large";)
SEARCH([Inventory]; | [Inventory]Sight=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Catches Ball"
vSequence:=49
vKeyWord:="3E, 3F, 3J"
If ([PSM0_3]24A="")
    vPNR:="(N)"
Else
    vPNR:="(P)"
End If
```

```
        SEARCH([Inventory];[Inventory]5N="Large";)
        SEARCH([Inventory]; | [Inventory]Sight=True)
        CREATE SET("SetTemp")
        INTERSECTION("SetTemp";"Bucket 1";"SetTemp1")
        DIFFERENCE("SetTemp1";"Bucket 4";"SetTemp1")
        USE SET("SetTemp1")
        $Num:=Records In set("SetTemp1")
        UNION("SetTemp1";"Bucket 4";"Bucket 4")
        If ($Num>0)
            AddToGPA
        End If
        PSMDebug
End If
```

Friday, September 28, 1990          Procedure:  PSM0_3Seq58                    1

```
If (vAgeEquiv>="G") | (vAgeEquiv<="I")
    vCategory:="7. Child 24-36mo"

vQuestion:="Child Frightens"
    vSequence:=50
    vKeyWord:="3A, 3B, 3E, 3F"
    If ([PSM0_3]25A="")
        vPNR:="(N)"
    Else
        vPNR:="(P)"
    End If
    SEARCH([Inventory];[Inventory]Sight=True;)
    SEARCH([Inventory];[Inventory]Sound=True;)
    SEARCH([Inventory]; | [Inventory]5F=True;)
    SEARCH([Inventory]; | [Inventory]Touch=True)
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records In set("SetTemp1")
    UNION("SetTemp1";"Bucket 4";"Bucket 4")
    If ($Num>0)
        AddToGPA
    End If
    PSMDebug vQuestion:="Child Reads Letters"
    vSequence:=51
    vKeyWord:="3D, 3E, 3F, 3L"
    If ([PSM0_3]26A="")
        vPNR:="(N)"
    Else
        vPNR:="(P)"
    End If
    SEARCH([Inventory];[Inventory]Sight=True;)
    SEARCH([Inventory]; | [Inventory]4E=True;)
    SEARCH([Inventory]; | [Inventory]5E=True;)
    SEARCH([Inventory]; | [Inventory]4G=True)
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records In set("SetTemp1")
    UNION("SetTemp1";"Bucket 4";"Bucket 4")
    If ($Num>0)
        AddToGPA
    End If
    PSMDebug vQuestion:="Child Reads Words"
    vSequence:=52
    vKeyWord:="3D, 3E, 3F, 3G, 3L, 4E, 4G"
    If ([PSM0_3]26B="")
        vPNR:="(N)"
    Else
        vPNR:="(P)"
    End If
    SEARCH([Inventory];[Inventory]Sight=True;)
    SEARCH([Inventory]; | [Inventory]4E=True;)
    SEARCH([Inventory]; | [Inventory]5E=True;)
    SEARCH([Inventory]; | [Inventory]4G=True)
    CREATE SET("SetTemp")
    INTERSECTION("SetTemp";"Bucket 1";"SetTemp1")
    DIFFERENCE("SetTemp1";"Bucket 4";"SetTemp1")
```

```
USE SET("SetTemp1")
$Num:=Records in set("SetTemp1")
UNION("SetTemp1";"Bucket 4";"Bucket 4")
If ($Num>0)
    AddToGPA
End If
PSMDebug vQuestion:="Child Alone"
vSequence:=53
vKeyWord:="3F, 3G, 3E, 3L"
If ([PSM0_3]27A="")
    vPNR:="(N)"
Else
    vPNR:="(P)"
End If
SEARCH([Inventory];[Inventory]Sight=True;")
SEARCH([Inventory]; | [Inventory]4G=True;")
SEARCH([Inventory]; | [Inventory]5F=True;")
SEARCH([Inventory]; | [Inventory]5K=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records in set("SetTemp1")
UNION("SetTemp1";"Bucket 4";"Bucket 4")
If ($Num>0)
    AddToGPA
End If
PSMDebug vQuestion:="Child w/Others"
vSequence:=54
vKeyWord:="3F, 3G, 3A, 3B, 3C, 3E, 3L"
If ([PSM0_3]27B="")
    vPNR:="(N)"
Else
    vPNR:="(P)"
End If
SEARCH([Inventory];[Inventory]Sound=True;")
SEARCH([Inventory]; | [Inventory]Sight=True;")
SEARCH([Inventory]; | [Inventory]Touch=True;")
SEARCH([Inventory]; | [Inventory]5E=True;")
SEARCH([Inventory]; | [Inventory]5F=True;")
SEARCH([Inventory]; | [Inventory]5M=True;")
SEARCH([Inventory]; | [Inventory]5K=True;")
SEARCH([Inventory]; | [Inventory]5L=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records in set("SetTemp1")
UNION("SetTemp1";"Bucket 4";"Bucket 4")
If ($Num>0)
    AddToGPA
End If
PSMDebug vQuestion:="Child Draws"
vSequence:=55
vKeyWord:="3E, 3F, 3G, 3H, 3I, 3J"
If ([PSM0_3]28A="")
    vPNR:="(N)"
Else
    vPNR:="(P)"
End If
SEARCH([Inventory];[Inventory]Sight=True;")
SEARCH([Inventory]; | [Inventory]Touch=True;")
SEARCH([Inventory]; | [Inventory]5N="Small";")
SEARCH([Inventory]; | [Inventory]5K=True;")
SEARCH([Inventory]; | [Inventory]5M=True;")
SEARCH([Inventory]; | [Inventory]5L=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records in set("SetTemp1")
UNION("SetTemp1";"Bucket 4";"Bucket 4")
If ($Num>0)
    AddToGPA
End If
PSMDebug
```

```
vQuestion:="Child Puzzles"
vSequence:=56
vKeyWord:="3E, 3F, 3G, 3H, 3I, 3J"
If ([PSM0_3]28B="")
    vPNR:="(N)"
Else
    vPNR:="(P)"
End If
SEARCH([Inventory];[Inventory]Sight=True;")
SEARCH([Inventory]; | [Inventory]Touch=True;")
SEARCH([Inventory]; | [Inventory]5N="Small";")
SEARCH([Inventory]; | [Inventory]5K=True;")
SEARCH([Inventory]; | [Inventory]5M=True;")
SEARCH([Inventory]; | [Inventory]5L=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Building"
vSequence:=57
vKeyWord:="3E, 3F, 3G, 3H, 3I, 3J"
If ([PSM0_3]28C="")
    vPNR:="(N)"
Else
    vPNR:="(P)"
End If
SEARCH([Inventory];[Inventory]Sight=True;")
SEARCH([Inventory]; | [Inventory]Touch=True;")
SEARCH([Inventory]; | [Inventory]5N="Small";")
SEARCH([Inventory]; | [Inventory]5K=True;")
SEARCH([Inventory]; | [Inventory]5M=True;")
SEARCH([Inventory]; | [Inventory]5L=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug vQuestion:="Child Interacts as a "
vSequence:=58
vKeyWord:="3E, 3F, 3A, 3B, 3L"
If ([PSM0_3]29A="")
    vPNR:="(P)"
    vQuestion:=vQuestion+"Leader"
Else
    vPNR:="(N)"
    vQuestion:=vQuestion+"Follower"
End If
SEARCH([Inventory];[Inventory]Sight=True;")
SEARCH([Inventory]; | [Inventory]Sound=True;")
SEARCH([Inventory]; | [Inventory]5F=True;")
SEARCH([Inventory]; | [Inventory]5E=True;")
SEARCH([Inventory]; | [Inventory]4G=True)
CREATE SET("SetTemp")
INTERSECTION("SetTemp";"Bucket 1";"SetTemp1")
DIFFERENCE("SetTemp1";"Bucket 4";"SetTemp1")
USE SET("SetTemp1")
$Num:=Records In set("SetTemp1")
UNION("SetTemp1";"Bucket 4";"Bucket 4")
If ($Num>0)
    AddToGPA
End If
PSMDebug End If
```

APPENDIX V

PSM2-5 Matching Code

Friday, September 28, 1990        Procedure:  PSM2_5Match

```
$UserNum:=$1
vAgeEquiv:=[Users]Age Equiv
SEARCH([PSM2_5];[PSM2_5]UIN=$UserNum)
If (Records in selection([PSM2_5])=1)
    CONFIRM("Medical Conditions and Other Conditions Reviewed?  Click OK to Proceed.")
    If (OK=1)
        GPA Setup $Temp:=LoadNo ("SeqProgYN")
        If ($Temp=1)
            vEnabled:=True
        Else
            vEnabled:=False
        End If
        CREATE EMPTY SET([Inventory];"Bucket 1")
        CREATE EMPTY SET([Inventory];"Bucket 2")
        CREATE EMPTY SET([Inventory];"Bucket 3")
        CREATE EMPTY SET([Inventory];"Bucket 4")
        CREATE EMPTY SET([Inventory];"Bucket 5")
        CREATE EMPTY SET([Inventory];"Bucket 6")
        CREATE EMPTY SET([Inventory];"Bucket 7")
        ALL RECORDS([Inventory])
        CREATE SET([Inventory];"Bucket 1")

PSM2_5Seq5
        PSM2_5SEQ13
        PSM2_5Seq26
        PSM2_5Seq32
        PSM2_5Seq45
        PSM2_5Seq51

PrintGPA
    End If
Else
    BEEP
    ALERT("Please Enter PSM information FIRST!")
End If
```

Friday, September 28, 1990        Procedure:  PSM2_5Seq5

```
vSequence:=1
vQuestion:="Age"
$Age:=Substring([Users]Age Equiv;1;1)
Case of
    :($Age="I")   ` 3 years old
        SEARCH([Inventory];[Inventory]CodeBreakDown'Age1<="I";)
        SEARCH([Inventory]; & [Inventory]CodeBreakDown'Age2>="I")
        CREATE SET("Set1")
        SEARCH([Inventory];[Inventory]CodeBreakDown'Age1<="J";)
        SEARCH([Inventory]; & [Inventory]CodeBreakDown'Age2>="J")
        CREATE SET("Set2")
        UNION("Set1";"Set2";"SetFound")
        USE SET("SetFound")
        CLEAR SET("Set1")
        CLEAR SET("Set2")
        CLEAR SET("SetFound")
    :($Age="J")   ` 4 years old
        SEARCH([Inventory];[Inventory]CodeBreakDown'Age1<="J";)
        SEARCH([Inventory]; & [Inventory]CodeBreakDown'Age2>="J")
        CREATE SET("Set1")
        SEARCH([Inventory];[Inventory]CodeBreakDown'Age1<="K";)
        SEARCH([Inventory]; & [Inventory]CodeBreakDown'Age2>="K")
        CREATE SET("Set2")
        UNION("Set1";"Set2";"SetFound")
        USE SET("SetFound")
        CLEAR SET("Set1")
        CLEAR SET("Set2")
        CLEAR SET("SetFound")
    :($Age="K")   ` 5 years old
        SEARCH([Inventory];[Inventory]CodeBreakDown'Age1<="K";)
        SEARCH([Inventory]; & [Inventory]CodeBreakDown'Age2>="K")
        CREATE SET("Set1")
        SEARCH([Inventory];[Inventory]CodeBreakDown'Age1<="L";)
        SEARCH([Inventory]; & [Inventory]CodeBreakDown'Age2>="L")
```

```
        CREATE SET("Set2")
        UNION("Set1";"Set2";"SetFound")
        USE SET("SetFound")
        CLEAR SET("Set1")
        CLEAR SET("Set2")
        CLEAR SET("SetFound")
    :($Age="L")   ' 6 years old
        SEARCH([Inventory];[Inventory]CodeBreakDown'Age1<="L";")
        SEARCH([Inventory]; & [Inventory]CodeBreakDown'Age2>="L")
        CREATE SET("Set1")
        SEARCH([Inventory];[Inventory]CodeBreakDown'Age1<="M";")
        SEARCH([Inventory]; & [Inventory]CodeBreakDown'Age2>="M")
        CREATE SET("Set2")
        UNION("Set1";"Set2";"SetFound")
        USE SET("SetFound")
        CLEAR SET("Set1")
        CLEAR SET("Set2")
        CLEAR SET("SetFound")
    Else
        BEEP
        BEEP
        BEEP
        ALERT("Age Entered Not Between 2 yr to 5 yr!!!")
        ALERT("Using Code 'L'")
        SEARCH([Inventory];[Inventory]CodeBreakDown'Age1<="L";")
        SEARCH([Inventory]; & [Inventory]CodeBreakDown'Age2>="L")
        CREATE SET("Set1")
        SEARCH([Inventory];[Inventory]CodeBreakDown'Age1<="M";")
        SEARCH([Inventory]; & [Inventory]CodeBreakDown'Age2>="M")
        CREATE SET("Set2")
        UNION("Set1";"Set2";"SetFound")
        USE SET("SetFound")
        CLEAR SET("Set1")
        CLEAR SET("Set2")
        CLEAR SET("SetFound")
End case
CREATE SET("SetTemp")
INTERSECTION("Bucket 1";"SetTemp";"Bucket 1")
PSMDebug vSequence:=3
vQuestion:="Sex"
$Search:=Substring([Users]Sex;1;1)+" "
SEARCH([Inventory];[Inventory]Sex=$Search;")
SEARCH([Inventory]; | [Inventory]Sex="A ")
CREATE SET("SetTemp")
INTERSECTION("Bucket 1";"SetTemp";"Bucket 1")
PSMDebug vSequence:=4
vQuestion:="Ethnic"
$Search:=[Users]Racial_Cultural
SEARCH([Inventory];[Inventory]Ethnic=$Search;")
SEARCH([Inventory]; | [Inventory]Ethnic="All")
CREATE SET("SetTemp")
INTERSECTION("Bucket 1";"SetTemp";"Bucket 1")
PSMDebug vSequence:=5
vQuestion:="Handed"
$Search:=[Users]Handed
SEARCH([Inventory];[Inventory]Handed=$Search;")
SEARCH([Inventory]; | [Inventory]Handed="A")
CREATE SET("SetTemp")
INTERSECTION("Bucket 1";"SetTemp";"Bucket 1")
PSMDebug
```

Friday, September 28, 1990         Procedure:  PSM2_5SEQ13

```
vQuestion:="Numbers/Math"
vSequence:=6
vCategory:="1. Educational"
vPNR:=""
vKeyWord:=""
Case of
    :([PSM2_5]83N=True)
        vPNR:="(N)"
    :([PSM2_5]83L=True)
        vPNR:="(P)"
    :([PSM2_5]83K=True)
        vPNR:="(P)"
End case
```

```
SEARCH([Inventory];[Inventory]4D=True)
CREATE SET([Inventory];"SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
$Num:=Records In set("SetTemp1")
If ($Num>0)
    AddToGPA
End If
PSMDebug vQuestion:="Letters/Reading"
vSequence:=7
vCategory:="1. Educational"
vKeyWord:=""
Case of
    :([PSM2_5]84N=True)
        vPNR:="(N)"
    :([PSM2_5]84L=True)
        vPNR:="(P)"
    :([PSM2_5]84K=True)
        vPNR:="(P)"
End case
SEARCH([Inventory];[Inventory]4E=True)
CREATE SET([Inventory];"SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
$Num:=Records In set("SetTemp1")
If ($Num>0)
    AddToGPA
End If
PSMDebug vQuestion:="Life Skills/Science"
vSequence:=8
vCategory:="1. Educational"
vKeyWord:=""
Case of
    :([PSM2_5]85N=True)
        vPNR:="(N)"
    :([PSM2_5]85L=True)
        vPNR:="(P)"
    :([PSM2_5]85K=True)
        vPNR:="(P)"
End case
SEARCH([Inventory];[Inventory]4F=True)
CREATE SET([Inventory];"SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
$Num:=Records In set("SetTemp1")
If ($Num>0)
    AddToGPA
End If
PSMDebug vQuestion:="Communication/Language"
vSequence:=9
vCategory:="1. Educational"
vKeyWord:=""
Case of
    :([PSM2_5]7B3Y=True)
        vPNR:="(N)"
    :([PSM2_5]7B3MY=True)
        vPNR:="(N)"
    :([PSM2_5]7B3N=True)
        vPNR:="(P)"
    :([PSM2_5]7B3MN=True)
        vPNR:="(P)"
End case
SEARCH([Inventory];[Inventory]4G=True)
CREATE SET([Inventory];"SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
```

```
UNION("SetTemp1";"Bucket 2";"Bucket 2")
$Num:=Records In set("SetTemp1")
If ($Num>0)
    AddToGPA
End If
PSMDebug vQuestion:="Relationships/Social Studies"
vSequence:=10
vCategory:="1. Educational"
vKeyWord:=""
Case of
    :([PSM2_5]7B1Y=True)
        vPNR:="(P)"
    :([PSM2_5]7B1MY=True)
        vPNR:="(P)"
    :([PSM2_5]7B1N=True)
        vPNR:="(N)"
    :([PSM2_5]7B1MN=True)
        vPNR:="(N)"
End case
SEARCH([Inventory];[Inventory]4H=True)
CREATE SET([Inventory];"SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
$Num:=Records In set("SetTemp1")
If ($Num>0)
    AddToGPA
End If
PSMDebug vQuestion:="Drawing/Art/Colors"
vSequence:=11
vCategory:="1. Educational"
vKeyWord:=""
Case of
    :([PSM2_5]81N=True)
        vPNR:="(N)"
    :([PSM2_5]81L=True)
        vPNR:="(P)"
    :([PSM2_5]81K=True)
        vPNR:="(P)"
End case
SEARCH([Inventory];[Inventory]4I=True)
CREATE SET([Inventory];"SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
$Num:=Records In set("SetTemp1")
If ($Num>0)
    AddToGPA
End If
PSMDebug vQuestion:="Music"
vSequence:=12
vCategory:="1. Educational"
vKeyWord:=""
If ([PSM2_5]11A2=0)
    vPNR:="(P)"
Else
    vPNR:="(N)"
End If
SEARCH([Inventory];[Inventory]4J=True)
CREATE SET([Inventory];"SetTemp")
INTERSECTION("SetTemp";"Bucket 1";"SetTemp1")
DIFFERENCE("SetTemp1";"Bucket 2";"SetTemp1")
USE SET("SetTemp1")
$Num:=Records In set("SetTemp1")
UNION("SetTemp1";"Bucket 2";"Bucket 2")
$Num:=Records In set("SetTemp1")
If ($Num>0)
    AddToGPA
End If
PSMDebug vQuestion:="Other"
```

```
vSequence:=13
vCategory:="1. Educational"
vKeyWord:=""
vPNR:=""
If ([PSM2_5]11A6other#"")
    StringSelection ([PSM2_5]11A6other)
    CREATE SET([Inventory];"SetTemp")
    INTERSECTION("SetTemp";"Bucket 1";"SetTemp1")
    DIFFERENCE("SetTemp1";"Bucket 2";"SetTemp1")
    USE SET("SetTemp1")
    $Num:=Records in set("SetTemp1")
    UNION("SetTemp1";"Bucket 2";"Bucket 2")
    $Num:=Records in set("SetTemp1")

If ($Num>0)
        AddToGPA
    End If
    PSMDebug
End If
```

Friday, September 28, 1990         Procedure:   PSM2_5Seq26                              1

```
vQuestion:="Auditory Reception"
vSequence:=14
vCategory:="2. Learning"
vKeyWord:=""
vPNR:="(N)"
If ([PSM2_5]17_1#"")
    SEARCH([Inventory];[Inventory]3A=True;")
    SEARCH([Inventory]; & [Inventory]Sound=True;")
    SEARCH([Inventory]; | [Inventory]5M=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records in set("SetTemp1")
    UNION("SetTemp1";"Bucket 3";"Bucket 3")
    If ($Num>0)
        AddToGPA
    End If
End If
PSMDebug vQuestion:="Auditory Assoc."
vSequence:=15
vCategory:="2. Learning"
vKeyWord:=""
vPNR:="(N)"
If ([PSM2_5]17_2#"")
    SEARCH([Inventory];[Inventory]3B=True;")
    SEARCH([Inventory]; & [Inventory]Sound=True;")
    SEARCH([Inventory]; | [Inventory]5M=True;")
    SEARCH([Inventory]; | [Inventory]5P=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records in set("SetTemp1")
    UNION("SetTemp1";"Bucket 3";"Bucket 3")
    If ($Num>0)
        AddToGPA
    End If
End If
PSMDebug vQuestion:="Auditory Memory"
vSequence:=16
vCategory:="2. Learning"
vKeyWord:=""
vPNR:="(N)"
If ([PSM2_5]17_3#"")
    SEARCH([Inventory];[Inventory]3C=True;")
    SEARCH([Inventory]; & [Inventory]Sound=True;")
    SEARCH([Inventory]; | [Inventory]5M=True;")
    SEARCH([Inventory]; | [Inventory]5K=True;")
    SEARCH([Inventory]; | [Inventory]5L=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records in set("SetTemp1")
    UNION("SetTemp1";"Bucket 3";"Bucket 3")
```

```
   ┌H ($Num>0)
   │   AddToGPA
   └End H
└End H
PSMDebug vQuestion:="Grammer"
   vSequence:=17
   vCategory:="2. Learning"
   vKeyWord:=""
   vPNR:="(N)"
┌H ([PSM2_5]17_4#"")
│   SEARCH([Inventory];[Inventory]3D=True;")
│   SEARCH([Inventory]; & [Inventory]Sound=True;")
│   SEARCH([Inventory]; | [Inventory]5M=True;")
│   SEARCH([Inventory]; | [Inventory]5E=True)
│   CREATE SET("SetTemp")
│   INTERSECTION("SetTemp";"Bucket 1";"SetTemp1")
│   DIFFERENCE("SetTemp1";"Bucket 3";"SetTemp1")
│   USE SET("SetTemp1")
│   $Num:=Records in set("SetTemp1")
│   UNION("SetTemp1";"Bucket 3";"Bucket 3")
│   ┌H ($Num>0)
│   │   AddToGPA
│   └End H
└End H
PSMDebug vQuestion:="Visual Reception"
   vSequence:=18
   vCategory:="2. Learning"
   vKeyWord:=""
   vPNR:="(N)"
┌H ([PSM2_5]17_5#"")
│   SEARCH([Inventory];[Inventory]3E=True;")
│   SEARCH([Inventory]; & [Inventory]Sight=True;")
│   SEARCH([Inventory]; | [Inventory]5M=True)
│   CREATE SET("SetTemp")
│   INTERSECTION("SetTemp";"Bucket 1";"SetTemp1")
│   DIFFERENCE("SetTemp1";"Bucket 3";"SetTemp1")
│   USE SET("SetTemp1")
│   $Num:=Records in set("SetTemp1")
│   UNION("SetTemp1";"Bucket 3";"Bucket 3")
│   ┌H ($Num>0)
│   │   AddToGPA
│   └End H
└End H
PSMDebug vQuestion:="Visual Assoc"
   vSequence:=19
   vCategory:="2. Learning"
   vKeyWord:=""
   vPNR:="(N)"
┌H ([PSM2_5]17_6#"")
│   SEARCH([Inventory];[Inventory]3F=True;")
│   SEARCH([Inventory]; & [Inventory]Sight=True;")
│   SEARCH([Inventory]; | [Inventory]5P=True;")
│   SEARCH([Inventory]; | [Inventory]5M=True)
│   CREATE SET("SetTemp")
│   INTERSECTION("SetTemp";"Bucket 1";"SetTemp1")
│   DIFFERENCE("SetTemp1";"Bucket 3";"SetTemp1")
│   USE SET("SetTemp1")
│   $Num:=Records in set("SetTemp1")
│   UNION("SetTemp1";"Bucket 3";"Bucket 3")
│   ┌H ($Num>0)
│   │   AddToGPA
│   └End H
└End H
PSMDebug vQuestion:="Visual Memory"
   vSequence:=20
   vCategory:="2. Learning"
   vKeyWord:=""
   vPNR:="(N)"
┌H ([PSM2_5]17_7#"")
│   SEARCH([Inventory];[Inventory]3G=True;")
│   SEARCH([Inventory]; & [Inventory]Sight=True;")
│   SEARCH([Inventory]; | [Inventory]5M=True;")
│   SEARCH([Inventory]; | [Inventory]5K=True;")
│   SEARCH([Inventory]; | [Inventory]5L=True)
```

```
        CREATE SET("SetTemp")
        INTERSECTION("SetTemp";"Bucket 1";"SetTemp1")
        DIFFERENCE("SetTemp1";"Bucket 3";"SetTemp1")
        USE SET("SetTemp1")
        $Num:=Records in set("SetTemp1")
        UNION("SetTemp1";"Bucket 3";"Bucket 3")
       ┌If ($Num>0)
       │    AddToGPA
       └End If
    End If
    PSMDebug vQuestion:="Percep. Const."
    vSequence:=21
    vCategory:="2. Learning"
    vKeyWord:=""
    vPNR:="(N)"
    ┌If ([PSM2_5]17_8#"")
    │    SEARCH([Inventory];[Inventory]3H=True;")
    │    SEARCH([Inventory]; & [Inventory]Sight=True;")
    │    SEARCH([Inventory]; | [Inventory]5K=True;")
    │    SEARCH([Inventory]; | [Inventory]5L=True)
    │    CREATE SET("SetTemp")
    │    INTERSECTION("SetTemp";"Bucket 1";"SetTemp1")
    │    DIFFERENCE("SetTemp1";"Bucket 3";"SetTemp1")
    │    USE SET("SetTemp1")
    │    $Num:=Records in set("SetTemp1")
    │    UNION("SetTemp1";"Bucket 3";"Bucket 3")
    │   ┌If ($Num>0)
    │   │    AddToGPA
    │   └End If
    └End If
    PSMDebug vQuestion:="Spatial Relationships."
    vSequence:=22
    vCategory:="2. Learning"
    vKeyWord:=""
    vPNR:="(N)"
    ┌If ([PSM2_5]17_9#"")
    │    SEARCH([Inventory];[Inventory]3I=True;")
    │    SEARCH([Inventory]; & [Inventory]Sound=True;")
    │    SEARCH([Inventory]; | [Inventory]Sight=True)
    │    CREATE SET("SetTemp")
    │    INTERSECTION("SetTemp";"Bucket 1";"SetTemp1")
    │    DIFFERENCE("SetTemp1";"Bucket 3";"SetTemp1")
    │    USE SET("SetTemp1")
    │    $Num:=Records in set("SetTemp1")
    │    UNION("SetTemp1";"Bucket 3";"Bucket 3")
    │   ┌If ($Num>0)
    │   │    AddToGPA
    │   └End If
    └End If
    PSMDebug vQuestion:="Eye/Hand"
    vSequence:=23
    vCategory:="2. Learning"
    vKeyWord:=""
    vPNR:="(N)"
    ┌If ([PSM2_5]17_10#"")
    │    SEARCH([Inventory];[Inventory]3J=True;")
    │    SEARCH([Inventory]; & [Inventory]Touch=True;")
    │    SEARCH([Inventory]; | [Inventory]5N=True;")
    │    SEARCH([Inventory]; | [Inventory]Sight=True)
    │    CREATE SET("SetTemp")
    │    INTERSECTION("SetTemp";"Bucket 1";"SetTemp1")
    │    DIFFERENCE("SetTemp1";"Bucket 3";"SetTemp1")
    │    USE SET("SetTemp1")
    │    $Num:=Records in set("SetTemp1")
    │    UNION("SetTemp1";"Bucket 3";"Bucket 3")
    │   ┌If ($Num>0)
    │   │    AddToGPA
    │   └End If
    └End If
    PSMDebug vQuestion:="Balance"
    vSequence:=24
    vCategory:="2. Learning"
    vKeyWord:=""
    vPNR:="(N)"
```

```
If ([PSM2_5]17_11#"")
    SEARCH([Inventory];[Inventory]3K=True;")
    SEARCH([Inventory]; & [Inventory]Sound=True;")
    SEARCH([Inventory]; | [Inventory]5N=True;")
    SEARCH([Inventory]; | [Inventory]Sight=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records in set("SetTemp1")
    UNION("SetTemp1";"Bucket 3";"Bucket 3")
    If ($Num>0)
        AddToGPA
    End If
End If
PSMDebug vQuestion:="Verbal Expression"
vSequence:=25
vCategory:="2. Learning"
vKeyWord:=""
vPNR:="(N)"
If ([PSM2_5]17_12#"")
    SEARCH([Inventory];[Inventory]3L=True;")
    SEARCH([Inventory]; & [Inventory]Sound=True;")
    SEARCH([Inventory]; | [Inventory]5M=True;")
    SEARCH([Inventory]; | [Inventory]5E=True)
    CREATE SET("SetTemp")
    INTERSECTION("SetTemp";"Bucket 1";"SetTemp1")
    DIFFERENCE("SetTemp1";"Bucket 3";"SetTemp1")
    USE SET("SetTemp1")
    $Num:=Records in set("SetTemp1")
    UNION("SetTemp1";"Bucket 3";"Bucket 3")
    If ($Num>0)
        AddToGPA
    End If
End If
PSMDebug
```

Friday, September 28, 1990          Procedure: PSM2_5Seq32                              1

```
vQuestion:="Plays"
vSequence:=27
vCategory:="3. Emotional"
vKeyWord:=""
vPNR:="(N)"
If ([PSM2_5]7A2A=True)
    SEARCH([Inventory];[Inventory]5E=True;")
    SEARCH([Inventory]; & [Inventory]Min Participant>1;")
    SEARCH([Inventory]; | [Inventory]5F=True)
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records in set("SetTemp1")
    UNION("SetTemp1";"Bucket 4";"Bucket 4")
    If ($Num>0)
        AddToGPA
    End If
End If
PSMDebug vQuestion:="Plays Alone"
vSequence:=28
vCategory:="3. Emotional"
vKeyWord:=""
vPNR:="(N)"
If ([PSM2_5]7B2Y=True)|([PSM2_5]7B2MY=True)
    SEARCH([Inventory];[Inventory]5E=True;")
    SEARCH([Inventory]; & [Inventory]Min Participant>1;")
    SEARCH([Inventory]; | [Inventory]5F=True)
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records in set("SetTemp1")
    UNION("SetTemp1";"Bucket 4";"Bucket 4")
    If ($Num>0)
        AddToGPA
    End If
End If
PSMDebug
```

```
vQuestion:="Completes Activity"
vSequence:=29
vCategory:="3. Emotional"
vKeyWord:=""
vPNR:="(N)"
If ([PSM2_5]7C3N=True) | ([PSM2_5]7C3MN=True)
    SEARCH([Inventory];[Inventory]5B>=10;")
    SEARCH([Inventory]; | [Inventory]5C>=2;")
    SEARCH([Inventory]; | [Inventory]5G=True;")
    SEARCH([Inventory]; | [Inventory]5P=True;")
    SEARCH([Inventory]; | [Inventory]5R=True)
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records in set("SetTemp1")
    UNION("SetTemp1";"Bucket 4";"Bucket 4")
    If ($Num>0)
        AddToGPA
    End If
End If
PSMDebug vQuestion:="Prefers to be alone"
vSequence:=30
vCategory:="3. Emotional"
vKeyWord:=""
vPNR:="(N)"
If ([PSM2_5]7C6Y=True) | ([PSM2_5]7C6MY=True)
    SEARCH([Inventory];[Inventory]5E=True;")
    SEARCH([Inventory]; | [Inventory]5F=True;")
    SEARCH([Inventory]; | [Inventory]5C>=2;")
    SEARCH([Inventory]; | [Inventory]5G=True;")
    SEARCH([Inventory]; | [Inventory]5P=True;")
    SEARCH([Inventory]; | [Inventory]5R=True;")
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records in set("SetTemp1")
    UNION("SetTemp1";"Bucket 4";"Bucket 4")
    If ($Num>0)
        AddToGPA
    End If
End If
PSMDebug vQuestion:="Games/Fun"
vSequence:=31
vCategory:="3. Emotional"
vKeyWord:=""
vPNR:="(N)"
If ([PSM2_5]7C7N=True) | ([PSM2_5]7C7MN=True)
    SEARCH([Inventory];[Inventory]5E=True;")
    SEARCH([Inventory]; | [Inventory]5F=True;")
    SEARCH([Inventory]; | [Inventory]5C>=2;")
    SEARCH([Inventory]; | [Inventory]5G=True;")
    SEARCH([Inventory]; | [Inventory]5P=True;")
    SEARCH([Inventory]; | [Inventory]5R=True;")
    CREATE SET("SetTemp")
    INTERSECTION("SetTemp";"Bucket 1";"SetTemp1")
    DIFFERENCE("SetTemp1";"Bucket 4";"SetTemp1")
    USE SET("SetTemp1")
    $Num:=Records in set("SetTemp1")
    UNION("SetTemp1";"Bucket 4";"Bucket 4")
    If ($Num>0)
        AddToGPA
    End If
End If
PSMDebug
```

Friday, September 28, 1990          Procedure:  PSM2_5Seq45

```
vQuestion:="Favorite Activity at School"
vSequence:=32
vCategory:="5. Interests"
vKeyWord:=""
vPNR:="(P)"
If ([PSM2_5]9B♦")
    StringSelection ([PSM2_5]9B)
    CREATE SET("SetTemp")
```

```
        INTERSECTION("SetTemp";"Bucket 1";"SetTemp1")
        DIFFERENCE("SetTemp1";"Bucket 5";"SetTemp1")
        USE SET("SetTemp1")
        $Num:=Records In set("SetTemp1")
        UNION("SetTemp1";"Bucket 5";"Bucket 5")
        If ($Num>0)
            AddToGPA
        End If
    End If
PSMDebug vQuestion:="Favorite Quiet Time Activity"
vSequence:=33
vCategory:="5. Interests"
vKeyWord:=""
vPNR:="(P)"
If ([PSM2_5]13A#"")
    StringSelection ([PSM2_5]13A)
    CREATE SET("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set("SetTemp1")
    UNION("SetTemp1";"Bucket 5";"Bucket 5")
    If ($Num>0)
        AddToGPA
    End If
End If
PSMDebug vQuestion:="Favorite Sport"
vSequence:=34
vCategory:="5. Interests"
vKeyWord:=""
vPNR:="(P)"
If ([PSM2_5]13B#"")
    StringSelection ([PSM2_5]13B)
    CREATE SET("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set("SetTemp1")
    UNION("SetTemp1";"Bucket 5";"Bucket 5")
    If ($Num>0)
        AddToGPA
    End If
End If
PSMDebug vQuestion:="Book Enjoys Most"
vSequence:=35
vCategory:="5. Interests"
vKeyWord:=""
vPNR:="(P)"
If ([PSM2_5]13C1#"")
    StringSelection ([PSM2_5]13C1)
    CREATE SET("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set("SetTemp1")
    UNION("SetTemp1";"Bucket 5";"Bucket 5")
    If ($Num>0)
        AddToGPA
    End If
End If
PSMDebug vQuestion:="Leisure Time"
vSequence:=36
vCategory:="5. Interests"
vKeyWord:=""
vPNR:="(P)"
If ([PSM2_5]13_D#"")
    StringSelection ([PSM2_5]13_D)
    CREATE SET("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set("SetTemp1")
    UNION("SetTemp1";"Bucket 5";"Bucket 5")
    If ($Num>0)
        AddToGPA
```

```
    | └End If
    └End If
    PSMDebug vQuestion:="Toys Enjoyed Most"
    vSequence:=37
    vCategory:="5. Interests"
    vKeyWord:=""
    vPNR:="(P)"
  ┌If ([PSM2_5]13E1#"")
  │    StringSelection ([PSM2_5]13E1)
  │    CREATE SET("SetTemp")
  │    INTERSECTION("SetTemp";"Bucket 1";"SetTemp1")
  │    DIFFERENCE("SetTemp1";"Bucket 5";"SetTemp1")
  │    USE SET("SetTemp1")
  │    $Num:=Records In set("SetTemp1")
  │    UNION("SetTemp1";"Bucket 5";"Bucket 5")
  │   ┌If ($Num>0)
  │   │    AddToGPA
  │   └End If
  └End If
    PSMDebug vQuestion:="Games Enjoyed Most"
    vSequence:=38
    vCategory:="5. Interests"
    vKeyWord:=""
    vPNR:="(P)"
  ┌If ([PSM2_5]13F1#"")
  │    StringSelection ([PSM2_5]13F1)
  │    CREATE SET("SetTemp")
  │    INTERSECTION("SetTemp";"Bucket 1";"SetTemp1")
  │    DIFFERENCE("SetTemp1";"Bucket 5";"SetTemp1")
  │    USE SET("SetTemp1")
  │    $Num:=Records In set("SetTemp1")
  │    UNION("SetTemp1";"Bucket 5";"Bucket 5")
  │   ┌If ($Num>0)
  │   │    AddToGPA
  │   └End If
  └End If
    PSMDebug vQuestion:="Favorite Record/Cassette"
    vSequence:=39
    vCategory:="5. Interests"
    vKeyWord:=""
    vPNR:="(P)"
  ┌If ([PSM2_5]13I1#"")
  │    StringSelection ([PSM2_5]13I1)
  │    CREATE SET("SetTemp")
  │    INTERSECTION("SetTemp";"Bucket 1";"SetTemp1")
  │    DIFFERENCE("SetTemp1";"Bucket 5";"SetTemp1")
  │    USE SET("SetTemp1")
  │    $Num:=Records In set("SetTemp1")
  │    UNION("SetTemp1";"Bucket 5";"Bucket 5")
  │   ┌If ($Num>0)
  │   │    AddToGPA
  │   └End If
  └End If
    PSMDebug vQuestion:="Child Speaks Words"
    vSequence:=40
    vCategory:="5. Interests"
    vKeyWord:=""
    vPNR:="(N)"
  ┌If ([PSM2_5]13L1=False)
  │    SEARCH([Inventory];[Inventory]3L=True;")
  │    SEARCH([Inventory]; |[Inventory]5E=True;")
  │    SEARCH([Inventory]; |[Inventory]5F=True)
  │    CREATE SET("SetTemp")
  │    INTERSECTION("SetTemp";"Bucket 1";"SetTemp1")
  │    DIFFERENCE("SetTemp1";"Bucket 5";"SetTemp1")
  │    USE SET("SetTemp1")
  │    $Num:=Records In set("SetTemp1")
  │    UNION("SetTemp1";"Bucket 5";"Bucket 5")
  │   ┌If ($Num>0)
  │   │    AddToGPA
  │   └End If
  └End If
    PSMDebug
```

```
vQuestion:="Child Speaks Sentences"
vSequence:=41
vCategory:="5. Interests"
vKeyWord:=""
vPNR:="(N)"
If ([PSM2_5]13L2#"")
    SEARCH([Inventory];[Inventory]3L=True;")
    SEARCH([Inventory]; |[Inventory]5E=True;")
    SEARCH([Inventory]; |[Inventory]5F=True)
    CREATE SET ("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set ("SetTemp1")
    UNION("SetTemp1";"Bucket 5";"Bucket 5")
    If ($Num>0)
        AddToGPA
    End If
End If
PSMDebug vQuestion:="Computer Model"
vSequence:=42
vCategory:="5. Interests"
vKeyWord:=""
vPNR:="(P)"
If ([PSM2_5]14A1=True)
    StringSelection ([PSM2_5]14A2)
    CREATE SET ("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set ("SetTemp1")
    UNION("SetTemp1";"Bucket 5";"Bucket 5")
    If ($Num>0)
        AddToGPA
    End If
End If
PSMDebug vQuestion:="Instrument"
vSequence:=43
vCategory:="5. Interests"
vKeyWord:=""
vPNR:="(P)"
If ([PSM2_5]15A1#"")
    StringSelection ([PSM2_5]15A1)
    CREATE SET ("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set ("SetTemp1")
    UNION("SetTemp1";"Bucket 5";"Bucket 5")
    If ($Num>0)
        AddToGPA
    End If
End If
PSMDebug vQuestion:="Special Talents"
vSequence:=44
vCategory:="5. Interests"
vKeyWord:=""
vPNR:="(P)"
If ([PSM2_5]19A_1#"")
    StringSelection ([PSM2_5]19A_1)
    CREATE SET ("SetTemp")
    INTERSECTION("SetTemp";"Bucket 1";"SetTemp1")
    DIFFERENCE("SetTemp1";"Bucket 5";"SetTemp1")
    USE SET("SetTemp1")
    $Num:=Records In set ("SetTemp1")
    UNION("SetTemp1";"Bucket 5";"Bucket 5")
    If ($Num>0)
        AddToGPA
    End If
End If
PSMDebug vQuestion:="Weaknesses & Needs"
vSequence:=45
vCategory:="5. Interests"
vKeyWord:=""
vPNR:="(N)"
```

```
If ([PSM2_5]20A_1#"")
    StringSelection ([PSM2_5]20A_1)
    CREATE SET ("SetTemp")
    INTERSECTION("SetTemp";"Bucket 1";"SetTemp1")
    DIFFERENCE("SetTemp1";"Bucket 5";"SetTemp1")
    USE SET ("SetTemp1")
    $Num:=Records in set ("SetTemp1")
    UNION ("SetTemp1";"Bucket 5";"Bucket 5")
    If ($Num>0)
        AddToGPA
    End If
End If
PSMDebug vQuestion:="Afraid to Talk"
vSequence:=46
vCategory:="6. Psychological"
vKeyWord:=""
vPNR:="(N)"
If ([PSM2_5]7B3Y=True) | ([PSM2_5]7B3MY=True)
    SEARCH([Inventory];[Inventory]5E=True;")
    SEARCH([Inventory]; | [Inventory]5F=True;")
    SEARCH([Inventory]; | [Inventory]Max Paricipant>=1)
    CREATE SET ("SetTemp")
    INTERSECTION("SetTemp";"Bucket 1";"SetTemp1")
    DIFFERENCE("SetTemp1";"Bucket 6";"SetTemp1")
    USE SET ("SetTemp1")
    $Num:=Records in set ("SetTemp1")
    UNION ("SetTemp1";"Bucket 6";"Bucket 6")
    If ($Num>0)
        AddToGPA
    End If
End If
PSMDebug vQuestion:="Uses Time Wisely"
vSequence:=47
vCategory:="6. Psychological"
vKeyWord:=""
vPNR:="(N)"
If ([PSM2_5]7C5N=True) | ([PSM2_5]7C5MN=True)
    SEARCH([Inventory];[Inventory]5B>1;")
    SEARCH([Inventory]; | [Inventory]5G=True;")
    SEARCH([Inventory]; | [Inventory]5H=True)
    CREATE SET ("SetTemp")
    INTERSECTION("SetTemp";"Bucket 1";"SetTemp1")
    DIFFERENCE("SetTemp1";"Bucket 6";"SetTemp1")
    USE SET ("SetTemp1")
    $Num:=Records in set ("SetTemp1")
    UNION ("SetTemp1";"Bucket 6";"Bucket 6")
    If ($Num>0)
        AddToGPA
    End If
End If
PSMDebug vQuestion:="Gets Angry Easily"
vSequence:=48
vCategory:="6. Psychological"
vKeyWord:=""
vPNR:="(N)"
If ([PSM2_5]13J=True)
    SEARCH([Inventory];[Inventory]5E=True;")
    SEARCH([Inventory]; | [Inventory]5F=True;")
    SEARCH([Inventory]; | [Inventory]5R=True)
    CREATE SET ("SetTemp")
    INTERSECTION("SetTemp";"Bucket 1";"SetTemp1")
    DIFFERENCE("SetTemp1";"Bucket 6";"SetTemp1")
    USE SET ("SetTemp1")
    $Num:=Records in set ("SetTemp1")
    UNION ("SetTemp1";"Bucket 6";"Bucket 6")
    If ($Num>0)
        AddToGPA
    End If
End If
PSMDebug vQuestion:="Shy"
vSequence:=49
vCategory:="6. Psychological"
vKeyWord:=""
vPNR:="(N)"
```

```
If ([PSM2_5]13K1=True)
    SEARCH([Inventory];[Inventory]5E=True;")
    SEARCH([Inventory]; | [Inventory]5F=True;")
    SEARCH([Inventory]; | [Inventory]5R=True)
    CREATE SET("SetTemp")
    INTERSECTION("SetTemp";"Bucket 1";"SetTemp1")
    DIFFERENCE("SetTemp1";"Bucket 6";"SetTemp1")
    USE SET("SetTemp1")
    $Num:=Records In set("SetTemp1")
    UNION("SetTemp1";"Bucket 6";"Bucket 6")
    If ($Num>0)
        AddToGPA
    End If
End If
PSMDebug vQuestion:="Confident"
vSequence:=50
vCategory:="6. Psychological"
vKeyWord:=""
vPNR:="(P)"
If ([PSM2_5]13K2=True)
    SEARCH([Inventory];[Inventory]5E=True;")
    SEARCH([Inventory]; | [Inventory]5F=True;")
    SEARCH([Inventory]; | [Inventory]5R=True)
    CREATE SET("SetTemp")
    INTERSECTION("SetTemp";"Bucket 1";"SetTemp1")
    DIFFERENCE("SetTemp1";"Bucket 6";"SetTemp1")
    USE SET("SetTemp1")
    $Num:=Records In set("SetTemp1")
    UNION("SetTemp1";"Bucket 6";"Bucket 6")
    If ($Num>0)
        AddToGPA
    End If
End If
PSMDebug vQuestion:="Friendly"
vSequence:=51
vCategory:="6. Psychological"
vKeyWord:=""
vPNR:="(P)"
If ([PSM2_5]13K3=True)
    SEARCH([Inventory];[Inventory]5E=True;")
    SEARCH([Inventory]; | [Inventory]5F=True;")
    SEARCH([Inventory]; | [Inventory]5R=True)
    CREATE SET("SetTemp")
    INTERSECTION("SetTemp";"Bucket 1";"SetTemp1")
    DIFFERENCE("SetTemp1";"Bucket 6";"SetTemp1")
    USE SET("SetTemp1")
    $Num:=Records In set("SetTemp1")
    UNION("SetTemp1";"Bucket 6";"Bucket 6")
    If ($Num>0)
        AddToGPA
    End If
End If
PSMDebug
```

APPENDIX VI

PSM6-14 Matching Code

PSM 6-14

Friday, September 28, 1990       Procedure: PSM613Match

```
$UserNum:=$1
vAgeEquiv:=[Users]Age Equiv
SEARCH([PSM614];[PSM614]UIN=$UserNum)
If (Records In selection([PSM614])=1)
    CONFIRM("Medical Conditions and Other Conditions Reviewed?  Click OK to Proceed.")
    If (OK=1)
        GPA Setup $Temp:=LoadNo ("SeqProgYN")
        If ($Temp=1)
            vEnabled:=True
        Else
            vEnabled:=False
        End If
```

```
        CREATE EMPTY SET([Inventory];"Bucket 1")
        CREATE EMPTY SET([Inventory];"Bucket 2")
        CREATE EMPTY SET([Inventory];"Bucket 3")
        CREATE EMPTY SET([Inventory];"Bucket 4")
        CREATE EMPTY SET([Inventory];"Bucket 5")
        CREATE EMPTY SET([Inventory];"Bucket 6")
        ALL RECORDS([Inventory])
        CREATE SET([Inventory];"Bucket 7")

PSM613seq5
        PSM613Seq13
        PSM613Seq26
        PSM613Seq32
        PSM613Seq42
        PSM613Seq45
        PSM613Seq47

PrintGPA
    End If
Else
    BEEP
    ALERT("Please Enter PSM information FIRST!")
End If
```

Friday, September 28, 1990        Procedure:   PSM613seq5                           1

```
vSequence:=1
vQuestion:="Age"
vSequence:=0
vCategory:="7. Positive Reinforcement"
vPNR:="(N)"
vKeyWord:=""
$Search:=[Users]Age Equiv
$Search:=Substring($Search;1;1)

`check for valid age range first 6-14

If ($Search<"L") `is the user younger then 6?
    ALERT("Younger Then 6 Years, Will Use 6 Years.")
    $Search:="L"
End If If ($Search>"T") `is the user older then 14?
    ALERT("Older Then 14 Years, Will Use 14 Years.")
    $Search:="T"
End If SEARCH([Inventory];[Inventory]CodeBreakDown'Age1<=$Search;"")
SEARCH([Inventory]; & {Inventory]CodeBreakDown'Age2>=$Search)
CREATE SET([Inventory];"Bucket 7")
PSMDebug vSequence:=3
vQuestion:="Sex"
$Search:=Substring([Users]Sex;1;1)+" "

`place in Bucket 6 any SEX matches
SEARCH([Inventory];[Inventory]Sex=$Search)
CREATE SET("SetTemp")
INTERSECTION("SetTemp";"Bucket 7";"Bucket 6")
$Num:=Records in set("Bucket 6")
If ($Num>0)
    AddToGPA
End If `Remove From Bucket 7 any SEX items not coded for All or Users Sex
SEARCH([Inventory];[Inventory]Sex=$Search;"")
SEARCH([Inventory]; | [Inventory]Sex="A ")
CREATE SET("SetTemp")
INTERSECTION("Bucket 7";"SetTemp";"Bucket 7")
PSMDebug vSequence:=4
vQuestion:="Ethnic"
$Search:=[Users]Racial Cultural `place in Bucket 6 any Ethnic matches
SEARCH([Inventory];[Inventory]Ethnic=$Search)
CREATE SET("SetTemp")
INTERSECTION("Bucket 7";"SetTemp";"SetTemp")
```

```
$num:=Records In set("SetTemp")
If ($Num>0)
    AddToGPA
End If
PSMDebug vSequence:=5
vQuestion:="Handed"
$Search:=[Users]Handed
 `place in Bucket 6 any Handed matches
SEARCH([Inventory];[Inventory]Handed=$Search)

CREATE SET("SetTemp")
INTERSECTION("Bucket 7";"SetTemp";"SetTemp")
$num:=Records In set("SetTemp")
If ($Num>0)
    AddToGPA
End If
PSMDebug
```

Friday, September 28, 1990          Procedure:  PSM613Seq13                               1

---

```
$GradeLevel:=Num([Users]Grade)
$Above:=$GradeLevel+1
$Below:=$GradeLevel-1
$Average:=$GradeLevel vQuestion:="Math"
vSequence:=6
vCategory:="1. Educational"
Case of
    :([PSM614]11 1D=True)
        vPNR:="(N)"
    :([PSM614]11 1C=True)
        vPNR:="(P)"
    :([PSM614]11 1A=True)
        vPNR:="(P)"
End case
vKeyWord:=""
SEARCH([Inventory];[Inventory]4D=True;")
SEARCH([Inventory]; & [Inventory]CodeBreakDown'Grade1<=$Average;")
SEARCH([Inventory]; & [Inventory]CodeBreakDown'Grade2>=$Average)
CREATE SET([Inventory];"SetTemp")
CREATE EMPTY SET("SetFound")
Case of
    :([PSM614]11 1D) `Math Below Grade Level?
        SEARCH([Inventory];[Inventory]4D=True;")
        SEARCH([Inventory]; & [Inventory]CodeBreakDown'Grade1<=$Below;")
        SEARCH([Inventory]; & [Inventory]CodeBreakDown'Grade2>=$Below)
        CREATE SET([Inventory];"SetFound")
    :([PSM614]11 1A) `Math Above Grade Level
        SEARCH([Inventory];[Inventory]4D=True;")
        SEARCH([Inventory]; & [Inventory]CodeBreakDown'Grade1<=$Above;")
        SEARCH([Inventory]; & [Inventory]CodeBreakDown'Grade2>=$Above)
        CREATE SET([Inventory];"SetFound")
End case UNION("SetTemp";"SetFound";"SetTemp")
INTERSECTION("SetTemp";"Bucket 7";"SetTemp1")
DIFFERENCE("SetTemp1";"Bucket 1";"SetTemp1")
USE SET("SetTemp1")
$Num:=Records In set("SetTemp1")
UNION("SetTemp1";"Bucket 1";"Bucket 1")
$Num:=Records In set("SetTemp1")

If ($Num>0)
    AddToGPA
End If
PSMDebug vQuestion:="Reading"
vSequence:=7
vCategory:="1. Educational"
Case of
    :([PSM614]11 2D=True)
        vPNR:="(N)"
    :([PSM614]11 2C=True)
        vPNR:="(P)"
    :([PSM614]11 2A=True)
```

```
        vPNR:="(P)"
    End case
    vKeyWord:=""
    SEARCH([Inventory];[Inventory]4E=True;")
    SEARCH([Inventory]; & [Inventory]CodeBreakDown'Grade1<=$Average;")
    SEARCH([Inventory]; & [Inventory]CodeBreakDown'Grade2>=$Average)
    CREATE SET([Inventory];"SetTemp")
    CREATE EMPTY SET("SetFound")
    Case of
        :([PSM614]11 2D)
            SEARCH([Inventory];[Inventory]4E=True;")
            SEARCH([Inventory]; & [Inventory]CodeBreakDown'Grade1<=$Below;")
            SEARCH([Inventory]; & [Inventory]CodeBreakDown'Grade2>=$Below)
            CREATE SET([Inventory];"SetFound")
        :([PSM614]11 2A)
            SEARCH([Inventory];[Inventory]4E=True;")
            SEARCH([Inventory]; & [Inventory]CodeBreakDown'Grade1<=$Above;")
            SEARCH([Inventory]; & [Inventory]CodeBreakDown'Grade2>=$Above)
            CREATE SET([Inventory];"SetFound")
    End case
    UNION("SetTemp";"SetFound";"SetTemp")
    INTERSECTION("SetTemp";"Bucket 7";"SetTemp1")
    DIFFERENCE("SetTemp1";"Bucket 1";"SetTemp1")
    USE SET("SetTemp1")
    $Num:=Records in set("SetTemp1")
    UNION("SetTemp1";"Bucket 1";"Bucket 1")
    $Num:=Records in set("SetTemp1")
    If ($Num>0)
        AddToGPA
    End If
    PSMDebug vQuestion:="Science"
    vSequence:=8
    vCategory:="1. Educational"
    Case of
        :([PSM614]11 3D=True)
            vPNR:="(N)"
        :([PSM614]11 3C=True)
            vPNR:="(P)"
        :([PSM614]11 3A=True)
            vPNR:="(P)"
    End case
    vKeyWord:=""
    SEARCH([Inventory];[Inventory]4F=True;")
    SEARCH([Inventory]; & [Inventory]CodeBreakDown'Grade1<=$Average;")
    SEARCH([Inventory]; & [Inventory]CodeBreakDown'Grade2>=$Average)
    CREATE SET([Inventory];"SetTemp")
    CREATE EMPTY SET("SetFound")
    Case of
        :([PSM614]11 3D)
            SEARCH([Inventory];[Inventory]4F=True;")
            SEARCH([Inventory]; & [Inventory]CodeBreakDown'Grade1<=$Below;")
            SEARCH([Inventory]; & [Inventory]CodeBreakDown'Grade2>=$Below)
            CREATE SET([Inventory];"SetFound")
        :([PSM614]11 3A)
            SEARCH([Inventory];[Inventory]4F=True;")
            SEARCH([Inventory]; & [Inventory]CodeBreakDown'Grade1<=$Above;")
            SEARCH([Inventory]; & [Inventory]CodeBreakDown'Grade2>=$Above)
            CREATE SET([Inventory];"SetFound")
    End case
    UNION("SetTemp";"SetFound";"SetTemp")
    INTERSECTION("SetTemp";"Bucket 7";"SetTemp1")
    DIFFERENCE("SetTemp1";"Bucket 1";"SetTemp1")
    USE SET("SetTemp1")
    $Num:=Records in set("SetTemp1")
    UNION("SetTemp1";"Bucket 1";"Bucket 1")
    $Num:=Records in set("SetTemp1")
    If ($num>0)
        AddToGPA
    End If
    PSMDebug vQuestion:="Language"
    vSequence:=9
    vCategory:="1. Educational"
    Case of
        :([PSM614]11 4D=True)
            vPNR:="(N)"
        :([PSM614]11 4C=True)
            vPNR:="(P)"
```

```
: ([PSM614]11 4A=True)
    vPNR:="(P)"
End case
vKeyWord:=""
SEARCH([Inventory];[Inventory]4G=True;")
SEARCH([Inventory]; & [Inventory]CodeBreakDown'Grade1<=$Average;")
SEARCH([Inventory]; & [Inventory]CodeBreakDown'Grade2>=$Average)
CREATE SET([Inventory];"SetTemp")
CREATE EMPTY SET("SetFound")
Case of
    : ([PSM614]11 4D)
        SEARCH([Inventory];[Inventory]4G=True;")
        SEARCH([Inventory]; & [Inventory]CodeBreakDown'Grade1<=$Below;")
        SEARCH([Inventory]; & [Inventory]CodeBreakDown'Grade2>=$Below)
        CREATE SET([Inventory];"SetFound")
    : ([PSM614]11 4A)
        SEARCH([Inventory];[Inventory]4G=True;")
        SEARCH([Inventory]; & [Inventory]CodeBreakDown'Grade1<=$Above;")
        SEARCH([Inventory]; & [Inventory]CodeBreakDown'Grade2>=$Above)
        CREATE SET([Inventory];"SetFound")
End case
UNION("SetTemp";"SetFound";"SetTemp")
INTERSECTION("SetTemp";"Bucket 7";"SetTemp1")
DIFFERENCE("SetTemp1";"Bucket 1";"SetTemp1")
USE SET("SetTemp1")
$Num:=Records in set("SetTemp1")
UNION("SetTemp1";"Bucket 1";"Bucket 1")
$Num:=Records in set("SetTemp1")
If ($num>0)
    AddToGPA
End If
PSMDebug vQuestion:="Social Studies"
vSequence:=10
vCategory:="1. Educational"
Case of
    : ([PSM614]11 5D=True)
        vPNR:="(N)"
    : ([PSM614]11 5C=True)
        vPNR:="(P)"
    : ([PSM614]11 5A=True)
        vPNR:="(P)"
End case
vKeyWord:=""
SEARCH([Inventory];[Inventory]4H=True;")
SEARCH([Inventory]; & [Inventory]CodeBreakDown'Grade1<=$Average;")
SEARCH([Inventory]; & [Inventory]CodeBreakDown'Grade2>=$Average)
CREATE SET([Inventory];"SetTemp")
CREATE EMPTY SET("SetFound")
Case of
    : ([PSM614]11 5D)
        SEARCH([Inventory];[Inventory]4H=True;")
        SEARCH([Inventory]; & [Inventory]CodeBreakDown'Grade1<=$Below;")
        SEARCH([Inventory]; & [Inventory]CodeBreakDown'Grade2>=$Below)
        CREATE SET([Inventory];"SetFound")
    : ([PSM614]11 5A)
        SEARCH([Inventory];[Inventory]4H=True;")
        SEARCH([Inventory]; & [Inventory]CodeBreakDown'Grade1<=$Above;")
        SEARCH([Inventory]; & [Inventory]CodeBreakDown'Grade2>=$Above)
        CREATE SET([Inventory];"SetFound")
End case
UNION("SetTemp";"SetFound";"SetTemp")
INTERSECTION("SetTemp";"Bucket 7";"SetTemp1")
DIFFERENCE("SetTemp1";"Bucket 1";"SetTemp1")
USE SET("SetTemp1")
$Num:=Records in set("SetTemp1")
UNION("SetTemp1";"Bucket 1";"Bucket 1")
$Num:=Records in set("SetTemp1")
If ($num>0)
    AddToGPA
End If
PSMDebug vQuestion:="Art"
vSequence:=11
vCategory:="1. Educational"
Case of
    : ([PSM614]11 6D=True)
        vPNR:="(N)"
    : ([PSM614]11 6C=True)
```

```
        vPNR:="(P)"
      :([PSM614]11 6A=True)
        vPNR:="(P)"
End case
vKeyWord:=""
SEARCH([Inventory];[Inventory]4I=True;")
SEARCH([Inventory]; & [Inventory]CodeBreakDown'Grade1<=$Average;")
SEARCH([Inventory]; & [Inventory]CodeBreakDown'Grade2>=$Average)
CREATE SET([Inventory];"SetTemp")
CREATE EMPTY SET("SetFound")
Case of
    :([PSM614]11 6D)
        SEARCH([Inventory];[Inventory]4I=True;")
        SEARCH([Inventory]; & [Inventory]CodeBreakDown'Grade1<=$Below;")
        SEARCH([Inventory]; & [Inventory]CodeBreakDown'Grade2>=$Below)
        CREATE SET([Inventory];"SetFound")
    :([PSM614]11 6A)
        SEARCH([Inventory];[Inventory]4I=True;")
        SEARCH([Inventory]; & [Inventory]CodeBreakDown'Grade1<=$Above;")
        SEARCH([Inventory]; & [Inventory]CodeBreakDown'Grade2>=$Above)
        CREATE SET([Inventory];"SetFound")
End case
UNION("SetTemp";"SetFound";"SetTemp")
INTERSECTION("SetTemp";"Bucket 7";"SetTemp1")
DIFFERENCE("SetTemp1";"Bucket 1";"SetTemp1")
USE SET("SetTemp1")
$Num:=Records In set("SetTemp1")
UNION("SetTemp1";"Bucket 1";"Bucket 1")
$Num:=Records In set("SetTemp1")
If ($num>0)
    AddToGPA
End If
PSMDebug vQuestion:="Music"
vSequence:=12
vCategory:="1. Educational"
Case of
    :([PSM614]11 7D=True)
        vPNR:="(N)"
    :([PSM614]11 7C=True)
        vPNR:="(P)"
    :([PSM614]11 7A=True)
        vPNR:="(P)"
End case
vKeyWord:=""
SEARCH([Inventory];[Inventory]4J=True;")
SEARCH([Inventory]; & [Inventory]CodeBreakDown'Grade1<=$Average;")
SEARCH([Inventory]; & [Inventory]CodeBreakDown'Grade2>=$Average)
CREATE SET([Inventory];"SetTemp")
CREATE EMPTY SET("SetFound")
Case of
    :([PSM614]11 7D)
        SEARCH([Inventory];[Inventory]4J=True;")
        SEARCH([Inventory]; & [Inventory]CodeBreakDown'Grade1<=$Below;")
        SEARCH([Inventory]; & [Inventory]CodeBreakDown'Grade2>=$Below)
        CREATE SET([Inventory];"SetFound")
    :([PSM614]11 7A)
        SEARCH([Inventory];[Inventory]4J=True;")
        SEARCH([Inventory]; & [Inventory]CodeBreakDown'Grade1<=$Above;")
        SEARCH([Inventory]; & [Inventory]CodeBreakDown'Grade2>=$Above)
        CREATE SET([Inventory];"SetFound")
End case
UNION("SetTemp";"SetFound";"SetTemp")
INTERSECTION("SetTemp";"Bucket 7";"SetTemp1")
DIFFERENCE("SetTemp1";"Bucket 1";"SetTemp1")
USE SET("SetTemp1")
$Num:=Records In set("SetTemp1")
UNION("SetTemp1";"Bucket 1";"Bucket 1")
$Num:=Records In set("SetTemp1")
If ($num>0)
    AddToGPA
End If
PSMDebug vQuestion:="Other"
vSequence:=13
vCategory:="1. Educational"
Case of
```

```
:([PSM614]11 8D=True)
    vPNR:="(N)"
:([PSM614]11 8C=True)
    vPNR:="(P)"
:([PSM614]11 8A=True)
    vPNR:="(P)"
End case
vKeyWord:=""
If ([PSM614]11 8#"")
    SEARCH([Inventory];[Inventory]4K=[PSM614]11 8)
    CREATE SET("SetTemp")
    INTERSECTION("SetTemp";"Bucket 7";"SetTemp1")
    DIFFERENCE("SetTemp1";"Bucket 1";"SetTemp1")
    USE SET("SetTemp1")
    $Num:=Records In set("SetTemp1")
    UNION("SetTemp1";"Bucket 1";"Bucket 1")
    If ($Num>0)
        AddToGPA
    End If
End If
PSMDebug
```

Friday, September 28, 1990          Procedure: PSM613Seq26

```
vQuestion:="Auditory Reception"
vSequence:=14
vCategory:="2. Learning"
vPNR:="(N)"
vKeyWord:=""
If ([PSM614]9A1#"")
    SEARCH([Inventory];[Inventory]3A=True;")
    SEARCH([Inventory]; & [Inventory]Sound=True;")
    SEARCH([Inventory]; | [Inventory]5M=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records In set("SetTemp1")
    UNION("SetTemp1";"Bucket 2";"Bucket 2")
    If ($Num>0)
        AddToGPA
    End If
End If
PSMDebug vQuestion:="Auditory Association"
vSequence:=15
vCategory:="2. Learning"
vPNR:="(N)"
vKeyWord:=""
If ([PSM614]9A2#"")
    SEARCH([Inventory];[Inventory]3B=True;")
    SEARCH([Inventory]; & [Inventory]Sound=True;")
    SEARCH([Inventory]; | [Inventory]5M=True;")
    SEARCH([Inventory]; | [Inventory]5F=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records In set("SetTemp1")
    UNION("SetTemp1";"Bucket 2";"Bucket 2")
    If ($Num>0)
        AddToGPA
    End If
End If
PSMDebug vQuestion:="Auditory Memory"
vSequence:=16
vCategory:="2. Learning"
vPNR:="(N)"
vKeyWord:=""
If ([PSM614]9A3#"")
    SEARCH([Inventory];[Inventory]3C=True;")
    SEARCH([Inventory]; & [Inventory]Sound=True;")
    SEARCH([Inventory]; | [Inventory]5M=True;")
    SEARCH([Inventory]; | [Inventory]5K=True;")
    SEARCH([Inventory]; | [Inventory]5L=True)
    CREATE SET("SetTemp")
    INTERSECTION("SetTemp";"Bucket 7";"SetTemp1")
```

```
        DIFFERENCE("SetTemp1";"Bucket 2";"SetTemp1")
        USE SET("SetTemp1")
        $Num:=Records In set("SetTemp1")
        UNION("SetTemp1";"Bucket 2";"Bucket 2")
        ┌H ($Num>0)
        │   AddToGPA
        └End H
    └End H
    PSMDebug vQuestion:="Grammer"
    vSequence:=17
    vCategory:="2. Learning"
    vPNR:="(N)"
    vKeyWord:=""
    ┌H ([PSM614]9A4#"")
    │   SEARCH([Inventory];[Inventory]3D=True;")
    │   SEARCH([Inventory]; & [Inventory]Sound=True;")
    │   SEARCH([Inventory]; | [Inventory]5M=True;")
    │   SEARCH([Inventory]; | [Inventory]5E=True)
    │   CREATE SET("SetTemp")
    │   INTERSECTION("SetTemp";"Bucket 7";"SetTemp1")
    │   DIFFERENCE("SetTemp1";"Bucket 2";"SetTemp1")
    │   USE SET("SetTemp1")
    │   $Num:=Records In set("SetTemp1")
    │   UNION("SetTemp1";"Bucket 2";"Bucket 2")
    │   ┌H ($Num>0)
    │   │   AddToGPA
    │   └End H
    └End H
    PSMDebug vQuestion:="Visual Reception"
    vSequence:=18
    vCategory:="2. Learning"
    vPNR:="(N)"
    vKeyWord:=""
    ┌H ([PSM614]9A5#"")
    │   SEARCH([Inventory];[Inventory]3E=True;")
    │   SEARCH([Inventory]; & [Inventory]Sight=True;")
    │   SEARCH([Inventory]; | [Inventory]5M=True)
    │   CREATE SET("SetTemp")
    │   INTERSECTION("SetTemp";"Bucket 7";"SetTemp1")
    │   DIFFERENCE("SetTemp1";"Bucket 2";"SetTemp1")
    │   USE SET("SetTemp1")
    │   $Num:=Records In set("SetTemp1")
    │   UNION("SetTemp1";"Bucket 2";"Bucket 2")
    │   ┌H ($Num>0)
    │   │   AddToGPA
    │   └End H
    └End H
    PSMDebug vQuestion:="Visual Association"
    vSequence:=19
    vCategory:="2. Learning"
    vPNR:="(N)"
    vKeyWord:=""
    ┌H ([PSM614]9A6#"")
    │   SEARCH([Inventory];[Inventory]3F=True;")
    │   SEARCH([Inventory]; & [Inventory]Sight=True;")
    │   SEARCH([Inventory]; | [Inventory]5M=True;")
    │   SEARCH([Inventory]; | [Inventory]5P=True)
    │   CREATE SET("SetTemp")
    │   INTERSECTION("SetTemp";"Bucket 7";"SetTemp1")
    │   DIFFERENCE("SetTemp1";"Bucket 2";"SetTemp1")
    │   USE SET("SetTemp1")
    │   $Num:=Records In set("SetTemp1")
    │   UNION("SetTemp1";"Bucket 2";"Bucket 2")
    │   ┌H ($Num>0)
    │   │   AddToGPA
    │   └End H
    └End H
    PSMDebug vQuestion:="Visual Memory"
    vSequence:=20
    vCategory:="2. Learning"
    vPNR:="(N)"
    vKeyWord:=""
    ┌H ([PSM614]9A7#"")
    │   SEARCH([Inventory];[Inventory]3G=True;")
```

```
    SEARCH([Inventory]; & [Inventory]Sight=True;")
    SEARCH([Inventory]; | [Inventory]5M=True;")
    SEARCH([Inventory]; | [Inventory]5K=True;")
    SEARCH([Inventory]; | [Inventory]5L=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records In set("SetTemp1")
    UNION("SetTemp1";"Bucket 2";"Bucket 2")
    ┌ If ($Num>0)
    │     AddToGPA
    └ End If
└ End If
PSMDebug vQuestion:="Perceptual Constancy"
vSequence:=21
vCategory:="2. Learning"
vPNR:="(N)"
vKeyWord:=""
┌ If ([PSM614]9A8#"")
    SEARCH([Inventory];[Inventory]3H=True;")
    SEARCH([Inventory]; & [Inventory]Sight=True;")
    SEARCH([Inventory]; | [Inventory]5K=True;")
    SEARCH([Inventory]; | [Inventory]5L=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records In set("SetTemp1")
    UNION("SetTemp1";"Bucket 2";"Bucket 2")
    ┌ If ($Num>0)
    │     AddToGPA
    └ End If
└ End If
PSMDebug vQuestion:="Spatial Relationship"
vSequence:=22
vCategory:="2. Learning"
vPNR:="(N)"
vKeyWord:=""
┌ If ([PSM614]9A9#"")
    SEARCH([Inventory];[Inventory]3I=True;")
    SEARCH([Inventory]; & [Inventory]Sight=True;")
    SEARCH([Inventory]; | [Inventory]Sound=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records In set("SetTemp1")
    UNION("SetTemp1";"Bucket 2";"Bucket 2")
    ┌ If ($Num>0)
    │     AddToGPA
    └ End If
└ End If
PSMDebug vQuestion:="Eye/Hand Coord."
vSequence:=23
vCategory:="2. Learning"
vPNR:="(N)"
vKeyWord:=""
┌ If ([PSM614]9A10#"")
    SEARCH([Inventory];[Inventory]3J=True;")
    SEARCH([Inventory]; & [Inventory]Sight=True;")
    SEARCH([Inventory]; & [Inventory]Touch=True;")
    SEARCH([Inventory]; | [Inventory]5N=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records In set("SetTemp1")
    UNION("SetTemp1";"Bucket 2";"Bucket 2")
    ┌ If ($Num>0)
    │     AddToGPA
    └ End If
└ End If
PSMDebug vQuestion:="Balance"
```

```
vSequence:=24
vCategory:="2. Learning"
vPNR:="(N)"
vKeyWord:=""
H ([PSM614]9A11#"")
    SEARCH([Inventory];[Inventory]3K=True;")
    SEARCH([Inventory]; & [Inventory]Sight=True;")
    SEARCH([Inventory]; & [Inventory]Sound=True;")
    SEARCH([Inventory]; | [Inventory]5N=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records in set("SetTemp1")
    UNION("SetTemp1";"Bucket 2";"Bucket 2")
    H ($Num>0)
        AddToGPA
    End H
End H
PSMDebug vQuestion:="Verbal Expression"
vSequence:=25
vCategory:="2. Learning"
vPNR:="(N)"
vKeyWord:=""
H ([PSM614]9A12#"")
    SEARCH([Inventory];[Inventory]3L=True;")
    SEARCH([Inventory]; & [Inventory]Sound=True;")
    SEARCH([Inventory]; | [Inventory]5M=True;")
    SEARCH([Inventory]; | [Inventory]5E=True)
    CREATE SET("SetTemp")
    INTERSECTION("SetTemp";"Bucket 7";"SetTemp1")
    DIFFERENCE("SetTemp1";"Bucket 2";"SetTemp1")
    USE SET("SetTemp1")
    $Num:=Records in set("SetTemp1")
    UNION("SetTemp1";"Bucket 2";"Bucket 2")
    H ($Num>0)
        AddToGPA
    End H
End H
PSMDebug
```

Friday, September 28, 1990          Procedure: PSM613Seq32

```
vQuestion:="Plays-Alone"
vSequence:=27
vCategory:="3. Entertainment"
vPNR:="(N)"
vKeyWord:=""
H ([PSM614]7A 1)
    SEARCH([Inventory];[Inventory]5E=True;")
    SEARCH([Inventory]; | [Inventory]5F=True;")
    SEARCH([Inventory]; & [Inventory]Max Participant>1)
    CREATE SET("SetTemp")
    INTERSECTION("SetTemp";"Bucket 7";"SetTemp1")
    DIFFERENCE("SetTemp1";"Bucket 3";"SetTemp1")
    USE SET("SetTemp1")
    $Num:=Records in set("SetTemp1")
    UNION("SetTemp1";"Bucket 3";"Bucket 3")
    H ($Num>0)
        AddToGPA
    End H
End H
PSMDebug vQuestion:="Plays Alone"
vSequence:=28
vCategory:="3. Entertainment"
vPNR:="(N)"
vKeyWord:=""
H ([PSM614]7B 9) | ([PSM614]7B 10)
    SEARCH([Inventory];[Inventory]5E=True;")
    SEARCH([Inventory]; | [Inventory]5F=True;")
    SEARCH([Inventory]; & [Inventory]Max Participant>1)
    CREATE SET("SetTemp")
    INTERSECTION("SetTemp";"Bucket 7";"SetTemp1")
    DIFFERENCE("SetTemp1";"Bucket 3";"SetTemp1")
    USE SET("SetTemp1")
    $Num:=Records in set("SetTemp1")
    UNION("SetTemp1";"Bucket 3";"Bucket 3")
```

```
  ┌─If ($Num>0)
  │    AddToGPA
  │  └End If
└End If
PSMDebug vQuestion:="Completes Activity"
vSequence:=29
vCategory:="3. Entertainment"
vPNR:="(N)"
vKeyWord:=""
┌─If ([PSM614]7C 11) | ([PSM614]7C 12)
│    SEARCH([Inventory];[Inventory]5B>=10;")
│    SEARCH([Inventory]; | [Inventory]5C>=2;")
│    SEARCH([Inventory]; | [Inventory]5G=True;")
│    SEARCH([Inventory]; | [Inventory]5P=True;")
│    SEARCH([Inventory]; | [Inventory]5R=True)
│    CREATE SET("SetTemp")
│    INTERSECTION("SetTemp";"Bucket 7";"SetTemp1")
│    DIFFERENCE("SetTemp1";"Bucket 3";"SetTemp1")
│    USE SET("SetTemp1")
│    $Num:=Records In set("SetTemp1")
│    UNION("SetTemp1";"Bucket 3";"Bucket 3")
│  ┌─If ($Num>0)
│  │    AddToGPA   ` [GPA]InstructVars:="Length Of Time-"+[Inventory]5B+", No. Of Factors-???
│  └End If
└End If
PSMDebug vQuestion:="Game Fun"
vSequence:=30
vCategory:="3. Entertainment"
vPNR:="(N)"
vKeyWord:=""
┌─If ([PSM614]7D 7) | ([PSM614]7D 8)
│    SEARCH([Inventory]; | [Inventory]5E=True;")
│    SEARCH([Inventory]; | [Inventory]5F=True;")
│    SEARCH([Inventory]; | [Inventory]5R=True)
│    SEARCH([Inventory]; & [Inventory]Max Participant>1)
│    CREATE SET("SetTemp")
│    INTERSECTION("SetTemp";"Bucket 7";"SetTemp1")
│    DIFFERENCE("SetTemp1";"Bucket 3";"SetTemp1")
│    USE SET("SetTemp1")
│    $Num:=Records In set("SetTemp1")
│    UNION("SetTemp1";"Bucket 3";"Bucket 3")
│  ┌─If ($Num>0)
│  │    AddToGPA
│  └End If
└End If
PSMDebug vQuestion:="Good Sport"
vSequence:=31
vCategory:="3. Entertainment"
vPNR:="(N)"
vKeyWord:=""
┌─If ([PSM614]7D 3) | ([PSM614]7D 4)
│    SEARCH([Inventory]; | [Inventory]5E=True;")
│    SEARCH([Inventory]; | [Inventory]5F=True;")
│    SEARCH([Inventory]; | [Inventory]5R=True)
│    SEARCH([Inventory]; & [Inventory]Max Participant>1)
│    CREATE SET("SetTemp")
│    INTERSECTION("SetTemp";"Bucket 7";"SetTemp1")
│    DIFFERENCE("SetTemp1";"Bucket 3";"SetTemp1")
│    USE SET("SetTemp1")
│    $Num:=Records In set("SetTemp1")
│    UNION("SetTemp1";"Bucket 3";"Bucket 3")
│  ┌─If ($Num>0)
│  │    AddToGPA
│  └End If
└End If
PSMDebug vQuestion:="Prefers to Be Alone"
vSequence:=32
vCategory:="3. Entertainment"
vPNR:="(N)"
vKeyWord:=""
┌─If ([PSM614]7E 9) | ([PSM614]7E 10)
│    SEARCH([Inventory]; | [Inventory]5E=True;")
│    SEARCH([Inventory]; | [Inventory]5F=True;")
│    SEARCH([Inventory]; | [Inventory]5R=True)
│    SEARCH([Inventory]; & [Inventory]Max Participant>1)
```

```
    CREATE SET ("SetTemp")
    INTERSECTION("SetTemp";"Bucket 7";"SetTemp1")
    DIFFERENCE("SetTemp1";"Bucket 3";"SetTemp1")
    USE SET ("SetTemp1")
    $Num:=Records In set ("SetTemp1")
    UNION ("SetTemp1";"Bucket 3";"Bucket 3")
    ┌ If ($Num>0)
    │    AddToGPA
    └ End If
End If
PSMDebug
```

Friday, September 28, 1990          Procedure:   PSM613Seq42                                1

---

```
vQuestion:="Hobbies"
vSequence:=33
vCategory:="5. Interests"
vPNR:="(P)"
vKeyWord:=""
┌ If ([PSM614]8_A="")
│
│   StringSelection ([PSM614]8_A)
│
│   CREATE SET ("SetTemp")
│   INTERSECTION("SetTemp";"Bucket 7";"SetTemp1")
│   DIFFERENCE("SetTemp1";"Bucket 5";"SetTemp1")
│   USE SET ("SetTemp1")
│   $Num:=Records In set ("SetTemp1")
│   UNION ("SetTemp1";"Bucket 5";"Bucket 5")
│   ┌ If ($Num>0)
│   │    AddToGPA
│   └ End If
└ End If
PSMDebug vQuestion:="Likes to Read"
vSequence:=34
vCategory:="5. Interests"
vPNR:="(P)"
vKeyWord:=""
$Part1:=(Num([PSM614]8D_1)**"Comic Books,")+(Num([PSM614]8D_2)**"Mysteries,")+(Num([PSM614]8D_3)**"Romance,")+(Num([PS
$Part2:=(Num([PSM614]8D_7)**"People Storeis,")+(Num([PSM614]8D_8)**"History,")+(Num([PSM614]8D_9)**"Magazines,")+(Num([PS
┌ If ([PSM614]8D_12="")
│   $Part3:=""
│ Else
│   $Part3:=[PSM614]8D_12
└ End If vString:=$Part1+$Part2+$Part3
StringSelection (vString)
CREATE SET ("SetTemp")
INTERSECTION("SetTemp";"Bucket 7";"SetTemp1")
DIFFERENCE("SetTemp1";"Bucket 5";"SetTemp1")
USE SET ("SetTemp1")
$Num:=Records In set ("SetTemp1")
UNION ("SetTemp1";"Bucket 5";"Bucket 5")
┌ If ($Num>0)
│    AddToGPA
└ End If
PSMDebug vQuestion:="Sports"
vSequence:=35
vCategory:="5. Interests"
vPNR:="(R)"
vKeyWord:=""
$Part1:=(Num([PSM614]8C_1)**"Baseball,")+(Num([PSM614]8C_2)**"Basketball,")+(Num([PSM614]8C_3)**"Football,")+(Num([PSM61
$Part2:=(Num([PSM614]8C_7)**"Golf,")+(Num([PSM614]8C_8)**"Bowling,")+(Num([PSM614]8C_9)**"Volleyball,")+(Num([PSM614]8C
$Part3:=(Num([PSM614]8C_13)**"Handball,")+(Num([PSM614]8C_14)**"Ice Skating,")+(Num([PSM614]8C_15)**"Roller Skating,")+(Nu
┌ If ([PSM614]8C19="")
│   $Part4:=""
│ Else
│   $Part4:=[PSM614]8C19
└ End If
vString:=$Part1+$Part2+$Part3+$Part4
StringSelection (vString)
CREATE SET ("SetTemp")
INTERSECTION("SetTemp";"Bucket 7";"SetTemp1")
DIFFERENCE("SetTemp1";"Bucket 5";"SetTemp1")
USE SET ("SetTemp1")
```

```
$Num:=Records in set ("SetTemp1")
UNION ("SetTemp1";"Bucket 5";"Bucket 5")
If ($Num>0)
    AddToGPA
End If
PSMDebug vQuestion:="Toys Enjoyed Most"
vSequence:=36
vCategory:="5. Interests"
vPNR:="(P)"
vKeyWord:=""
If ([PSM614]8E3="")
    StringSelection ([PSM614]8E3)
    CREATE SET ("SetTemp")
    INTERSECTION("SetTemp";"Bucket 7";"SetTemp1")
    DIFFERENCE("SetTemp1";"Bucket 5";"SetTemp1")
    USE SET ("SetTemp1")
    $Num:=Records in set ("SetTemp1")
    UNION ("SetTemp1";"Bucket 5";"Bucket 5")
    If ($Num>0)
        AddToGPA
    End If
End If
PSMDebug vQuestion:="Favorite Game"
vSequence:=37
vCategory:="5. Interests"
vPNR:="(P)"
vKeyWord:=""
If ([PSM614]8E8="")

StringSelection ([PSM614]8E8)

CREATE SET ("SetTemp")
    INTERSECTION("SetTemp";"Bucket 7";"SetTemp1")
    DIFFERENCE("SetTemp1";"Bucket 5";"SetTemp1")
    USE SET ("SetTemp1")
    $Num:=Records in set ("SetTemp1")
    UNION ("SetTemp1";"Bucket 5";"Bucket 5")
    If ($Num>0)
        AddToGPA
    End If
End If
PSMDebug vQuestion:="Listen To"
vSequence:=38
vCategory:="5. Interests"
vPNR:="(P)"
vKeyWord:=""
If ([PSM614]8E11_1="")
    CREATE EMPTY SET ("SetTemp")
    MatchWord ("Music")
    CREATE SET ("SetFound")
    UNION ("SetFound";"SetTemp";"SetTemp")
    MatchWord ("Story")
    CREATE SET ("SetFound")
    UNION ("SetFound";"SetTemp";"SetTemp")
    MatchWord ("News")
    CREATE SET ("SetFound")
    UNION ("SetFound";"SetTemp";"SetTemp")
    MatchWord ("Tapes")
    CREATE SET ("SetFound")
    UNION ("SetFound";"SetTemp";"SetTemp")
    USE SET ("SetTemp")
    CREATE SET ("SetTemp")
    INTERSECTION("SetTemp";"Bucket 7";"SetTemp1")
    DIFFERENCE("SetTemp1";"Bucket 5";"SetTemp1")
    USE SET ("SetTemp1")
    $Num:=Records in set ("SetTemp1")
    UNION ("SetTemp1";"Bucket 5";"Bucket 5")
    If ($Num>0)
        AddToGPA
    End If
End If
PSMDebug vQuestion:="Computer"
vSequence:=39
vCategory:="5. Interests"
vPNR:="(P)"
```

```
vKeyWord:=""
┌H ([PSM614]Computer)
│   MatchWord ([PSM614]8E12_1)
│   USE SET ("Matching Inventory")
│   CREATE SET ("SetTemp")
│   INTERSECTION("SetTemp";"Bucket 7";"SetTemp1")
│   DIFFERENCE("SetTemp1";"Bucket 5";"SetTemp1")
│   USE SET ("SetTemp1")
│   $Num:=Records in set ("SetTemp1")
│   UNION ("SetTemp1";"Bucket 5";"Bucket 5")
│   ┌H ($Num>0)
│   │   AddToGPA
│   └End H
└End H
PSMDebug vQuestion:="Instrument"
vSequence:=40
vCategory:="5. Interests"
vPNR:="(P)"
vKeyWord:=""
┌H ([PSM614]813_1#"")
│   StringSelection ([PSM614]813_1)
│   CREATE SET ("SetTemp")
│   INTERSECTION("SetTemp";"Bucket 7";"SetTemp1")
│   DIFFERENCE("SetTemp1";"Bucket 5";"SetTemp1")
│   USE SET ("SetTemp1")
│   $Num:=Records in set ("SetTemp1")
│   UNION ("SetTemp1";"Bucket 5";"Bucket 5")
│   ┌H ($Num>0)
│   │   AddToGPA
│   └End H
└End H
PSMDebug vQuestion:="Interests"
vSequence:=41
$Part1:=(Num([PSM614]8G_1)*"Auto Mechanics,")+(Num([PSM614]8G_2)*"Television,")+(Num([PSM614]8G_3)*"Famous People,")
$Part2:=(Num([PSM614]8G_7)*"Insect,")+(Num([PSM614]8G_8)*"Skateboarding,")+(Num([PSM614]8G_9)*"Basketball,")+(Num([PS
$Part3:=(Num([PSM614]8G_13)*"Detectives,")+(Num([PSM614]8G_14)*"Farming,")+(Num([PSM614]8G_15)*"Medicine,")+(Num([PS
$Part4:=(Num([PSM614]8G_19)*"Fairy Tales,")+(Num([PSM614]8G_20)*"Woodwork,")+(Num([PSM614]8G_21)*"Electricity,")+(Num(
$Part5:=(Num([PSM614]8G_25)*"Science,")+(Num([PSM614]8G_26)*"Race Cars,")+(Num([PSM614]8G_27)*"Hockey,")+(Num([PSM
$Part6:=(Num([PSM614]8G_31)*"Flowers/Plants,")+(Num([PSM614]8G_32)*"Astronomy,")+(Num([PSM614]8G_33)*"Banking,")+(Nu
$Part7:=(Num([PSM614]8G_38)*"Electronics,")+(Num([PSM614]8G_39)*"Adventure,")+(Num([PSM614]8G_40)*"Poetry,")+(Num([PS
$Part8:=(Num([PSM614]8G_44)*"Tennis,")+(Num([PSM614]8G_45)*"Robots,")+(Num([PSM614]8G_46)*"Myths,")+(Num([PSM614]8
$Part9:=(Num([PSM614]8G_50)*"Advertising,")+(Num([PSM614]8G_51)*"Business,")+(Num([PSM614]8G_52)*"people,")+(Num([PS
$Part10:=(Num([PSM614]8G_56)*"Dancing,")+(Num([PSM614]8G_57)*"Current Events,")+(Num([PSM614]8G_58)*"Zoo Animals,")+
$Part11:=(Num([PSM614]8G_62)*"Real Estate,")+(Num([PSM614]8G_63)*"Jokes,")+(Num([PSM614]8G_64)*"Circus,")+(Num([PSM( ┌H ([PSM614]8G_35="")
│   $Part12:=""
│ Else
│   $Part12:=[PSM614]8G_35
└End H vString:=$Part1+$Part2+$Part3+$Part4+$Part5+$Part6+$Part7+$Part8+$Part9+$Part10+$Part11+$Part12
StringSelection (vString)
CREATE SET ("SetTemp")
INTERSECTION("SetTemp";"Bucket 7";"SetTemp1")
DIFFERENCE("SetTemp1";"Bucket 5";"SetTemp1")
USE SET ("SetTemp1")
$Num:=Records in set ("SetTemp1")
UNION ("SetTemp1";"Bucket 5";"Bucket 5")
┌H ($Num>0)
│   AddToGPA
└End H
PSMDebug vQuestion:="Special Talents"
vSequence:=42
vCategory:="5. Interests"
vPNR:="(P)"
vKeyWord:=""
┌H ([PSM614]12="")
│   StringSelection ([PSM614]12)
│   CREATE SET ("SetTemp")
│   INTERSECTION("SetTemp";"Bucket 7";"SetTemp1")
│   DIFFERENCE("SetTemp1";"Bucket 5";"SetTemp1")
│   USE SET ("SetTemp1")
│   $Num:=Records in set ("SetTemp1")
│   UNION ("SetTemp1";"Bucket 5";"Bucket 5")
│   ┌H ($Num>0)
```

```
    AddToGPA
   End If
 End If
PSMDebug vQuestion:="Weaknesses"
vSequence:=43
vCategory:="5. Interests"
vPNR:="(N)"
vKeyWord:=""
If ([PSM614]13="")
    StringSelection ([PSM614]13)
    CREATE SET("SetTemp")
    INTERSECTION("SetTemp";"Bucket 7";"SetTemp1")
    DIFFERENCE("SetTemp1";"Bucket 5";"SetTemp1")
    USE SET("SetTemp1")
    $Num:=Records in set("SetTemp1")
    UNION("SetTemp1";"Bucket 5";"Bucket 5")
    If ($Num>0)
        AddToGPA
    End If
End If
PSMDebug
```

Friday, September 28, 1990          Procedure:  PSM613Seq45                    1

```
vQuestion:="Patience"
vSequence:=44
vCategory:="4. Play Value"
vPNR:="(N)"
vKeyWord:=""
If ([PSM614]7F 7) | ([PSM614]7F 8)
    SEARCH([Inventory];[Inventory]5R=True)
    CREATE SET("SetTemp")
    INTERSECTION("SetTemp";"Bucket 7";"SetTemp1")
    DIFFERENCE("SetTemp1";"Bucket 4";"SetTemp1")
    USE SET("SetTemp1")
    $Num:=Records in set("SetTemp1")
    UNION("SetTemp1";"Bucket 4";"Bucket 4")
    If ($Num>0)
        AddToGPA
    End If
End If
PSMDebug vQuestion:="Religious"
vSequence:=45
vCategory:="4. Play Value"
vPNR:="(R)"
vKeyWord:=""
If ([PSM614]7F 9) | ([PSM614]7F 10) & ([Users]Religion#"")
    SEARCH([Inventory];[Inventory]Keywords=[Users]Religion)
    CREATE SET("SetTemp")
    INTERSECTION("SetTemp";"Bucket 7";"SetTemp1")
    DIFFERENCE("SetTemp1";"Bucket 4";"SetTemp1")
    USE SET("SetTemp1")
    $Num:=Records in set("SetTemp1")
    UNION("SetTemp1";"Bucket 4";"Bucket 4")
    If ($Num>0)
        AddToGPA
    End If
End If
PSMDebug
```

Friday, September 28, 1990          Procedure:  PSM613Seq47                    1

```
vQuestion:="Afraid to Talk"
vSequence:=46
vCategory:="4. Play Value"
vPNR:="(N)"
vKeyWord:=""
If ([PSM614]7E 1) | ([PSM614]7E 2)
    SEARCH([Inventory];[Inventory]5E=True;")
    SEARCH([Inventory]; | [Inventory]5F=True;")
    SEARCH([Inventory]; & [Inventory]Max Participant>1)
    CREATE SET("SetTemp")
    INTERSECTION("SetTemp";"Bucket 7";"SetTemp1")
    DIFFERENCE("SetTemp1";"Bucket 4";"SetTemp1")
    USE SET("SetTemp1")
```

```
    UNION("SetTemp1";"Bucket 4";"Bucket 4")
    $Num:=Records in set("SetTemp1")
    AddToGPA
End If
PSMDebug vQuestion:="Uses Time Wisely"
vSequence:=47
vCategory:="4. Play Value"
vPNR:="(N)"
vKeyWord:=""
If ([PSM614]7E 7) | ([PSM614]7E 8)
    SEARCH([Inventory];[Inventory]5B>=10;"")
    SEARCH([Inventory]; & [Inventory]5G=True;")
    SEARCH([Inventory]; & [Inventory]5H=True)
    CREATE SET("SetTemp")
    INTERSECTION("SetTemp";"Bucket 7";"SetTemp1")
    DIFFERENCE("SetTemp1";"Bucket 4";"SetTemp1")
    USE SET("SetTemp1")
    UNION("SetTemp1";"Bucket 4";"Bucket 4")
    $Num:=Records in set("SetTemp1")
    If ($Num>0)
        AddToGPA
    End If
End If
PSMDebug
```

Friday, September 28, 1990                    Layout: Input

================ Written Paragraph ================

Paragraph

[Save]
[Cancel]
[|◄] [◄] [►] [►|]
Page 4
[Print]    [Notes] [◄] [►]

Friday, September 28, 1990　　　　　　　　　　　　　　　　　Layout: Input
Visual
GPA Visual
Talents
GPA Talents
Auditory
GPA Auditory
[ Save ]
[ Cancel ]
|◀ ◀ ▶ ▶|
Page 5
[ Notes ]  
---
Friday, September 28, 1990　　　　　　　　　　　　　　　　　Layout: Input
Interests
GPA Interests
Medical
GPA Medical
Academic
GPA Academic
[ Save ]
[ Cancel ]
|◀ ◀ ▶ ▶|
Page 6
[ Notes ]  

Friday, September 28, 1990                                    Layout: Input

Social

GPA Social

Nutritional

GPA Nutrition

Save
Cancel
|◀ ◀ ▶ ▶|
Page 7
Notes ◀ ▶

---

Friday, September 28, 1990                                    Layout: Output

| SubCode | Description |
|---------|-------------|
| Ca  Su  | Description |

Delete    Add Records    Export  Import    Sort    Search by Example    Done

Friday, September 28, 1990        Layout: Input         1
SubCodes
SubCode [Su]
Category [Ca]
Description
| Description |
Save
Cancel
|◀ ◀ ▶ ▶|
Page
◀ ▶
Friday, September 28, 1990        Layout: Output
| UIN # | Users |
|-------|-------|
| UIN   | vTemp |
[Export]
[Import]
 Sort     Search by Example     Done Friday, September 28, 1990                                   Layout: Input UIN # [UIN]                      Create Date: [Create Date]  Last Update [Last Update]
Form PSM 0-3 for [vName]

1. Infant grasps and holds items in his/her hands: [1A] months
comments [1B]

2. Infant fingers item with both hands: [2A] months
comments [2B]

3. Infant hits at object that is suspended overhead: [3A] months
comments [3B]

4. Infant's eyes follow moving objects or people: [4A] months
comments [4B]

[Save]
[Cancel]

5. Infant likes to interact with people: [5A] months
comments [5B]

[Page 1] ◄ ►

---

Friday, September 28, 1990                                   Layout: Input

Form PSM 0-3 for [vName]          Create Date: [Create Date]  Last Update [Last Update]

6. Infant responds to sounds: [6A] months
comments [6B]

7. Baby turns over well by her/himself: [7A] months
comments [7B]

8. Baby responds to sound of his/her name: [8A] months
comments [8B]

9. Baby makes contact with objects he/she hits at: [9A] months
comments [9B]

[Save]
[Cancel]

10. Baby moves objects from hand to hand: [10A] months
comments [10B]

[Page 2] ◄ ►

Friday, September 28, 1990                                    Layout: Input

---

Form PSM 0-3 for |vName        |   Create Date: |Create Date|  Last Update |Last Update|

11. Baby pulls herself to near sitting position: |11A| months comments |11B                              |

12. Child sits up by her/himself: |12A| months comments |12B                              |

13. Child is uncomfortable with strangers: |13A| months comments |13B                              |

14. Child understands words when spoken to: |14A| months        | Save | comments |14B                              |                    | Cancel |

15. Child speaks words or repeats sounds: |15A| months comments |15B                              |                    | Page 3 |

---

Friday, September 28, 1990                                    Layout: Input

---

Form PSM 0-3 for |vName        |   Create Date: |Create Date|  Last Update |Last Update|

16. Child crawls on level floors: |16A| months   on stairs |16B| months comments |16C                              |

17. Child pulls him/herself up to a standing position: |17A| months comments |17B                              |

18. Child looks for toys she/he drops: |18A| months comments |18B                              |

19. Child walks steadily all floors: |19A| months on stairs |19B| months   | Save | comments |19C                              |                              | Cancel |

20. Child speaks in senteneces: |20A| months comments |20B                              |                              | Page 4 |

Friday, September 28, 1990　　　　　　　　　　　　　　　　　　Layout: Input

Form PSM 0-3 for [vName]　　　　Create Date: [Create Date]　Last Update [Last Update]

21. Child show interest in playing with others... [21A] months
comments [21B]

22. Child safely rides in wagon: [22A] months　on a tricycle [22B] months
comments [22C]

23. Child rolls or throws a ball to you: [23A] months
comments [23B]

24. Child catches a ball that is rolled/thrown to him [24A] months
comments [24B]

[ Save ]
[ Cancel ]

25. Child frightens by objects that move... [25A] months
comments [25B]

Page 5 

---

Friday, September 28, 1990　　　　　　　　　　　　　　　　　　Layout: Input

Form PSM 0-3 for [vName]　　　　Create Date: [Create Date]　Last Update [Last Update]

26. Child reads letters: [26A] months　Words: [26B] months
comments [26C]

27. Child engages in fantasy alone: [27A] months　With Others: [27B] months
comments [27C]

28. Child does simple drawings: [28A] months　Puzzles: [28B] months　building: [28C] months
comments [28D]

29. Child interacts with peers as a leader: [29A] months follower [29B] months
[ Save ]
[ Cancel ]
comments [29C]

Page 6 

Friday, September 28, 1990                                    Layout: Input

Form PSM 0-3 for |vName          |   Create Date: |Create Date|  Last Update |Last Update|

30 DIETARY HABITS:

| | | | | |
|---|---|---|---|---|
| Sugar | ☒ Yes | ☒ Mostly Yes | ☒ No | ☒ Mostly No |
| Salt | ☒ Yes | ☒ Mostly Yes | ☒ No | ☒ Mostly No |
| Soda-Pop | ☒ Yes | ☒ Mostly Yes | ☒ No | ☒ Mostly No |
| Nutrasweet | ☒ Yes | ☒ Mostly Yes | ☒ No | ☒ Mostly No |
| Saccharin | ☒ Yes | ☒ Mostly Yes | ☒ No | ☒ Mostly No |
| Chocolate | ☒ Yes | ☒ Mostly Yes | ☒ No | ☒ Mostly No |
| Candy | ☒ Yes | ☒ Mostly Yes | ☒ No | ☒ Mostly No |
| Ice-Cream | ☒ Yes | ☒ Mostly Yes | ☒ No | ☒ Mostly No |
| Cake & cookies | ☒ Yes | ☒ Mostly Yes | ☒ No | ☒ Mostly No |

Special Diets?   |14 diets                                    |

[ Save ]
[ Cancel ]

Page 7 

---

Friday, September 28, 1990                                    Layout: Input

Form PSM 0-3 for |vName          |   Create Date: |Create Date|  Last Update |Last Update|

31. Does your child appear to have any problems with:

| | |
|---|---|
| listening/hearing 4mo | 31A1 |
| Souce of Sound 6mo | 31A2 |
| Recalling @ 8mo | 31A3 |
| Grammer @ 24mo | 31A4 |
| Seeing @ 4mo | 31A5 |
| Source of sight @ 4mo | 31A6 |
| Recalling/seen @ 8mo | 31A7 |
| Shape/Size @ 24mo | 31A8 |
| Dressing @ 24 mo | 31A9 |
| Catching @ 24 mo | 31A10 |
| Walking @ 24 mo | 31A11 |
| Speaking sentence 24 | 31A12 |
| Motion sickness 24mo | 31A13 |
| Middle Ear @ 4mo | 31A14 |
| Back/Spine @ 4 mo | 31A15 | leave blank for NO

[ Save ]
[ Cancel ]

Page 8 

Friday, September 28, 1990                               Layout: Input

---

Form PSM 0-3 for |vName          |   Create Date: |Create Date| Last Update |Last Update|

32 Pregnancy, birth, and Infancy Information:

A. Describe any special conditions that occurred during pregnancey or at the time of your child's birth::

| 32A |

B. Which infant formula did you choose?

| 32B |

C. Check if they apply:

- ☒ Normal Delivery
- ☒ Natural Childbirth
- ☒ Cesarean Section
- ☒ Induced Labor
- ☒ Breach delivery
- ☒ Anesthetic   ☒ Demoral   ☒ Epidural Block   ☒ Pericervical Block

[ Save ]
[ Cancel ]

Page 9 

---

Friday, September 28, 1990                               Layout: Input

---

Form PSM 0-3 for |vName          |   Create Date: |Create Date| Last Update |Last Update|

33. Take Action Now

Is there a particular area of your child's development that you would like to address immediately?

| ImmediateDev |

[ Save ]
[ Cancel ]

Page 10 

Friday, September 28, 1990                                    Layout: Output

| UIN # | Users |
|-------|-------|
| UIN   | vTemp |

[Export]
[Import]    Sort    Search by Example    Done

Friday, September 28, 1990                                    Layout: Input

UIN #         [UIN]         Create Date: [Create Date]  Last Update [Last Update]
Form PSM 2-5 for  [vName]

7A FAMILY RELATIONSHIPS

This child is a person who...

enjoys being with my    ☒ Mother ☒ Father ☒ Sister ☒ Brother ☒ Alone
frequently plays with   ☒ Mother ☒ Father ☒ Sister ☒ Brother ☒ Alone
frequently reads with   ☒ Mother ☒ Father ☒ Sister ☒ Brother ☒ Alone
asks for help from      ☒ Mother ☒ Father ☒ Sister ☒ Brother ☒ Alone This child is a person who...

|  | Yes | Mostly Yes | No | Mostly No |
|---|---|---|---|---|
| enjoys being with a special aunt or uncle | ☒ | ☒ | ☒ | ☒ |
| enjoys being with a special grandparent | ☒ | ☒ | ☒ | ☒ |

[Save]
[Cancel]

[Page 1]
◀ ▶

Friday, September 28, 1990

Form PSM 2-5 for |vName|     Create Date: |Create Date| Last Update |Last Update|

7B Social Relationships and moods:

|  | Yes | Mostly Yes | No | Mostly No |
|---|---|---|---|---|
| enjoys companionship/children | ☒ | ☒ | ☒ | ☒ |
| prefers playing alone | ☒ | ☒ | ☒ | ☒ |
| seems afraid to talk to people | ☒ | ☒ | ☒ | ☒ |
| gets mad if laughed at | ☒ | ☒ | ☒ | ☒ |
| has a great deal of patience | ☒ | ☒ | ☒ | ☒ |

7C Discipline and leadership style

| | | | | |
|---|---|---|---|---|
| lives up to committments | ☒ | ☒ | ☒ | ☒ |
| always tries to cooperate | ☒ | ☒ | ☒ | ☒ |
| stays with activity until compl. | ☒ | ☒ | ☒ | ☒ |
| leads activities with playmates | ☒ | ☒ | ☒ | ☒ |
| uses time wisely | ☒ | ☒ | ☒ | ☒ |
| prefers to be alone | ☒ | ☒ | ☒ | ☒ |
| enjoys the game for fun/not win | ☒ | ☒ | ☒ | ☒ |

[ Save ]
[ Cancel ]

Page 2 ◀ ▶

---

Friday, September 28, 1990         Layout: Input

Form PSM 2-5 for |vName|     Create Date: |Create Date| Last Update |Last Update|

7D Biological clock:

| | | | | |
|---|---|---|---|---|
| listens & understands better | ☒ All Day | ☒ Morning | ☒ Afternoon | ☒ Evening |
| reads & comprehends better | ☒ All Day | ☒ Morning | ☒ Afternoon | ☒ Evening |
| socializes better | ☒ All Day | ☒ Morning | ☒ Afternoon | ☒ Evening |

8 What is your child's knowledge of:

|  | No Experience | Learning in Process | Has Basic Knowledge |
|---|---|---|---|
| Colors | ☒ | ☒ | ☒ |
| Alphabet | ☒ | ☒ | ☒ |
| Math | ☒ | ☒ | ☒ |
| Reading | ☒ | ☒ | ☒ |
| Time | ☒ | ☒ | ☒ |
| Right/Left | ☒ | ☒ | ☒ |
| Buttoning, zipping, etc. | ☒ | ☒ | ☒ |

9A. Day care hours per day? |9A1|    (leave blank for none)
             per week? |9A2|

9B. Favorite activity at the facility?
|9B|

[ Save ]
[ Cancel ]

Page 3 ◀ ▶

Friday, September 28, 1990                                      Layout: Input

---

Form PSM 2-5 for |vName        |    Create Date: |Create Date| Last Update |Last Update|

9C. Can you bring toys and books to the facility for your child to use?  ○ Yes   ○ No
9D. Would a staff member spend time interacting with your child?  ○ Yes   ○ No
9E. Do other children interact with your child?  ○ Yes   ○ No 10. How much time per day can you (or another family member) invest in your child?

|         |   | Time in minutes |
|---------|---|-----------------|
| Playing |   | 10A1 |
| Bathing |   | 10A2 |
| Feeding |   | 10A3 |
| Reading |   | 10A4 |
| Other   | 10A5other | 10A5 |

11. How much time per week does your child invest in the following?

|          |            | Time in minutes |
|----------|------------|-----------------|
| Gym      |            | 11A1 |
| Music    |            | 11A2 |
| Art      |            | 11A3 |
| Computer |            | 11A4 |
| Library  |            | 11A5 |
| Other    | 11A6other  | 11A6 |

[ Save ]

[ Cancel ]

[ Page 4 ]  ◀ ▶

---

Friday, September 28, 1990                                      Layout: Input

---

Form PSM 2-5 for |vName        |    Create Date: |Create Date| Last Update |Last Update|

12. What would you like to do with your child if you had more free time?

|12_A                                                           |

13. Miscellaneous:

(A) What is your child's favorite quiet time activity? |13A       |
(B) Child's favorite physical/sport activity? |13B       |
(C) What kind of books:

(1) enjoy the most?   |13C1       |
   (2) read alone?       |13C2       |
   (3) Read to him/her?  |13C3       |

(D) How do you and your child spend leisure time together as a family?

|13_D                                                  |

(E) What type of toys does your child enjoy the most?

|13E1                                                  |

Why? |13E_2                                            |

[ Save ]

[ Cancel ]

[ Page 5 ]  ◀ ▶

Friday, September 28, 1990                                    Layout: Input

---

Form PSM 2-5 for [vName]         Create Date: [Create Date]  Last Update [Last Update]

(F) What kind of games does your child enjoy most? [13F1]

Why? [13F_2]

(G) 1. Favorite TV Program     [13G1]
    2. Watch entire program?   ○ Yes     ○ No
    3. How many minutes is program? [13G3]

(H) Attention span in minutes at each sitting:
Watching TV? [13H1]   Reading? [13H2]   Playing? [13H3]

(I) Favorite kind of audio record or cassette:
[13I1]

[Save]

(J) Is your child short tempered?    ○ Yes    ○ No

[Cancel]

(K) Is your child timid (shy)?    ○ Yes    ○ No
    Assertive? ○ Yes   ○ No   Sociable? ○ Yes   ○ No Page 6 

---

Friday, September 28, 1990                                    Layout: Input

---

Form PSM 2-5 for [vName]         Create Date: [Create Date]  Last Update [Last Update]

(L) Does your child speak words?  ○ Yes    ○ No    If yes, what are some of them:
[13L2]

Does your child speak sentences? ○ Yes    ○ No    If yes, are the sentences:
    ☒ Questions        ☒ Comments        ☒ Humor 14. Do you have a personal computer in your home? ○ Yes    ○ No
    If yes, what model? [14A2]
    Does your child already use this computer?  ○ Yes    ○ No
    What kind of programs does your child use?
[14A4]

[Save]

15. Type of instrument played? [15A1]
    How Long? [15A2]
    Playing ability? [15A3]

[Cancel]

16. Is your child right or left handed? [16A1]

Page 7 

Friday, September 28, 1990                                        Layout: Input

Form PSM 2-5 for |vName          |   Create Date: |Create Date| Last Update |Last Update|

17. Does your child have any problems with:

| Auditory reception | |17_1| |
|---|---|
| Auditory association | |17_2| |
| Auditory memory | |17_3| |
| Grammar | |17_4| |
| Visual reception | |17_5| |
| Visual association | |17_6| |
| Visual memory | |17_7| |
| Perceptual constancy | |17_8| |
| Spatial relationships | |17_9| |
| Eye/hand coordin. | |17_10| |
| Balance | |17_11| |
| Verbal expression | |17_12| |
| Motion sickness | |17_13| |
| Middle ear | |17_14| |
| Back or spine | |17_15| | leave blank for NO

[ Save ]

[ Cancel ]

Page 8

---

Friday, September 28, 1990                                        Layout: Input

Form PSM 2-5 for |vName          |   u   |Create Date| Last   |Last Update|

18. Describe any medical history and current conditions?

|18A_1                                                                       |

19. Identify any special talents and abilities of your child?

|19A_1                                                                       |

20. Identify any weakness and needs of your child?

|20A_1                                                                       |

21. Describe your child's dietary habits?

| | | | | |
|---|---|---|---|---|
| Sugar | ☒ Yes | ☒ Mostly Yes | ☒ No | ☒ Mostly No |
| Salt | ☒ Yes | ☒ Mostly Yes | ☒ No | ☒ Mostly No |
| Soda Pop | ☒ Yes | ☒ Mostly Yes | ☒ No | ☒ Mostly No |
| Nutrasweet | ☒ Yes | ☒ Mostly Yes | ☒ No | ☒ Mostly No |
| Saccharin | ☒ Yes | ☒ Mostly Yes | ☒ No | ☒ Mostly No |
| Sweets | ☒ Yes | ☒ Mostly Yes | ☒ No | ☒ Mostly No |

[ Save ]

[ Cancel ]

Special Diets (DESCRIBE)

|21_diets                                                                    |

Page 9

Friday, September 28, 1990   Layout: Input

Form PSM 2-5 for |vName       | Create Date: |Create Date| Last Update |Last Update|

22. PREGNANCY, BIRTH, AND INFANCY INFORMATION:

(A) DESCRIBE any special conditions that occurred during pregnancy or at the time of your child's birth:

|22_A |

(B) What infant formula did you choose for your child? |22_B |

(C) Check which applies to your child's birth:

☒ Normal Delivery
☒ Natural Childbirth
☒ Cesarean Section
☒ Induced Labor
☒ Breach Delivery
☒ Anesthetic  ☒ Demoral  ☒ Epidural Block  ☒ Pericervical Block

[ Save ]
[ Cancel ]

Page 10

---

Friday, September 28, 1990   Layout: Input

Form PSM 2-5 for |vName       | Create Date: |Create Date| Last Update |Last Update|

23. Take Action Now

Is there a particular area of your child's development that you would like to address immediately?

|ImmediateDev |

[ Save ]
[ Cancel ]

Page 11

Friday, September 28, 1990                                    Layout: Output

| UIN # | Users |
|-------|-------|
| UIN   | vTemp |

[Export]
[Import]      Sort      Search by Example      Done

---

Friday, September 28, 1990                                    Layout: Input

UIN #  [UIN]                    Create Date: [Create Date]  Last Update [Last Update]
Form PSM 6-14 for [vName]

7A  FAMILY RELATIONSHIPS

| | | | | | |
|---|---|---|---|---|---|
| frequently plays with     | ☒ Alone | ☒ Mother | ☒ Father | ☒ Sister | ☒ Brother |
| frequently does homework  | ☒ Alone | ☒ Mother | ☒ Father | ☒ Sister | ☒ Brother |
| frequently reads with     | ☒ Alone | ☒ Mother | ☒ Father | ☒ Sister | ☒ Brother |

7B  SOCIAL RELATIONSHIPS

| | | | | |
|---|---|---|---|---|
| is loyal to friends         | ☒ Yes | ☒ Mostly Yes | ☒ Mostly No | ☒ No |
| often feels quite lonesome  | ☒ Yes | ☒ Mostly Yes | ☒ Mostly No | ☒ No |
| prefers playing alone       | ☒ Yes | ☒ Mostly Yes | ☒ Mostly No | ☒ No |

7C  DISCIPLINE

| | | | | |
|---|---|---|---|---|
| lives up to commitments     | ☒ Yes | ☒ Mostly Yes | ☒ Mostly No | ☒ No |
| always tries to cooperate   | ☒ Yes | ☒ Mostly Yes | ☒ Mostly No | ☒ No |
| stays with activity/compl.  | ☒ Yes | ☒ Mostly Yes | ☒ Mostly No | ☒ No |

[ Save ]
[ Cancel ]

Page 1  ◀ ▶

Friday, September 28, 1990                                             Layout: Input Form PSM 6-14 for vName           Create Date: [Create Date] Last Update [Create Date]

7D  LEADERSHIP AND CONFORMITY STYLE

| | | | | |
|---|---|---|---|---|
| is a good sport | ☒ Yes | ☒ Mostly Yes | ☒ Mostly No | ☒ No |
| enjoys the game for the fun | ☒ Yes | ☒ Mostly Yes | ☒ Mostly No | ☒ No |
| always have problems | ☒ Yes | ☒ Mostly Yes | ☒ Mostly No | ☒ No |

7E  REALITY AND PRACTICALITY

| | | | | |
|---|---|---|---|---|
| seems afraid to talk | ☒ Yes | ☒ Mostly Yes | ☒ Mostly No | ☒ No |
| uses time wisely | ☒ Yes | ☒ Mostly Yes | ☒ Mostly No | ☒ No |
| prefers to be alone | ☒ Yes | ☒ Mostly Yes | ☒ Mostly No | ☒ No |

7F  MOODS AND EMOTIONAL STABILITY

| | | | | |
|---|---|---|---|---|
| Gets mad, others laugh | ☒ Yes | ☒ Mostly Yes | ☒ Mostly No | ☒ No |
| has a lot of patience | ☒ Yes | ☒ Mostly Yes | ☒ Mostly No | ☒ No |
| follows religious beliefs | ☒ Yes | ☒ Mostly Yes | ☒ Mostly No | ☒ No |

[ Save ]
[ Cancel ]

Page 2 

---

Friday, September 28, 1990                                             Layout: Input Form PSM 6-14 for vName           Create Date: [Create Date] Last Update [Create Date]

7G  BIOLOGICAL CLOCK

| | All Day | Early AM | Mid Day | Afternoon/eve | At Night |
|---|---|---|---|---|---|
| listens & understands better | ☒ | ☒ | ☒ | ☒ | ☒ |
| reads & comprehends better | ☒ | ☒ | ☒ | ☒ | ☒ |
| socializes better | ☒ | ☒ | ☒ | ☒ | ☒ |

8A  HOBBIES

[ 8_A                                                              ]

8B  TELEVISION

| | | |
|---|---|---|
| ☒ Comedies | ☒ Sports | ☒ News |
| ☒ Cartoons | ☒ Mysteries | ☒ Documentaries |
| ☒ Monster Shows | ☒ Science Fiction | ☒ Movies |
| ☒ Westerns | ☒ Variety Shows | ☒ Adventure |
| ☒ Public TV | ☒ Educational | ☒ VCR Videos |

Other [ 8B_16                               ]
TV shows like best? [ 8B_17                                        ]
Least? [ 8B_18                                                     ]
Hours per week? [ 8B_19        ]

[ Save ]
[ Cancel ]

Page 3 

Friday, September 28, 1990      Layout: Input

Form PSM 6-14 for [vName]    Create Date: [Create Date] Last Update [Create Date]

8C SPORTS

- ☒ Baseball
- ☒ Basketball
- ☒ Football
- ☒ Jogging
- ☒ Bicycling
- ☒ Fishing
- ☒ Golf
- ☒ Bowling
- ☒ Volleyball
- ☒ Soccer
- ☒ Hockey
- ☒ Tennis
- ☒ Handball
- ☒ Ice Skating
- ☒ Roller Skating
- ☒ Swimming
- ☒ Boxing
- ☒ Wrestling Other [8C19]

8D READING

- ☒ Comic Books
- ☒ Mysteries
- ☒ Romance
- ☒ Adventure
- ☒ Animal Stories
- ☒ Humor
- ☒ Stories / People
- ☒ History
- ☒ Magazines
- ☒ Newspapers
- ☒ How To Books Other [8D 12]

[Save] [Cancel]

Page 4 

---

Friday, September 28, 1990      Layout: Input

Form PSM 6-14 for [vName]    Create Date: [Create Date] Last Update [Create Date]

| | |
|---|---|
| Name of best book ever read? | 8D13 |
| The worst book? | 8D14 |
| Favorite comic book? | 8D15 |

8E. MICELLANEOUS

| | |
|---|---|
| Spend time after school, how? | 8E1 |
| Weekends? | 8E2 |
| Toys enjoy most? | 8E3 |
| Like to do most? | 8E4 |
| Like to do least? | 8E5 |
| Real-life hero/heroine? | 8E6 |
| Fictional hero? | 8E7 |
| Favorite game? | 8E8 |
| Favorite movie? | 8E9 |
| Free time? | 8E10 |

[Save] [Cancel]

Page 5 

Friday, September 28, 1990                                           Layout:   Input Form PSM 6-14 for [vName_____] Create Date: [Create Date] Last Update [Create Date]

What do you listen to on:
- the radio? [8E11 1]
- records? [8E11 2]
- tapes? [8E11 3]

Personal Computer at home?  ○ Yes    ○ No
- If yes, what model? [8E12 1]
- what do you use it for? [8E12 2]
- hours per week? [8E12 3]

Instrument played? [813 1]
For how long? [813 2]
How well? [813 3]

[ Save ]
[ Cancel ]

Right or left handed? [8 14]

8F SCHOOL
Favorite Subject? [8 F1]
Least favorite subject? [8 F2]

[Page 6] ◀ ▶

---

Friday, September 28, 1990                                           Layout:   Input Form PSM 6-14 for [vName_____] Create Date: [Create Date] Last Update [Create Date]

8G INTERESTS

| | | | |
|---|---|---|---|
| ☒ Auto Mechanics | ☒ Fairy Tales | ☒ History | ☒ Health |
| ☒ Television | ☒ Woodwork | ☒ Printing | ☒ Aviation |
| ☒ Famous People | ☒ Electricity | ☒ Electronics | ☒ Radio |
| ☒ Art | ☒ Music | ☒ Adventure | ☒ Dancing |
| ☒ Mystery | ☒ Foreign Lands | ☒ Poetry | ☒ Current Events |
| ☒ Comic Strips | ☒ Riddles | ☒ Cowboys | ☒ Zoo Animals |
| ☒ Insects | ☒ Science | ☒ Transportation | ☒ Football |
| ☒ Skateboarding | ☒ Race Cars | ☒ Baseball | ☒ Cooking |
| ☒ Basketball | ☒ Hockey | ☒ Tennis | ☒ Soccer |
| ☒ Cars/Trucks | ☒ Monsters | ☒ Robots | ☒ Real Estate |
| ☒ Computers | ☒ Geography | ☒ Myths/Legends | ☒ Jokes |
| ☒ Word Search | ☒ Indians | ☒ Reptiles | ☒ The Circus |
| ☒ Detectives | ☒ Flowers/Plants | ☒ Nations | ☒ Space Travel |
| ☒ Farming | ☒ Astronomy | ☒ Singers | ☒ Engineering |
| ☒ Medicine | ☒ Banking | ☒ Advertising | ☒ Law |
| ☒ Mathematics | ☒ Government | ☒ Business | ☒ Architecture |

☒ Stocks & the commodity market    ☒ Stories about people
☒ Communication    Other [8G 35]

[ Save ]
[ Cancel ]

[Page 7] ◀ ▶

Friday, September 28, 1990                                    Layout: Input

Form PSM 6-14 for |vName          | Create Date: |Create Date| Last Update |Create Date|

9 DOES THE USER HAVE ANY DIFFICULTIES WITH:

| Auditory reception | 9A1 |
| Auditory association | 9A2 |
| Auditory memory | 9A3 |
| Grammar | 9A4 |
| Visual reception | 9A5 |
| Visual association | 9A6 |
| Visual memory | 9A7 |
| Perceptual constancy | 9A8 |
| Spatial relationships | 9A9 |
| Eye/hand coordin. | 9A10 |
| Balance | 9A11 |
| Verbal expression | 9A12 |
| Motion sickness | 9A13 |
| Middle ear | 9A14 |
| Back or spine | 9A15 | leave blank for NO

Save
Cancel

Page 8 

---

Friday, September 28, 1990                                    Layout: Input

Form PSM 6-14 for |vName          | Create Date: |Create Date| Last Update |Create Date|

10 DESCRIBE MEDICAL HISTORY, PHYSICAL:

|10A1                                                                     |
|                                                                         |
|                                                                         |

1 USERS LEARNING LEVEL:

|   | Below Grade Level | Grade Level | Above Grade Level |
|---|---|---|---|
| 1. Math | ☒ | ☒ | ☒ |
| 2. Reading/Comprehen. | ☒ | ☒ | ☒ |
| 3. Science | ☒ | ☒ | ☒ |
| 4. English Skills/Lang. | ☒ | ☒ | ☒ |
| 5. Social Studies | ☒ | ☒ | ☒ |
| 6. Art | ☒ | ☒ | ☒ |
| 7. Music | ☒ | ☒ | ☒ |
| 8. Other |11 8| ☒ | ☒ | ☒ |

Save
Cancel

Page 9 

Friday, September 28, 1990                                              Layout: Input Form PSM 6-14 for |vName          | Create Date: |Create Date| Last Update |Create Date|

12  IDENTIFY SPECIAL TALENTS & ABILITIES:

|12                                                         |

13  INDENTIFY WEAKNESSES AND NEEDS:

|13                                                         |

1  DIETARY HABITS:

| | | | | |
|---|---|---|---|---|
| Sugar | ☒ Yes | ☒ Mostly Yes | ☒ Mostly No | ☒ No |
| Salt | ☒ Yes | ☒ Mostly Yes | ☒ Mostly No | ☒ No |
| Candy | ☒ Yes | ☒ Mostly Yes | ☒ Mostly No | ☒ No |
| Soda | ☒ Yes | ☒ Mostly Yes | ☒ Mostly No | ☒ No |
| Nutrasweet | ☒ Yes | ☒ Mostly Yes | ☒ Mostly No | ☒ No |
| Saccharin | ☒ Yes | ☒ Mostly Yes | ☒ Mostly No | ☒ No |

[ Save ]

[ Cancel ]

Special Diets?  |14 diets                                   |

Page 10  ◀ ▶

---

Friday, September 28, 1990                                              Layout: Input Form PSM 6-14 for |vName          | Create Date: |Create Date| Last Update |Create Date|

15  PREGNANCY, BIRTH, AND INFANCY INFORMATION:

(A) DESCRIBE any special conditions that occurred during pregnancy or at the time of your child's birth:

|15A                                                        |

(B) What infant formula did you choose for your child? |15B    |

(C) Check which applies to your child's birth:    ☒ Normal delivery   ☒ Natural childbirth
    ☒ Cesarean Section    ☒ Induced Labor    ☒ Breach Delivery
    ☒ Anesthetic   ☒ Demoral   ☒ Epidural Block   ☒ Pericervical Block

[ Save ]

16. Take Action Now

Is there a particular area of your child's development that you would like to address immediately?

[ Cancel ]

|ImmediateDev                                               |

Page 11  ◀ ▶

What is claimed is:

1. An automated selection system for selecting and matching learning tools that possess developmental values with the individual characteristics of a user that have correspondence to such values comprising:
   data entry means for entering user data including user static personal data and dynamic user developmental conditions;
   learning tool list means for storing learning tool characterizing data;
   means coupled to the data entry means and the learning tool list means for generating a preferred learning tool list by matching the user data to corresponding learning tool characterizing data.

2. The automated system of claim 1 further comprising storage means for storing user data.

3. The automated system of claim 2 wherein the data entry means further comprises means for updating user data.

4. The automated system of claim 2 wherein the storage means for storing user data comprises vital information profile list means for storing the user static personal data as vital information profile data and preference survey model list means for storing dynamic user data as preference survey model data.

5. The automated system of claim 4 wherein the data entry means further comprises means for updating user static personal data, and means for updating dynamic user developmental data.

6. The automated system of claim 4 wherein the vital information profile data comprises age, past developmental history, and static traits of the user; and
   the preference survey model data comprises cognitive, social, emotional, and physical developmental characteristics of the user.

7. The automated system of claim 1 wherein the data entry means further comprises means for entering learning tool characterizing data.

8. The automated system of claim 1 wherein the data entry means further comprises means for updating learning tool characterizing data.

9. The automated system of claim 1 wherein the learning tool characterizing data comprises cognitive, educational, social, emotional, entertainment, and play values.

10. The automated system of claim 1 further comprising means for identifying each preferred learning tool as one of a positive reinforcing tool, a negative reinforcing tool and a recreational tool.

11. The automated system of claim 1 wherein the means for generating a preferred learning tool list by matching further comprises means for performing a plurality of matching sequences in which selected user data is compared to selected learning tool characterizing data and wherein each one of the plurality of sequences generates product selections based upon different selected user data.

12. The automated system of claim 11 wherein the plurality of sequences comprises a sequence for matching user age equivalency, sex and ethnic background data to age equivalency, sex and ethnic background learning tool data to select learning tools which match on the basis of age equivalency, sex and ethnic background.

13. The automated system of claim 12 wherein the plurality of sequence further comprise a sequence for matching user educational value data to learning tool educational value data, a sequence for matching user learning and physical value data to learning tool learning and physical value data, and a sequence for matching user play and entertainment value data to learning tool play and entertainment value data.

14. A method for automated matching of learning tools that possess developmental values with the individual characteristics of a user that have correspondence to such values comprising the steps of:
   entering user data including user static personal data and dynamic user developmental data;
   storing learning tool characterizing data;
   matching the user data to corresponding learning tool data; and
   generating a preferred learning tool list responsive to the matching of user data to corresponding learning tool characterizing data.

15. The method of claim 14 wherein the step of entering further comprises entering and updating learning tool characterizing data.

16. The method of claim 14 further comprising the step of storing the user data.

17. The method of claim 14 wherein the step of matching further comprises the step of matching user age equivlency, sex, and ethnic background data to age equivalency, sex, and ethnic background learning tool data to generate preliminary selected learning tools.

18. The method of claim 17 wherein the step of matching further comprises the step of matching user educational value data to learning tool educational data of the preliminary selected learning tools, matching user learning and physical value data to learning tool learning and physical value data of the preliminary selected learning tools, and matching user play and entertainment value data to learning tool play and entertainment value data for the preliminary selected learning tools.

19. A computerized system for matching learning tools that possess developmental value for children with characteristics of a child, comprising:
   data entry means for entering child user data including user static personal data and dynamic user developmental data for the child;
   learning tool list means for storing learning tool characterizing data;
   matching means for matching the child user data to corresponding learning tool data;
   means for generating a preferred learning tool list for the child responsive to the matching.

20. The computerized system of claim 19 wherein the matching means further comprises means for performing a plurality of matching sequences wherein selected child user data is compared to selected learning tool data.

* * * * *